(12) United States Patent
Razdow et al.

(10) Patent No.: US 6,330,008 B1
(45) Date of Patent: *Dec. 11, 2001

(54) APPARATUSES AND METHODS FOR MONITORING PERFORMANCE OF PARALLEL COMPUTING

(75) Inventors: Allen M. Razdow; Daniel W. Kohn, both of Cambridge; Michael J. Beckerle, Needham; Jeffrey D. Ives, Cambridge, all of MA (US)

(73) Assignee: Torrent Systems, Inc., Cambridge, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/807,040

(22) Filed: Feb. 24, 1997

(51) Int. Cl.$^7$ ................................................. G06F 13/00

(52) U.S. Cl. .................... 345/772; 345/771; 345/766; 709/230; 709/231; 709/232; 709/235; 710/29

(58) Field of Search ..................................... 345/326–358, 345/961, 966, 440; 395/200.3–200.39, 377, 800.16, 800.25; 703/13, 14, 21, 23; 709/100, 102, 200, 206, 223, 226, 230, 231, 232, 242, 250, 252; 710/29, 34, 36, 60, 61

(56) References Cited

U.S. PATENT DOCUMENTS

| | | | |
|---|---|---|---|
| 4,298,954 | 11/1981 | Bigelow et al. | 710/53 |
| 4,803,613 | * 2/1989 | Kametani et al. | 364/132 |
| 4,823,256 | 4/1989 | Bishop et al. | 714/10 |
| 4,937,777 | 6/1990 | Flood et al. | 710/107 |
| 5,237,691 | 8/1993 | Robinson et al. | 717/3 |
| 5,355,492 | 10/1994 | Frankel et al. | 717/7 |
| 5,381,548 | 1/1995 | Matsuo | 717/7 |
| 5,450,313 | 9/1995 | Gilbert et al. | 717/9 |
| 5,481,740 | * 1/1996 | Kodosky | 712/1 |

(List continued on next page.)

OTHER PUBLICATIONS

Rover, D.T., "Visualization of program performance on concurrent computers," Proceedings of Compting in the 90's Conference, Kalamazoo, MI p. 154–60, 1991.*

(List continued on next page.)

Primary Examiner—Ba Huynh
(74) Attorney, Agent, or Firm—Wolf, Greenfield & Sacks, P.C.

(57) ABSTRACT

A performance monitor represents execution of a data flow graph by changing performance information along different parts of a representation of that graph. If the graph is executed in parallel, the monitor can show parallel operator instances, associated datalinks, and performance information relevant to each. The individual parallel processes executing the graph send performance messages to the performance monitor, and the performance monitor can instruct such processes to vary the information they send. The monitor can provides 2D or 3D views in which the user can change focus, zoom and viewpoint. In 3D views, parallel instances of the same operator are grouped in a 2D array. The data rate of a datalink can be represented by both the density and velocity of line segments along the line which represent it. The line can be colored as a function of the datalink's source or destination, its data rate, or the integral thereof. Alternatively, a histogram can be displayed along each datalink's line, displaying information about the rate of, total of, or value of a field in, the data sent, at successive intervals. The user can click on objects to obtain additional information, such as bar charts of statistics, detailed performance listings, or invocation of a debugger. The user can selectively collapse representations of graph objects into composite representations, highlight objects which are out of records or which have flow blockages; label operators; turn off the display of objects; and record and playback the performance information.

18 Claims, 40 Drawing Sheets

U.S. PATENT DOCUMENTS

| | | | |
|---|---|---|---|
| 5,487,167 | | 1/1996 | Dinallo et al. .................... 345/302 |
| 5,568,614 | | 10/1996 | Mendelson et al. ................ 709/231 |
| 5,720,018 | * | 2/1998 | Muller et al. ..................... 345/133 |
| 5,721,928 | | 2/1998 | Umehara et al. ..................... 717/6 |
| 5,751,965 | * | 5/1998 | Mayo et al. ....................... 709/210 |
| 5,790,798 | * | 8/1998 | Beckett, II et al. ........... 395/209.54 |
| 5,838,973 | * | 11/1998 | Carpenter-Smith et al. ........... 717/1 |
| 5,903,703 | | 5/1999 | Okada ................................. 386/95 |
| 5,903,730 | | 5/1999 | Asai et al. .................... 395/200.54 |
| 5,909,681 | * | 6/1999 | Passera et al. ....................... 707/8 |
| 5,987,246 | * | 11/1999 | Thomsen et al. ..................... 717/2 |
| 6,021,457 | | 2/2000 | Archer et al. ...................... 710/260 |

OTHER PUBLICATIONS

Hackstadt, S.T., et al, "Next generation parallel performance visualization . . . , " 6th Int. PARLE Conf. 1994, West Germany p 192–201.*

Mendelson, B., et al, "An improved mapping of data flow programs on VLSI array of processors," 1987 Int. Conf. on Parallel Processing Haifa, Israel, p. 871–3.*

Ng Geok See, et al, "Neocognition Trainer—a tool for anaylsis of Neocognition", SPICIS'92, Singapore, 1992, p. 425–30.*

Sodan, Communications of the ACM, "Yin and Yang in Computer Science", vol. 41, No. 4, pp. 103–111, Apr. 1998.

Zaki et al, SPAA, "A Localized Algorithm for Parallel Association Mining", pp321–330, 1997.

Morrison, Flow–Based Programming, "A New Approach to Application Development", Chapters 1–29, 1994.

Barclay et al., Sigmod Record, "Loading Databases Using Dataflow Parallelism", vol. 23, No. 4, pp. 72–83, Dec. 1994.

Cummings et al., IEEE, "Checkpoint/Rollback in a Distibuted System Using Coarse–Grained Dataflow", pp. 424–433, 1994.

DeWitt et al., Communications of the ACM, "Parallel Database Systems: The Future of High Performance Database Systems", vol. 35, No. 6, pp. 85–98, Jun. 1992.

DeWitt et al., Computer Sciences Technical Report #1079, "Parallel Database Systems: The Future of High Performance Database Systems", pp. 1–27, Feb. 1992.

Gray et al., Morgan Kaufmann Publishers, "Transaction Processing: Concepts and Techniques", 1993.

Lau et al., IEEE, Propagating Buffer: A New Approach to Deadlock Freedom in Store–and Forward Networks, pp. 804–807, 1991.

Lucco et al., ACM, "Parallel Programming With Coordination Structures", pp. 197–208, 1990.

DeWitt et al., IEEE Transactions on Knowledge and Data Engineering,." The Gamma Database Machine Project", vol. 2, No. 1, pp. 44–63, Mar. 1990.

DeWitt et al., The Gamma Database Machine Project,."The Gamma Database Machine Project", pp. 609–626.

Li et al., ACM, "Real–Time, Concurrent Checkpoint for Parallel Programs", pp. 79–88, 1990.

Morison, R. The Third Conference on Hypercube Concurrent Computers and Applications, ACM press, Interactive performance display and debugging using the nCUBE real--time graphics system, , vol. 1, pp. 760–765. Jan. 1988.

* cited by examiner

- View Menu~198
    - 2D Views~200
        - By Instances~216
        - By Operators~218
        - ...
    - 3D Views~202
        - Expansion Level~220
            - By Instances~228
            - By Operators~230
            - By Levels~232
            - By Processors~234
            - By System~236
        - ...
    - Display Ports~203
    - Datalink Display~204
    - Labels~205
        - No Labels~254
        - Name Only~255
        - Block Diagram~272
    - Bar Graphs~207
    - Number Processors~206
    - Get & Put Hangs~210
    - EOF Display~211
    - Monitored field~212
    - Saved Visualization Manager~213

*FIG. 9*

-barGraphDisplayDialogBox3~238
    -bar graphs on
        -[ ] persistent data set~240
        -[ ] buffer operator~241
        -[ ] operator~242
  - graph
        -show~243
            -flow rate in ( ) bytes, or ( ) record ~244
                -[ ] outputs and/or [ ] inputs
            -total flow to date in ( ) bytes, or ( )records~245
                -[ ] outputs and/or [ ] inputs
                -[ ] relative to total records in input data set~245A
            -disk I/O rate in ( ) bytes or ( ) records~246
                ( ) plain, ( ) % of maximum, or ( ) compared to remaining
            -network I/O rate in ( ) bytes or ( ) records~248
                ( ) plain, ( ) % of maximum, or ( ) compared to remaining
            -[ ] disk storage as in bytes ~250
                ( ) plain, ( ) % of maximum, or ( ) compared to remaining
            -[ ] CPU usage as % of maximum~251
                ( ) plain, ( ) % of maximum, or ( ) compared to remaining
        -direction~252
            -( ) perpendicular to node array
            -( ) on surface of each node
-[ ] label scale on graphs~258
-ok
-cancel
-help

*FIG. 16*

- datalinkDisplayDialogBox~260
    -[ ] display datalinks~261
    -color data link by~263
        -source ( ) node or ( ) operator~264A
        -destination ( ) node or ( ) operator~264B
        -flow rate in ( ) records or ( ) bytes~264C
        -inverse flow rate in ( ) records or ( ) bytes~264D
        -total records sent in ( ) records or ( ) bytes~264E
        -inverse of total records sent in ( ) records or ( ) bytes~264F
        -( ) partition method~264G
        -monitored field value
            -by ( ) 1st letter, ( ) 1st number, or ( ) color map~264H
            -monitored field settings (button) ~265
    -segmentation
        -( ) solid~266A
        -data rate rain by
            -( ) records/sec or ( ) bytes/sec~266B
        -( ) color history ~266C
            -( ) show entire time of graph execution along datalink~267A
            -( ) show [editbox] secs along datalink~267B
            -separately color every [editbox] secs~267C
            -[ ] show time scale along datalinks (checkbox)~267D
    -color map dialog (button)~268
    -flow rate time frame~269
        -( ) avg in last second
        -( ) avg in last minute
        -( ) avg in last [edit box] sec
    -ok
    -cancel
    -help

FIG. 20

-getAndPutHangsDialogBox~266
    -[ ] monitor get and put hangs~271
    -consider call hung after [editbox] secs~270
    -highlight~272
        -[ ] port with hung call~274
        -[ ] hung operator instances~276
        -[ ] hung datalinks~278
    -[ ] don't highlight hangs for ports which have not handled any records~279
    -color hung getRecords as solid [color button grid]~280
    -color hung putRecords as solid [color button grid]~282
    -[ ] display time of hang~284
    -ok
    -cancel
    -help

*FIG. 23*

-EOFDisplayDialogBox~290
    -display EOFs by
        -[ ] port~292
        -[ ] operator~294
        -[ ] datalink~296
    -highlight EOFed objects as solid [color button grid]~298
    -[ ] display time of EOF~300
    -ok
    -cancel
    -help

*FIG. 27*

-DataCollection Menu~304
    -record performance~306
        -not at all~312
        -every second~314
        -every minute~316
        -custom~318
    -monitor performance~308
        -not at all~320
        -every second~322
        -every minute~324
        -custom~326
    -...

*FIG. 28*

-DisplayTime Menu~330
    -realtime~332
    -replay~334

*FIG. 29*

-replayDialogBox~336
    -time slider~338
    -replay speed slider~340
    -...
    -ok
    -cancel
    -help

*FIG. 30*

-operator objectMenu~343
    -make focus and nav~354
    -collapse instances~356
    -collapse operators at level~355
    -object overview~358
    -performance overview~360
    -datalink display~362
    -bar graph~368
    -monitored fields~370
    -...

*FIG. 31*

-operator port objectMenu~344
    -make focus and nav~354
    -collapse instances~356
    -object overview~358
    -performance overview~360
    -datalink display~362
    -bar graph~368
    -monitored fields~370
    -monitor records~372
    -...

*FIG. 32*

-operator instance objectMenu~346
    -make focus and nav~354
    -collapse instances~356
    -debug~357
    -object overview~358
    -performance overview~360
    -datalink display~362
    -bar graph~368
    -monitored fields~370
    -...

*FIG. 33*

-operator port instance objectMenu~348
    -make focus and nav~354
    -collapse Instances~356
    -debug~357
    -object overview~358
    -performance overview~360
    -datalink display~362
    -bar graph~368
    -monitored fields~370
    -monitor records~372
    -...

FIG. 34

-datalink objectMenu~350
    -make focus and nav~354
    -collapse Instances~356
    -object overview~358
    -performance overview~360
    -datalink display~362
    -monitored fields~370
    -monitor records~372
    -...

FIG. 35

-datalink instance objectMenu~352
    -make focus and nav~354
    -collapse Instances~356
    -debug~357
    -object overview~358
    -performance overview~360
    -datalink display~362
    -monitored fields~370
    -monitor records~372
    -...

FIG. 36

-putRecord~152
  -place record in buffer block addressed to one of one or more instances of the output port's consuming input port based on the partitioning scheme~420
  -if record fills buffer block~422
    -if getAndPutMonitoringIsOn, send the performance monitor timed putBlockPending UDP msg, identifying the sourceNode, sourceProcessOnNode, and sourceOutputOnProcess~424
    -if output port's datalink is connected to a data set, write block to that data set~425
    -else send buffer block to its corresponding consuming input port instance over TCP/IP~426
    -call buildAndSendBlockSentMsg~423
  -return~462

FIG. 40

-buildAndSendBlockSentMsg~429
  -if current block contains EOF or if time since the last blockSent message was sent for current datalink exceeds desired blockSent interval~427
    -assemble standard blockSent UDP msg including appropriate values for the messages sourceNode,.sourceProcessOnNode, sourceOutputOnProcess, destinationNode, destinationProcessOnNode, destinationInputOnProcess, numberOfRecordsSoFar, numberOfBytesSoFar, timeSent, and isEOFInRecord ~428
    -If fieldMonitoringIsOn~430
      -for each entry in monitoredFieldTable having matching source and destination~432
        -if time since lastTimeRecordSent is greater than desiredSendInterval, place monitorFieldHeader in blockSent, followed by numberOfDesiredValue1, numberOfDesiredValue2, and the extracted field value from last record in current block~434
    -If recordMonitoringIsOn~450
      -if entry in monitoredRecordTable has matching source and destination~452
        -if time since lastTimeRecordSent is greater than desiredSendInterval~454
          -place monitorRecordHeader as the last record in blockSent~456
    -send performance monitor the blockSent UDP message~460
  return~461

FIG. 41

- getRecord~148
  - if there is no record in input port's input buffer~464
  - if getAndPutMonitoringIsOn, send performance monitor timed getBlockPending UDP msg, identifying the node, processOnNode, and inputOnProcess~465
  - if input port's datalink is connected to a data set~466
    - read next block from that data set~467
    - call buildAndSendBlockSentMsg~468
  - else wait until input buffer gets a new block of records~469
  - set inputBlockReadPointer to start of new block~470
  - set return value to value of inputBlockReadPointer~474
  - increment inputBlockReadPointer by length of record~476
  - return~478

FIG. 42

- updateReplayGraphState~534
  - if the time since lastGraphStateUpdateTime exceeds replayUpdateInterval~535
    - save the current time as lastRealTimeOfGraphStateUpdate~536
    - find next timeBeingReplayed~537
    - scan EOFHistory file and get&PutHangHistory files since the graphState's previous timeBeingReplayed, to update EOF and getRecord and putRecord hang values of port and operator instances~538
    - clear the blockSent msgs and dataRate stored for all datalinks in the graphState~539
    - for each item in the blockSentHistory file recorded from timeBeingReplayed back to timeBeingReplayed - replayUpdateWindowDuration~540
      - if a blockSent msg corresponding datalink for which a dataRate has not been calculated in the GraphState call updateGraphStateWithBlockSentMsg~542
  - return~543

FIG. 46

-perfomanceMonitor~128
  -initialize~480
  -receive score description from process composing score of, and conducting the parallel execution of, the data flow graph~482
  -create data structures for all nodes, operators, operator instances and their ports, and datalink instances~484
  -determine which operators are in which levels~486
  -lay out operators in each level in both 2 and 3-d space~490
  -loop until user exits from within~492
    -while unprocessed user input, call handleUserMsgs~494
    -while msgs in UDP input queue, call handleUDPMsgs~496
    -for each graphState portrayed in a replay window, call UpdateReplayGraphState~532
    -if time since timeOflastBlockPendingCheck exceeds blockPendingCheckInterval, call blockPendingCheck~550
    -for each graph visualization window~554
      -if it has been longer than windowUpdateInterval since it was last updated~569
        -if window is a 3Dview ~570
          -if a flight path is active for window, and if time since last move along flight path exceeds flight path's flightPathFrameInterval, change view parameters according to flight path~572
          -if its viewRadiusFromFocus, viewLongitudeFromFocus, viewLatitudeFromFocus, or viewZoom has been changed, call updateWindows3Dto2DProjection~574
          -call updateWindowsPixels~576
        -if the window is a 2D view update it~621

FIG. 43

- handleUDPMsgs~498
  - for each message in the queue~500
    - if getBlockPending msg, store it in data structure for its associated input port instance~502
    - else if putBlockPending msg, store in data structure for its associated output port instance~504
    - else if blockSent msg ~506
      - if historyRecordingIsOn~508,
        - if time since last blockSent was recorded for the msg's data link instance exceeds blockSentRecordInterval, store a copy of blockSent msg in the blockSentHistory file in chronological order by time stamp~510
        - if blockSent's isEOFInRecord is true, record blockSent in EOFHistory file~511
      - call updateGraphWithBlockSentMsg with the blockSent msg for realTime graphState ~512
- return~530

FIG. 44

-updateGraphStateWithBlockSentMsg~531
 -erase any getBlockPending, putBlockPending, hungOnGetRecord, hungOnPutRecord in data structures for all inputs or outputs on same instance having an earlier time stamp than the blockSent msg~513
 -if there is a prior blockSent msg recorded for the data link, calculate dataRates for the current blockSent msg's corresponding datalink instance by subtracting numberOfRecordsSoFar and numberOfBytesSoFar from the prior blockSent stored in data structure of the datalink instance having msg's associated source and destination ports from numberOfRecordsSoFar and number of BytesSoFar, respectively, in the current msg and divide difference by the difference in timeSent of the two msgs~514
 -store the dataRate in the datalink instances data structure~515
 -store the current value of blockSent in the datalink instance's data structure~516
 -if blockSent's isEOFInRecord is true, set hasSentEOF in blockSent's corresponding datalink instance~517
 -if there is a monitoredFieldHeader in the current blockSent~522
  -if there is a window opened to display monitored field information for the datalink instance, feed the monitored field information to that window~524
  -if msgFirstOccurrence has been set for either the 1stDesiredValue or 2ndDesiredValue, check if the blockSent msg contains the first occurrence of either desired value and if so beep and send appropriate window to display~526
 -if blockSent contains a monitoredRecordHeader and if there is a window opened to display that record for the datalink instance, feed blockSent's monitored record information to that window's process~528
 -return~529

FIG. 45

-blockPendingCheck~552
-for the data structure of each port instance~556
 -if it has a getBlockPending or putBlockPending indication with a time stamp older than normalBlockPendingTime~558
  -label the data structure for port as hungOnGetRecord or hungOnPutRecord, respectively~560
  -if recording is on, record hungOnGetRecord or hungOnPutRecord, respectively, and its associated time for port instance in get&PutHangHistory file~562
-Return~564

FIG. 47

-updateWindows3DTo2DProjection~578
 -set viewDirectionLongitude and viewDirectionLatitude to keep view centered on viewFocus~582
 -call calculateGraphs2DProjectionCoordinates~584
-return~586

FIG. 48

-colorHistogramSegmentation~618
 -if time or time scale represented by window has changed, update outputPortPointer and inputPortPointer in the lineSegmentBuffer accordingly~620
 -if any part of the object's lineSegmentBuffer between its outputPortPointer and inputPortPointer is not segmented, calculate histogram color segmentation for that portion of the buffer from either real time values, or if appropriate, relevant portions of blockSentHistory file~622
-return~624

FIG. 50

-updateWindowsPixels~588
 -for all datalink objects in the window which have to be updated and which might contain any transparent segments, erase all pels associated with it~589
 -for each object in the visualization window's graphState mapped into the window's 2D projection which has been changed since the last call to this routine~590
  -if it is a datalink object~592
   -if datalink object's colorSetting is "off", skip rest of loop~594
   -else if datalink object's colorSetting is a function of a selected variable~596
    -if object is a composite, set its value for the selected variable to the average of the values of that variable from all its corresponding instances~598
    -select object's draw color from the position of its value for the selected variable relative to the variable's color map~600
   -else if datalink object's colorSetting is a fixed color set its draw color equal to that color~602
   -else if datalink object's segmentationSetting is for a color histogram, call colorHistogramSegmentation~604
   -if datalink object's segmentationSetting is for dataRate noodles, call noodleSegmentation~606
   -if datalink object's segmentationSetting is Solid, set lineSegmentBuffer to one solid segment~608
   -call drawLineSegments~610
  -if it is not a datalink object, project it into the view's pel map, taking into account what objects block what other objects from perspective of viewpoint~614
-...
-return~616

FIG. 49

- noodleSegmentation~626
  - advance outputPortPointer and inputPortPointers in lineSegmentBuffer in proportion to current dataRate~628
  - for each part of the object's lineSegmentBuffer between its OutputPortPointer and inputPortPointer which is empty, starting at the outputPortPointer~629
    - until such empty portion has been filled~630
      - add a new pair of "on" and "off" segments to the buffer, having a density which is a partially random function of link's dataRate for the time frame represented by that segment's location along the line representing the datalink object~631
  - if monitoredFieldDisplayIsOn, if the datalink object has a monitored field, and if a blockSent message is detected in the time represented by such pair has a value for that field represented by either a triangle or a ball, replace the pair's "on" segment in the buffer with a triangle or ball~634
- return~635

FIG. 51

—drawLineSegments~636
  —Erase all pixels, if any, previously associated with the current datalink object by step 648 in a pevious call to the routine~637
    —for each line segment in the current datalink object's lineSegmentationBuffer which maps into the window~638
      —if it's color is "off" skip rest of loop~642
      —for each successive portion of that line segment which has been projected onto an individual pel of the the view~643
        —if pel was not formerly colored~644
          —if the segment's color is "on", color the pel with the datalink object's draw color~645
          —else color the pel with the segment's color~646
          —store the ID of the current datalink object in asssociation with the pel~648
        —else, if the current datalink object is between the view point and the object previously associated with the pel at the point on each object represented by the pel, store the color of the current datalink object at the pel and associate the current datalink object with the pel~650
  —return~652

FIG. 52

APPARATUSES AND METHODS FOR MONITORING PERFORMANCE OF PARALLEL COMPUTING

FIELD OF THE INVENTION

The present invention relates to apparatuses and methods for parallel computing and particularly to methods and apparatuses which allow for monitoring the performance of such parallel computing.

BACKGROUND OF THE INVENTION

Despite the rapid increase in the power of individual computer processors, there are many present and potential applications which could benefit from much greater computing power than can be provided by any individual present or foreseeable processor. The major approach to such greater computing power is to use parallel computers, that is, computers having more than one processor. Many different types of parallel computers have been designed, ranging from Symmetric Multi-Processing systems in which the each of the multiple processors and some amount of cache memory share main memory and all of the computer's other resources, to so-called shared-nothing systems where each processor has its own separate, often relatively large, main memory and, often, its own mass storage device, and the processors are only connected by computer network. The number of processors in current parallel computers vary from two to tens of thousands.

Parallel computers can provide a huge amount of raw computational power, as measured by all of the instructions per second which their multiple processors can execute. One of the major problem restricting the use of parallel computing has been the difficulty in programming and debugging parallel computing programs because of the complexity of their computation. Also the execution of large computations on parallel computers can often fail or be slowed drastically because of resource limitations effecting all or a part of such computations. In addition, parallel computations can be lengthy, particularly if they are not properly designed. For all these reasons, it is important for those designing and running parallel programs to be able to better understand the computation processes with which they are dealing.

A form of computation which has been previously used is record-based data flow programming. This form of computation causes a flow of records to pass through a stream of operators which remove or add records to the stream, modify the values in records. or create new records. Such computation can be performed on one processor or in parallel on a plurality of processors. Parallel Relational Data Base Systems (parallel "RDBMSs") run programs which respond to a user query written in a data base query language such as SQL, and then automatically create a corresponding parallel data flow graph. In such systems the user cannot explicitly create the graph, nor can he create, even indirectly, any graph other than one created in response to a query in a data base language.

A new approach to programming parallel record-based data flow programming is disclosed in U.S. patent application Ser. No. 08/627,801, filed by Michael Beckerle et al. on Mar. 25, 1996, entitled "Apparatuses And Methods For Programming Parallel Computers" (hereinafter the "Beckerle et al. Application". The Beckerle et al. Application is hereby incorporated into this application in its entirety. The rights in the Beckerle et al. Application are owned by Torrent Systems, Inc., the assignee of the present application.

This prior application discloses a system in which a user can explicitly define a data flow graph by connecting together graph objects including data sets and operators with datalinks. The operators have input and output ports at which they can receive and output records, respectively, over a datalink. Each such port has a defined schema which defines the name and type of fields from which or to which the operator is to read or write data. The schema can define transfer operators which designate that all field of a record are to be supplied from one input port to one or more output ports. Field adapters objects can be placed between a datalink and an operator to change the name or type of fields in the records supplied to or output by such operators.

The user is given the capability to define new parallelizable operators, including new parallel operators containing programming written by the user, new parallel operators each instance of which executes a standard sequential program, or new parallel operators using subgraphs defined from combinations of other, previously defined operators. The system automatically parallelizes the execution of the user defined graph.

It would also be helpful for those programming and running data flow graph computations could better understand the performance of such computations.

SUMMARY OF THE INVENTION

It is an object of the present invention to provide apparatuses and methods for helping those who program and/or run parallel programs to better understand the parallel execution of those programs.

It is an object of the present invention to provide apparatuses and methods for helping those who program and/or run dataflow programs to better understand the execution of those programs.

One aspect of the invention provides a performance monitoring tool which provides simultaneous visual display of information on the performance of each of a plurality of processes on each of a plurality of processors.

Another aspect of the invention provides a computer system which computes a data flow graph, and which has a performance monitor which shows a graphical representation of the graph's execution. The graphical representation includes varying, performance information about various parts of the graph shown in locations corresponding to those graph parts.

In a preferred embodiment of the invention, the computer system is capable of providing parallel computation of such data flow graphs in which the parallel operators of the graph are executed by multiple instances of those operators and the data flow associated with the input or output of such parallelized operator is partitioned between its parallel instances. In such cases the performance monitor is capable of providing a visual representation of the parallelized graph. In this visualization, each parallel operator instance and its associated partitioned data flow, or datalink, can be shown, and performance information can be displayed at or near the visual representation of such parallel objects in the graph.

The preferred embodiment of such a parallel performance monitor is capable of providing both 2D and 3D visualization of parallel graphs in which the user can selectively change the focus, zoom and viewpoint. This allows the user to quickly zoom in on parts of the graph in which he or she is currently interested and to use the relative expansion and contraction and relative changes in position caused by changes in viewpoint, zoom, and perspective to allocate screen area to desired parts of the graph. In 3D views the preferred embodiment groups parallel instances of the same operator together in a 2D array, both to provide a compact representation and to provide an easy to perceive representation of both the unparallel and parallel structure of the graph.

In the preferred embodiment of the invention information about the flow of data between operator instances can be represented visual attributes of the lines representing datalinks. This further compacts the representation of complex parallel graphs, since it allows both datalinks and information about their performance to be represented in one line. The preferred embodiment can represent the data rate of an individual datalink by both the density and velocity of broken line segments along its line. This use of broken, moving line segments makes it easier to distinguish separate datalinks which are very close to each other or overlap in a visualization, since it allows the user to see through the broken parts of such lines. The ability to distinguish between such closely placed datalink lines is further increased by the fact that the velocity and segmentation pattern of such datalink lines varies.

The user can select to color the moving broken line segments representing data rate with other information about the datalink, such as their source or destination operator or operator instance, or data rate in bytes or records, or the total number of record or bytes transmitted so far.

The preferred embodiment also lets the user display a histogram along each datalink line, such as a color histogram displaying information about the data rate, total data sent, or value of a selected field in the data sent, at each of a succession of time periods represented by successive lengths along each such datalink line.

The preferred embodiment enables the user to click on objects in such a 3D visual representation and to obtain additional information on them, such as the addition of bar charts on such objects, a window providing a detailed listing of performance statistics relating to the object, or the invocation of a debugger window for the object.

The preferred embodiment enables a user to selectively collapse the representation of parallel instances of all or selected parallel operators and their associated datalinks into a single composite graphical representation, so as to simplify the representation of the graph or to obtain representations of information relating to the performance of the resulting composite graph objects. It similarly allows the user to collapse representations of operators at a level, different levels of the graph, and different processors of the graph.

The preferred embodiment enables users to have objects which have received their last record or which have data flow blockages, to select whether display graph objects or not, and whether or not to label operators with their names.

In the preferred embodiment the user set visualization options for the entire graph, or for a selected set of one or more graph objects. This enables users to select one set of visualization settings for the entire graph and then select another set of such settings for one or more particular parts of the graph.

The preferred embodiment enables users to select to record the performance information used to generate graph visualizations. Such recording enables the user to replay prior portions of a current graph's execution at variable speed, or to replay a prior execution of a graph. During each such replay the user can vary the speed, view point and display settings of the visualization to focus on information of current concern. In addition, the preferred embodiment allows the user to display multiple visualization windows of a graph at one time, including windows representing the graph from different view points, display settings, and execution times.

In the preferred embodiment of the invention, the performance monitor is provided with a data structure which identifies which processes executing on which processor nodes correspond to which instances of which operators in the parallel data flow graph being executed. The individual parallel processes involved in the execution send messages to the performance monitor which provide it with the information necessary to perform its visualization. The performance monitor is capable of sending data to individual parallel processors as they are executing the graph to vary the performance information they send. For example, the performance monitor can send one or more operators a message informing it to report information on the value of a particular field in the records supplied to it. This information can then be displayed in the monitor's visualization window.

DESCRIPTION OF THE DRAWINGS

These and other aspects of the present invention will become more evident upon reading the following description of the preferred embodiment in conjunction with the accompanying drawings, which are discussed in the specifications which follows.

FIG. 9 is a schematic representation of the View menu of the performance monitor program which allows a user to control the display of a graph in the visualization window;

FIG. 16 is a schematic representation of the Bar Graph Display Dialog Box when enables the user to select to display bar graph information on operators and data sets of a graph;

FIG. 20 is a schematic representation of the Datalink Display Dialog Box which controls how all or a selected set of one or more data links is displayed;

FIG. 23 is a schematic representation of the Get And Put Hangs Dialog Box which lets users control the display of get and put hangs of the type shown in FIGS. 10, 11, 18 and 19.

FIG. 27 is a schematic representation of the EOF Display Dialog Box which lets the user control the highlighting of graph objects which have received or sent end of file indications, as shown in FIG. 19;

FIG. 28 is a schematic representation of the Data Collection menu which lets the user turn on and off, and control the frequency of, the monitoring and recording of performance information;

FIG. 29 is a schematic representation of the Display Time menu which lets the user control whether a given visualization window displays current or replayed performance information;

FIG. 30 is a schematic representation of the Replay Dialog Box which lets the user selected the time and forward or backward play speed of a replay;

FIG. 31 is a schematic representation of the drop down menu which a user can displayed for one or more selected operators;

FIG. 32 is a schematic representation of the drop down menu which a user can displayed for one or more selected communication ports;

FIG. 33 is a schematic representation of the drop down menu which a user can displayed for one or more selected operator instances;

FIG. 34 is a schematic representation of the drop down menu which a user can displayed for one or more selected communication port instances;

FIG. 35 is a schematic representation of the drop down menu which a user can displayed for one or more selected datalinks;

FIG. 36 is a schematic representation of the drop down menu which a user can displayed for one or more selected datalink instances;

FIG. 40 is a highly simplified pseudo-code representation of the putRecord routine, located in each process executing an instance of an operator in the parallel execution of a graph shown in FIGS. 1 and 5, which outputs records at an output port of that operator instance;

FIG. 41 is a highly simplified pseudo-code representation of the buildAndSendBlockSentMsg routine, located in each process executing an instance of an operator in the parallel execution of a graph shown in FIGS. 1 and 5, which can be called by both the putRecord routine of FIG. 40 and the getRecord routine of FIG. 42 to send messages to the performance monitor indicating that a block of records has been sent or received;

FIG. 42 is a highly simplified pseudo-code representation of the getRecord routine, located in each process executing an instance of an operator in the parallel execution of a graph shown in FIGS. 1 and 5, which inputs records at an input port of that operator instance;

FIG. 43 is a highly simplified pseudo-code representation of the main function of the performance monitor program shown in FIG. 1;

FIG. 44 is a highly simplified pseudo-code representation of the handletUDPMsg function called by the main performance monitor function of FIG. 43 to respond to performance messages received by the performance monitor from processes executing instances of operators;

FIG. 45 is a highly simplified pseudo-code representation of the updateGraphStateWithBlockSentMsg function which is called by the handleUDPMsg function of FIG. 44 and the updateReplayGraphState function of FIG. 46 to update the data structure representing the state of a graph being visualized for a given blockSent message received, respectively, from the current execution of graph or from a history of such messages previously received;

FIG. 46 is a highly simplified pseudo-code representation of the updateReplayGraphState function called by the main performance monitor function of FIG. 43 for each successive update to a graph being replayed from recorded performance messages;

FIG. 47 is a highly simplified pseudo-code representation of the blockPendingCheck function called periodically by the main performance monitor function of FIG. 43 during current execution of a graph to determine if any putRecord or getRecord calls have failed to return in a sufficiently long time that their associated ports should be marked as hung;

FIG. 47 is a highly simplified pseudo-code representation of the updateWindows3Dto2DProjection function called by the main performance function of FIG. 43 in response to a change in the focus, zoom, or view point of a 3D visualization. to map the 3D objects which appear in the 2D projection of the view into the coordinates of that 2D projection;

FIG. 49 is a highly simplified pseudo-code representation of the updateWindowsPixels function called by the main performance monitor function of FIG. 43 to update any pixels of a visualization window to reflect either the change in an object shown in that window or the motion of its datalink objects;

FIG. 48 is a highly simplified pseudo-code representation of the colorHistogramSegmentation function called by the updateWindowsPixels function of FIG. 49 to update the segmentation associated with the display of a datalink which represents a color histogram;

FIG. 51 is a highly simplified pseudo-code representation of the noodleSegmentation function called by the updateWindowsPixels function of FIG. 49 to update the broken segmentation used to represent data rate along a given datalink object;

FIG. 52 is a highly simplified pseudo-code representation of the drawLineSegments function called by the updateWindowsPixel function of FIG. 43 to draw the pixels associated with a given datalink object;

DETAILED DESCRIPTION OF PREFERRED EMBODIMENTS

Figure 1:
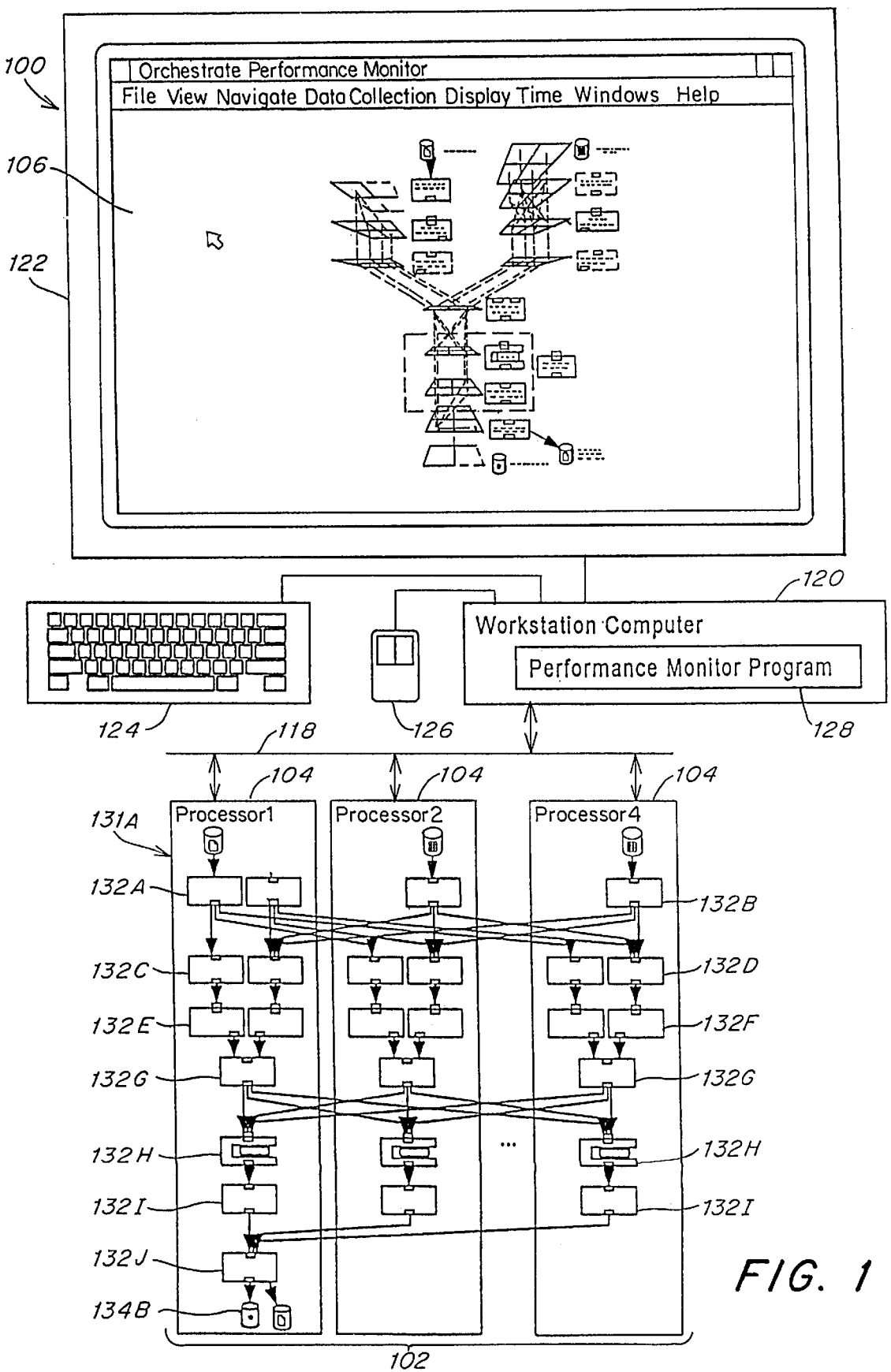
FIG. 1 is a schematic representation of a preferred embodiment of the present invention showing both the parallel execution of a graph on parallel processor nodes and a performance monitor program displaying a visualization of that execution.

FIG. 1 provides a high level overview of a system 100 which provides parallel execution 102 of a data flow graph 131A across a plurality of parallel processors 104. The system also provides a visual representation 106 of the performance of that parallel execution. This visual representation can be provided either in real time as the execution of the graph takes place, or in playback from data previously recorded from a parallel execution.

Figure 2:
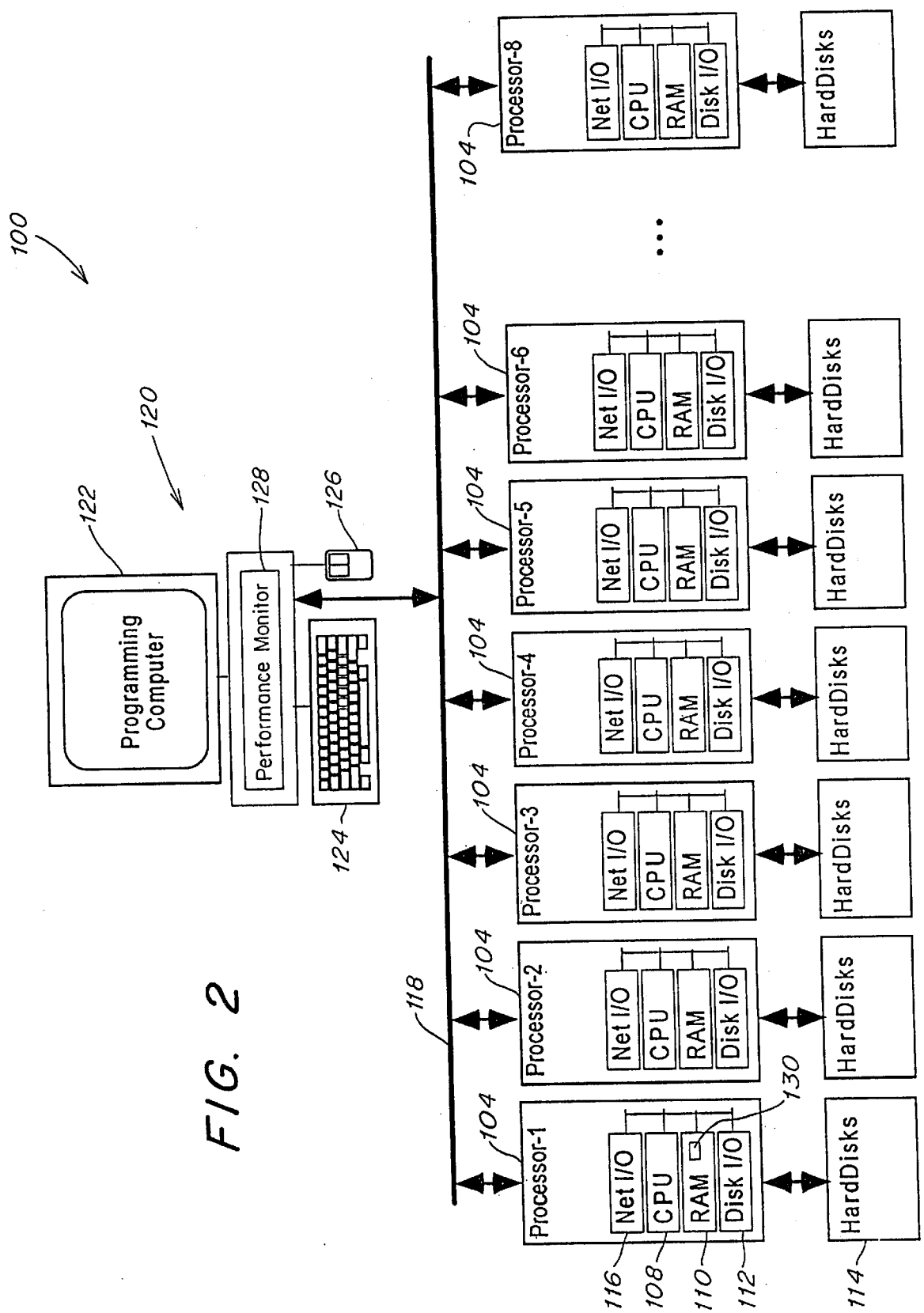
FIG. 2 is a schematic representation of one type of parallel computer upon which the present invention can be used.

In the preferred embodiment of the invention shown in FIG. 1 the system 100 is a so-called shared-nothing parallel computer system. A more detailed diagram of the hardware of such a shared-nothing system is shown in FIG. 2. Such a system is comprised of a plurality of processor nodes 104, each of which includes a high speed CPU 108, random access memory or RAM 110, a disk I/O controller 112, and one or more hard disks 114. Each such processor node also includes a high speed network interface 116 for communicating with other processors of the parallel processing machine over a high speed network 118.

Preferably the system also includes a workstation computer 120, which is also connected to the high speed network 118. The workstation computer is preferably used to enable a user to control the parallel processing machine, such as by giving instructions to execute specific parallel programs. In the preferred embodiment, it is on this workstation computer 120 that the performance monitor program 128 is located and run, and it is on the screen 122 of this workstation in which the performance monitor program projects the visualization of the execution of parallel data flow graphs.

The workstation computer 122 includes a keyboard 124 and a mouse 126 to enable the user to interact with the workstation computer so as to give it commands. The commands include commands to control the operation of the parallel computing machine, as well as commands to control the operation of the performance monitor program 128, including how the performance monitor presents a visualization of the execution of a parallel data flow graph.

As is explained in much greater detail the Beckerle et al. Application mentioned above, the system 100 uses one process 130, shown in FIGS. 2 and 5, located in one of the high speed parallel nodes of the system 100 to automatically conduct the parallel execution of a data flow graph. In FIG. 2 this process 130 is shown residing in the RAM 110 on the processor 104 labeled Processor-1. This process 130, called the conductor process, execute a user-written program defining one or more data flow graphs.

Figure 3:
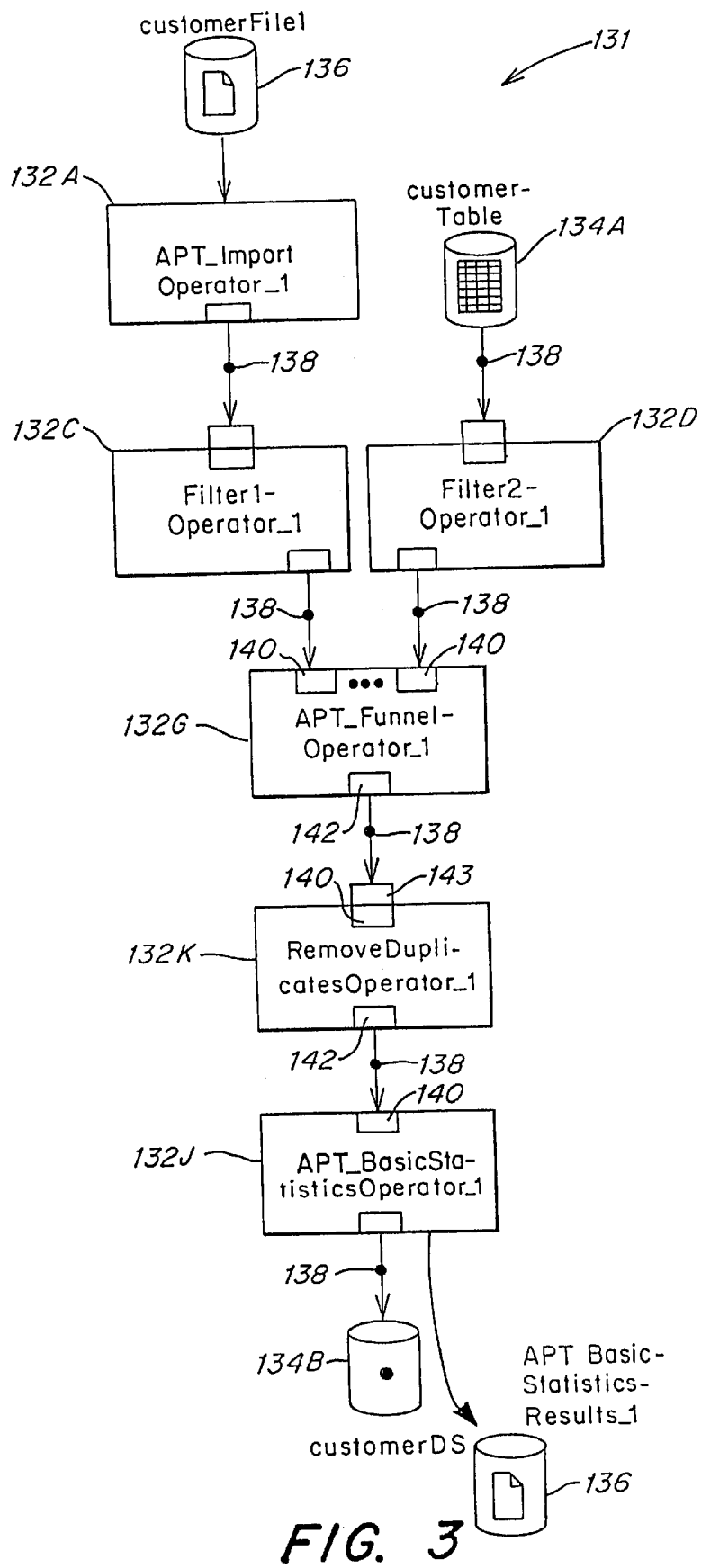
FIG. 3 is a schematic representation of data flow graph which has been created by a user and which is executed in parallel by the system as result of the steps shown in FIG. 5.

As is indicated in FIG. 3, each such data flow graph 131, is comprised of a plurality of modular programming objects including operators 132, persistent data sets 134, normal files 136, and datalinks 138. Each operator can include zero or more input ports 140 in which it can receive a stream of data from a datalink 138 and zero or more output ports 142, at which it can output such a data stream over a datalink 138. Each data datalink is normally comprised of a stream of data records. Each input or output port can have an adapter object 143 connected to it, which converts the name or type of one or more fields, respectively, supplied to or received from such a port.

Figure 4:
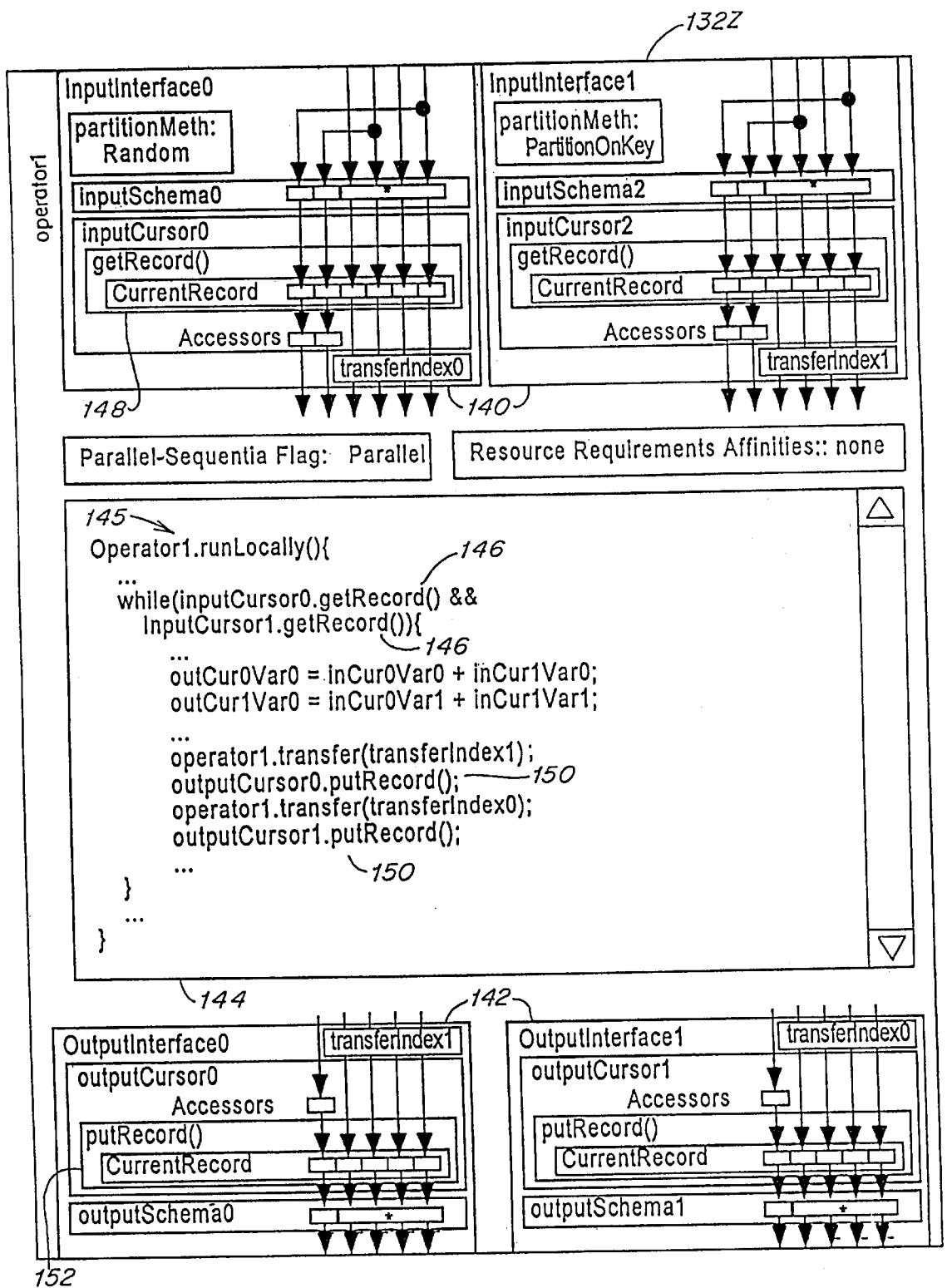
FIG. 4 is a schematic representation of an operator of a type which can be selectively put at a desired place in a data flow graph by a user of the system shown in FIG. 1 and then executed in parallel by that system as part of that graph.

FIG. 4 presents a highly schematic view of an operator 132Z of the general type which a user can combine together to define an executable data flow graph which the conductor process can execute. The particular operator 132Z has two input ports 140 and two output ports 142, at which the operator receives and outputs records, respectively. Each operator 132 includes a runLocally function 145. The runLocally function can perform virtually any allowable program, but normally it will include one or more calls 146 to a getRecord function 148 contained within each of its input ports to obtain the next record in the data stream connected to that port. Also it will normally include one or more calls 150 to a putRecord function 152 contained within each of its output ports to feed a record out through that port into its associated datalink. In addition, the runLocally program will also normally include extra instructions to perform tests or operations upon records or combinations of records as they pass into and or out of the operator. The conductor process 130 shown in FIG. 2 commonly executes a user written program which can contain one or more user defined data flow graphs of the type shown in FIG. 3. When the conductor process executes such a program, it separately performs the steps shown in FIG. 5 for each such graph in the program. These include a step 154 in which the conductor process assembles the definition of a graph 131 from statements contained in the program it is executing. These statements specify the individual operators, data sets, adapters, and datalinks of the graph and how they are connected, so as to define the graph. By "data sets" in this application we refer only to what are called "persistent data sets" in the Beckerle et al. Application, that is, data sets which actually store records in mass storage. By "datalinks" in this application we refer to both communication channels between operators, which are called "virtual data sets" in the Beckerley et al. Application and to communication channels between an operator and persistent data sets.

At the point in the program at which the user defined program instructs the conductor process to actually execute an individual graph, the conductor processor then executes steps 156, 158, 160, and 162.

In step 156 the conductor checks the user defined graph 131. It checks to see if the graph is a properly constructed graph which can be executed. It also notifies the user if the graph's structure is such that, although executable, it appears likely to produce undesired results. The check step 156 may actually insert operators into the user defined data flow graph. In the example of graph 131 shown in FIG. 5, the step 156 inserts a re-partitioning operator 132B to ensure that data is partitioned as desired by the operator below that inserted re-partitioning operator. It also inserts two buffer operators 132E and 132F to decrease the chance that there will be a data flow blockage at a point in the graph where two data flows come together into one operator. The graph check step 156 also replaces any composite operator in a user defined graph with that composite operator's associated subgraph.

Composite operators are operators which a user creating a graph can treat a one operator, even though they each actually represent a subgraph composed of one or more operators connected in a desired manner. In the example shown in FIG. 5, the operator 132K in the user defined graph 131, is replaced by its associated subgraph comprised of operators 132H and 132I.

Figure 5:
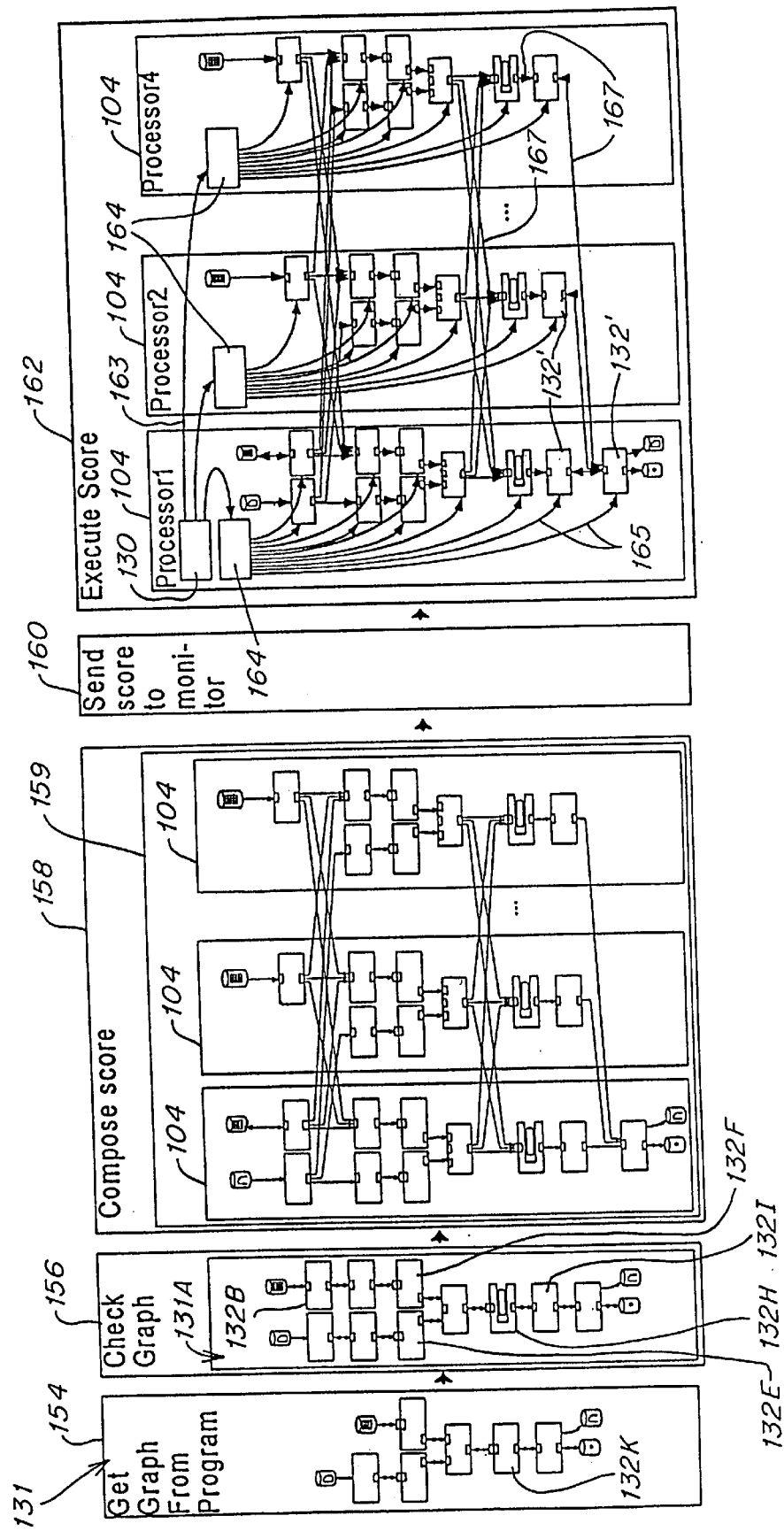
FIG. 5 is a schematic representation of the steps performed when a so-called conductor process running in one of the nodes of the parallel processors shown in FIG. 1 executes a portion of a program which contains a user defined data flow graph, such as that shown in FIG. 3.

Once step 156 has created a checked, and possibly modified, data flow graph 131A, a step 158 composes a score 159 for the graph. The score, which is represented schematically as a visual graph in FIG. 5, is actually a data structure which defines how the individual objects of the graph 131A are to be mapped across the various parallel processors 102 during parallel execution of the graph. Once this is done, a step 160 sends a copy of the score through the high speed network to the performance monitor program 128 shown in FIGS. 1 and 2 so that it will also know how the parallel instances of each objects in the graph are mapped across processors during parallel execution. In the preferred embodiment of the invention, the score sent in step 160 is an augmented score containing not only the information contained in the similar score described in the Beckerle et al. Application, but also additional information to support the performance monitor function, such as the textual names of operators and an explicit description the schemas of any data sets, input and output ports, and adapters in the graph.

Then in step 162 the conductor process actually causes parallel execution of the data flow graph, as is defined in more detail in the above mentioned Beckerle et al. Application.

In brief, this is done by causing the conductor process 130 shown in the diagram of step 162 in FIG. 5 to create a separate process 164 of its program on each of the parallel processors executing the graph and to establish a TCP/IP network communication link 163 for purposes of control with each such section-leader process. Each of these separate processes is instructed to execute a section-leader routine, which causes it to fork and create a separately numbered player process 132' on its processor for each operator in the data flow graph which the score has mapped onto that node. The section-leader process also establishes a TCP/IP network link 165 with each of its player processes for purposes of control.

Each player process 132' executes a separate instance of the executable program, and each is instructed to create a TCP/IP network communication link 167 with each other object instance in the parallel data flow graph to which its input or output ports are connected through a datalink. Each of these communication links 167 correspond to a parallel instances of a datalinks in the graphs 131A which is being parallelized. Each player process 132' is also instructed to read a copy of the score, determine which operator instance in the score its process number on its processor corresponds to, and start execution of the runLocally function associated with that instances operator. Once this is done, execution of the parallel data flow graph starts and records start flowing through the datalinks of the graph.

As is explained in greater detail below, each time an operator 132 or persistent dataset 134 makes a call to a putRecord function that causes a block of records to be sent over one of the operator's TCP/IP connections 167, the putRecord function sends a timed blockSent UDP network message to the performance monitor program 128 the high speed network 118. This blockSent message identifies the processor, number of the player process on that processor, and the communication port number on that player from which the block was sent. It also identifies the processor node, the number of the player process on that processor, and communication port number on the player process to which it is being sent. The blockSent message also includes the time at which the block of records was sent and the total number of records and total number of bytes which have been sent upto that time since the beginning of the current execution of the graph over its associated datalink instance. Since the performance monitor has a copy of the score, this information allows it to know the exact location of the datalink instance in the parallel graph to which the blockSent message pertains. It stores the total records sent, total bytes sent, and time stamp information of each blockSent message in the datalink's associated data structure in a real time graphState, a large data structure which stores all information on the current state of the graph's execution. The performance monitor also subtracts the the total data sent values, in records and bytes, in successive blockSent messages associated with a given datalink instance. It divides the resulting difference by the difference in the time stamps associated with each blockSent message, to obtain dataRate values in records and in bytes per second, respectively, and it stores these calculated dataRate values in the datalink's associated data structure.

Figure 6:
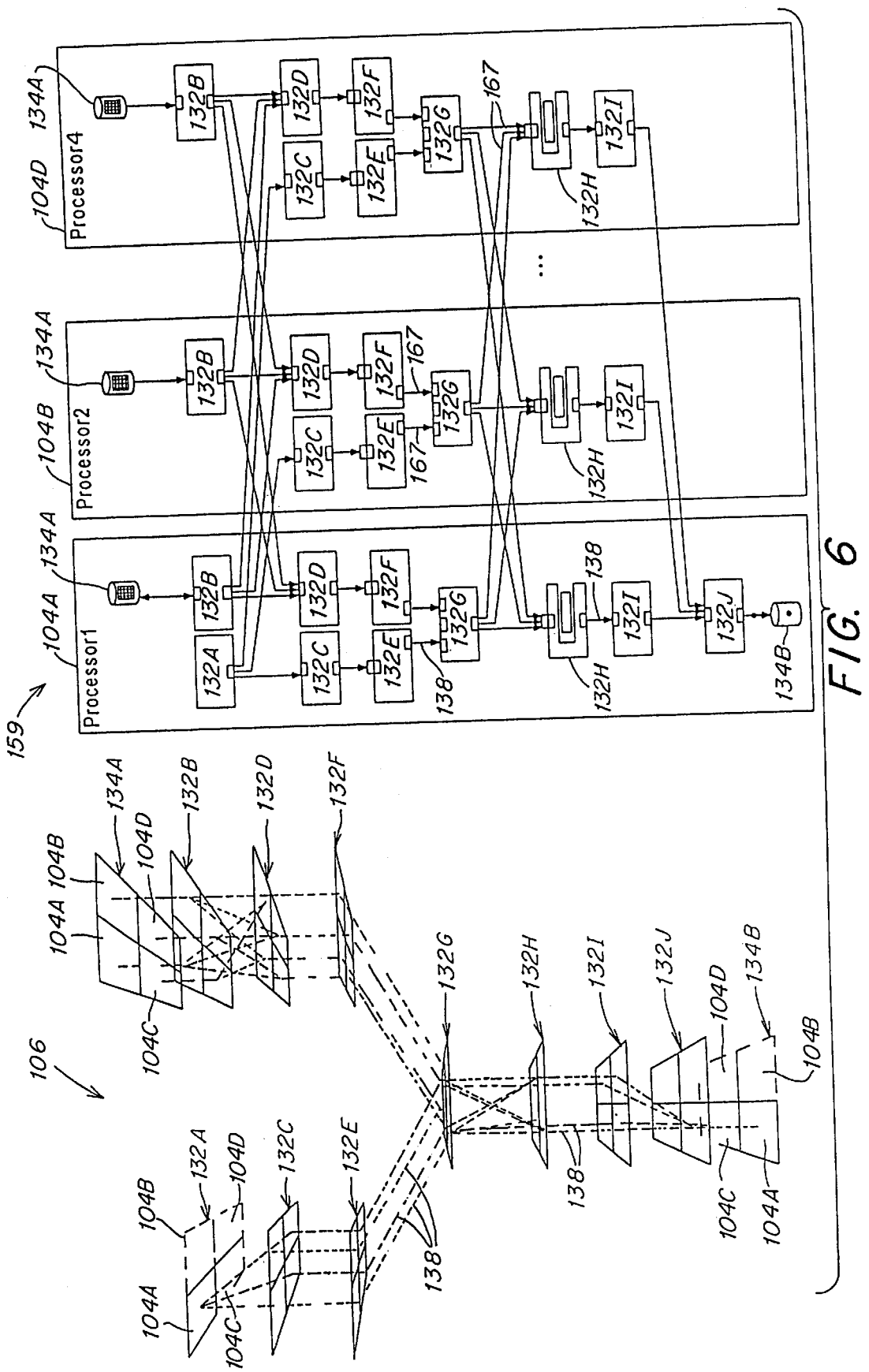
FIG. 6 is a comparison of a 3D By-Instances visualization produced by the system of FIG. 1 and the execution of the parallel data flow graph it represents.

FIG. 6 shows the how parallel instances of operators 132 and data sets 134 in the score 159 are mapped into a 3D performance visualization 106, generated by the performance monitor on the computer screen 122 shown in FIG. 1. As can be seen in FIG. 6, in the 3D visualization each operator 132 or persistent data set 134 is represented by a horizontal 2D array of horizontal rectangles, each of which represents an instance of the operator running on a separate processor node 102. We often call each such horizontal array of rectangles a "waffle" and each such individual rectangle within such an array a "waffle square".

In the example of FIG. 6, the parallel data set 134A is composed of an instance residing on each of the nodes 102A–D, each of which corresponds to a separate query executed on that node to a parallel relational data base management system, or RDBMS. Each such instance is represented by a waffle square labeled 102A through 102D in FIG. 6, corresponding to the labels in FIG. 6 of the processor shown in the score 159.

On the second level of the graph, going down, there are two operators represented. An operator 132A and an operator 132B. The operator 132A only has one instance running on processor 102A. The other processors 102B through 102D do not have any instance of the operator 132A running on them, and, thus, their associated waffle squares in the waffle for operator 132A are represented in dashed lines. The other operator on the second level, operator 132B, has an instance located on each of the four nodes shown in the graph, and, thus, none of its waffle squares are dashed.

If one goes down each of the nine levels of the graph, one can see that it represents a faithful mapping of each of the instances of each operator executing the score 159.

The individual lines connecting two waffle squares at different levels in the 3D visual representation 106 represent individual datalink instances 138, which correspond to the TCP/IP links 167 shown in the score 159. Where a given output port instance feeds only a oneinput port instance on an operator below it on the same processor, as is commonly the case, the lines flowing between the separate instances of such operator will be parallel. This is illustrated, for example, between the waffle squares of the operator 132C and 132E in the visualization 106. Where the records of a data stream are re-partitioned at the output port of an operator in the data flow graph, each instance of that output port will normally supply records, based on the partitioning scheme, to each instance of an input port in the consuming operator at a level below in the graph. This causes crossed, as well as parallel, datalink lines at the operator's output. This is illustratedbetween operators 132B and 132D and between operators 132G and 132H in the visualization 106 of FIG. 6.

In the visualization 106, the volume of data flow in a given instance of a datalink is indicated both by the relative density of the line representing that link and in the velocity of that line. The relative density of given line is a function of what percent of its length is comprised of line segments in which pixels which are turned "on", or colored, as opposed to line segments in which pixels are "off". or transparent. We often refer to the "on" segments as "noodles". The velocity of a datalink instance is the rate at which its noodles travel downward along the datalink intance's associated line. A user watching the visualization operates sees noodles fall down between levels somewhat like rain drops. He or she can see an indication of the speed of the data flowing along each such datalink instance as a function of both its density and speed.

In the standard view the squares of a waffle representing individual processors have different colors, and the user can select, among other options, to have the noodles of each individual datalink colored according to the color of either their source or destination waffle square, so as to make it easier to separately distinguish the data rate representation of each individual datalink. The fact that datalinks are normally represented as lines containing "off", or transparent, segments as well as noodles in which pixels are "on", makes it much easier to see lines that are behind other lines or which cross behind them. We refer to this ability to see through the discontinuities in a datalink instance's moving lines, so as to see parts of other lines behind it, as "pixel sharing".

The visualization in FIG. 6 only shows four processors per waffle for purposes of simplification. The performance visualizer can be used with parallel computers containing a much larger numbers of nodes, such as, for example, sixteen, sixty-four, two hundred and fifty-six, one thousand and twenty-four, or more nodes. The use of 2D arrays, or waffles, to represent the various instances of an operator running on different processors make it possible to represent such large numbers of processors on a screen. For example, an operator running on one thousand and twenty-four processors could be represented as a waffle with thirty-two2 rows and columns of waffle squares. That is few enough rows and columns that in many views the individual waffle squares associated with each instance of an operator would be separately visible.

As the number of operator instances grows judging the data flow between parallel operators can become somewhat akin to judging the volume of rainfall by judging the size and velocity of rain drops. As will be explained below in greater detail, the visualization tool comes with a 3D navigation tool, which enables the user to rapidly zoom in on sites of interest within the data flow graph so individual datalink instances can be made to stand out even among many thousands of such instances.

Figure 7:
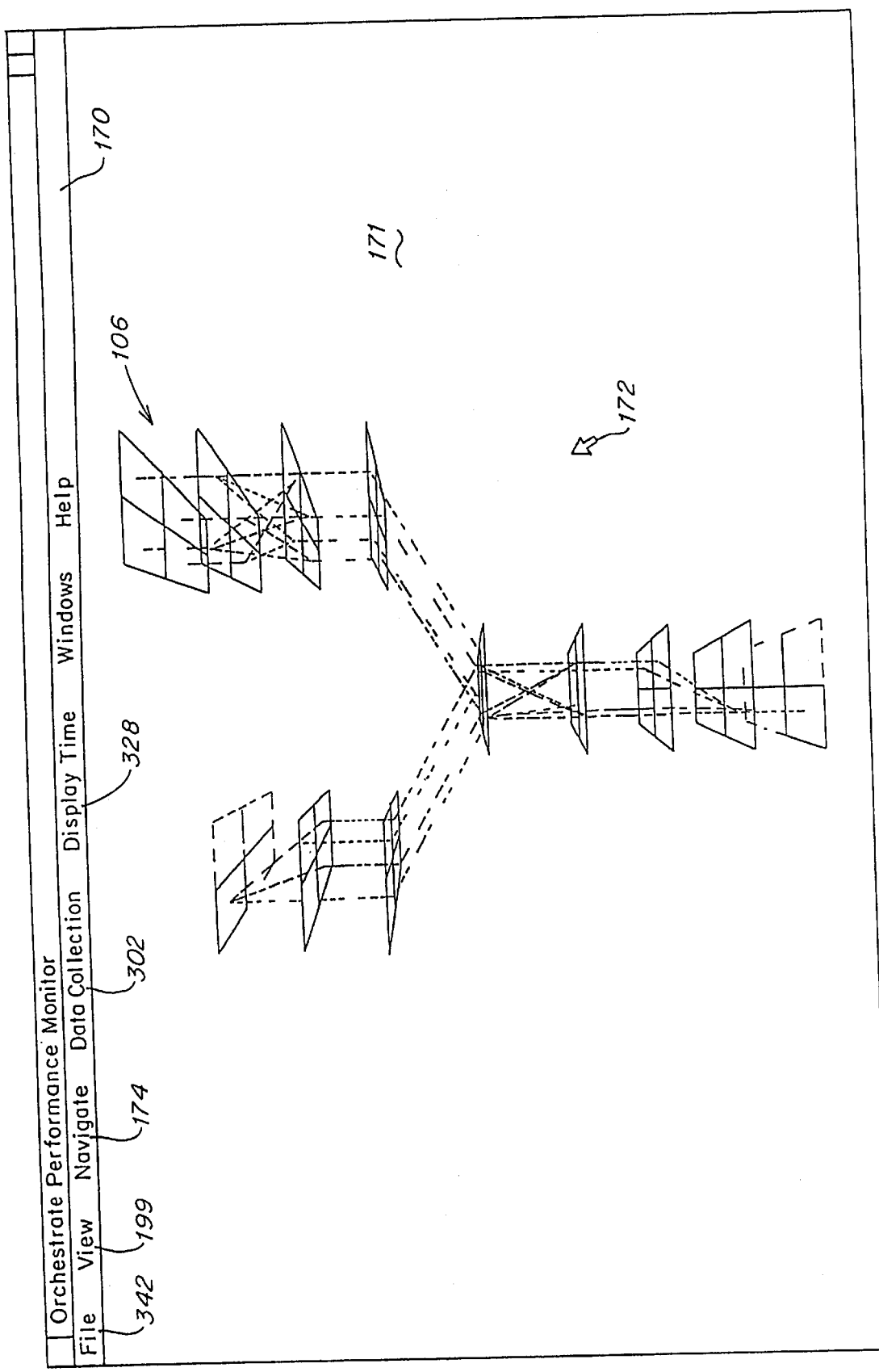
FIG. 7 illustrates a window produced by the performance monitor program shown in FIG. 1 containing the 3D visualization shown in FIG. 6, and including the top-level user interface menu of that program.

FIG. 7 represents a view of the main window 171 of the performance monitor program 128, shown in FIG. 1. FIG. 7 shows the visualization 106 discussed in FIG. 6. This window includes a top level menu 170, which enables a user to access many of the performance monitors functions by clicking on the named items in that menu with the mouse pointer 172 shown in FIG. 7.

As is explained below in more detail, the performance monitor's user interface includes not options available from the top level menu 170, but also options available from drop-down menus which can be evoked by clicking on individual objects in the visualazation window, such as operators, communication ports, datalinks, and instances thereof.

Figure 8:
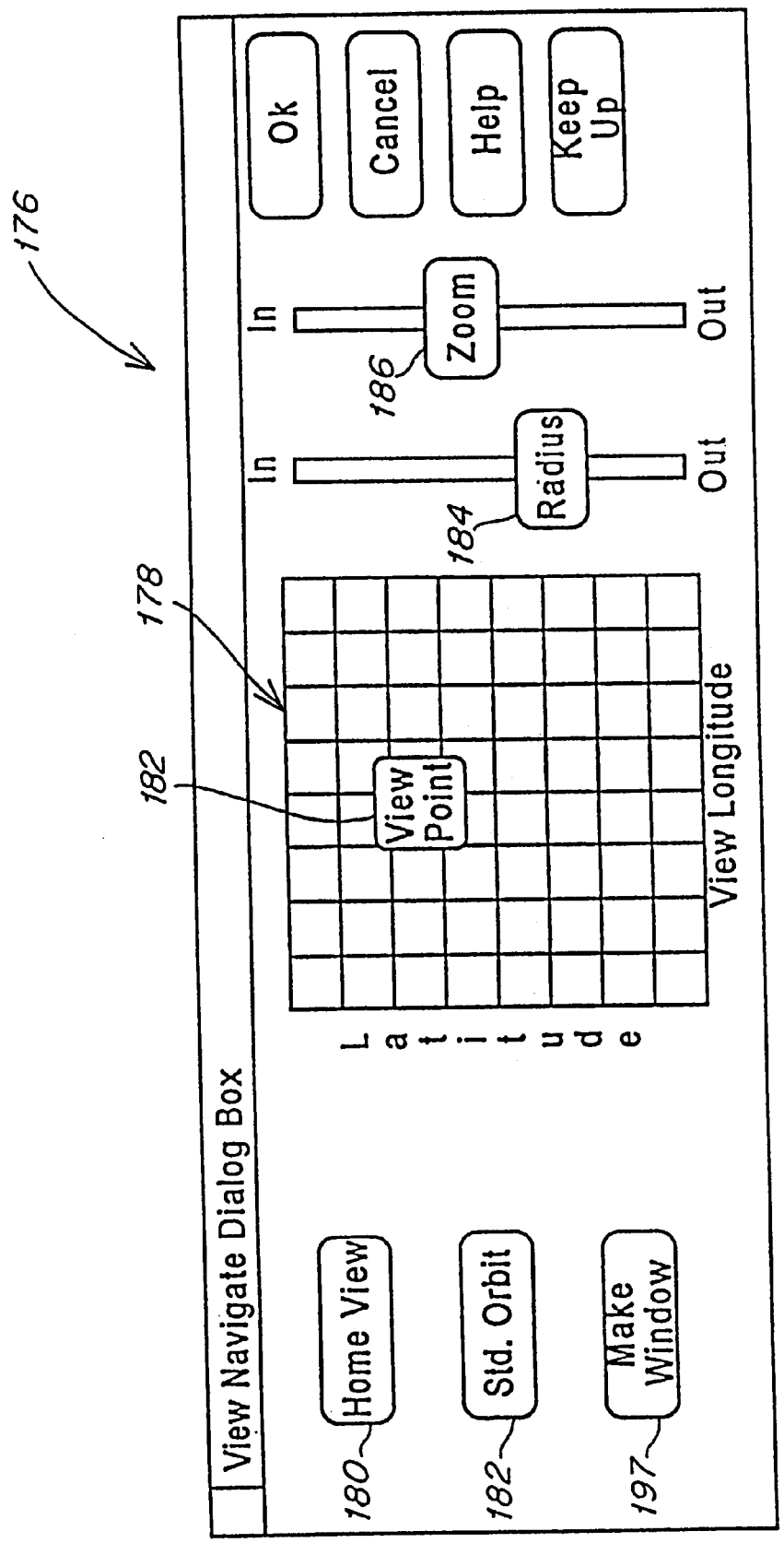
FIG. 8 represents the system's View Navigate Dialog Box, which allows the use to control the angle, distance, and magnification of a the view of a 3D graph shown in the visualization window of FIG. 7.

If the user clicks on the "Navigate" item 174 in the top level menu 170, the View Navigate Dialog Box 176 shown in FIG. 8 pops up on the screen.

The longitude/latitude control 178 shown in the center of the dialog box enables the user to control the horizontal and vertical angle of the point in 3D space from which a view focus point in the data flow graph is viewed in the performance monitor's visualazation window 171. The view from the selected view point is always centered on the view focus. The performance monitor automatically starts in a home view in which this view focus point is at the center of the graph. As will be explained below, the user can double click on any object in the graph and a drop-down menu will appear for the object which includes the option of making that object the new view focus. If the user wants to return the focus to the center of the graph, he or she can click on the Home View button 180 of the View Navigate Dialog Box, which returns to the standard view of the data flow graph shown in FIG. 7.

The user can change the view point by using a mouse to drag a view point button 182 along the longitude/latitude grid 178. If the user pushes the viewpoint slider off the grid to either the right or left, it automatically moves to the opposite side of the grid and continues its motion from that point, enabling the user to continuously move around a graph if desired. As the user moves the view point relative to the focus point with the longitude/latitude control 178, the view in the vizualization windows stays centered on the current focus point.

The radius slider 184 enables the user to change the distance in three dimensional space of the visualization window's viewpoint from the current focus. The zoom control 186 enables the user to zoom in or out on the focus. Zooming does not change the perspective in the visualization window, only its magnification. Using the radius slider, on the other hand, changes not only the relative size of objects but also the relative expansion or contraction and angular displacement due to the effects of changing perspective.

As the user moves the view slider on the longitude/latitude control 178 or the zoom and radius sliders 184 and 186, the view in view window 171 changes simultaneously, giving the user accurate feedback in finding a desired viewpoint and magnification. One of the benefits of the performance monitor is that the combination of a 3D views and 3D navigation allows a user to zoom in on an area of interest and use the effect of perspective to allocate an increased portion of the screen and its pixels toward the object being focused on, making it easier to observe the performance characteristics of a individual object amount thousands in a graph.

The view navigate box also includes a standard orbit button 188 which causes the view point to rotate around the home view's standard focus point in an elliptical orbit. This elliptical orbit is in a plain tilted relative to the focus, and its long axis slowly rotates around the focus over successive orbits. This provides a quick and easy way for a user to constantly view the visualization graph from different view points. The view navigate box also includes a Make Window button 197 which creates a separate visualization window for the current zoom, focus point and viewpoint longitute, latitute, and. This enables a user to save a given view of the graph in a separate window which can be referred to later.

FIG. 9 represents a hierarchical view of the View Menu 198 which can be accessed by clicking on the word "View" 199 in the top level menu 170 shown in FIG. 7. In the view of FIG. 9 the items 200 through 213 indented one level are the top level items of the View Menu which the user will see if she or he clicks on the "View" on the top level menu 170. The items at each further level of indentation represent items of a sub menu which are accessed by selecting the item under which they are indented in this hierarchical representation.

Figure 10:
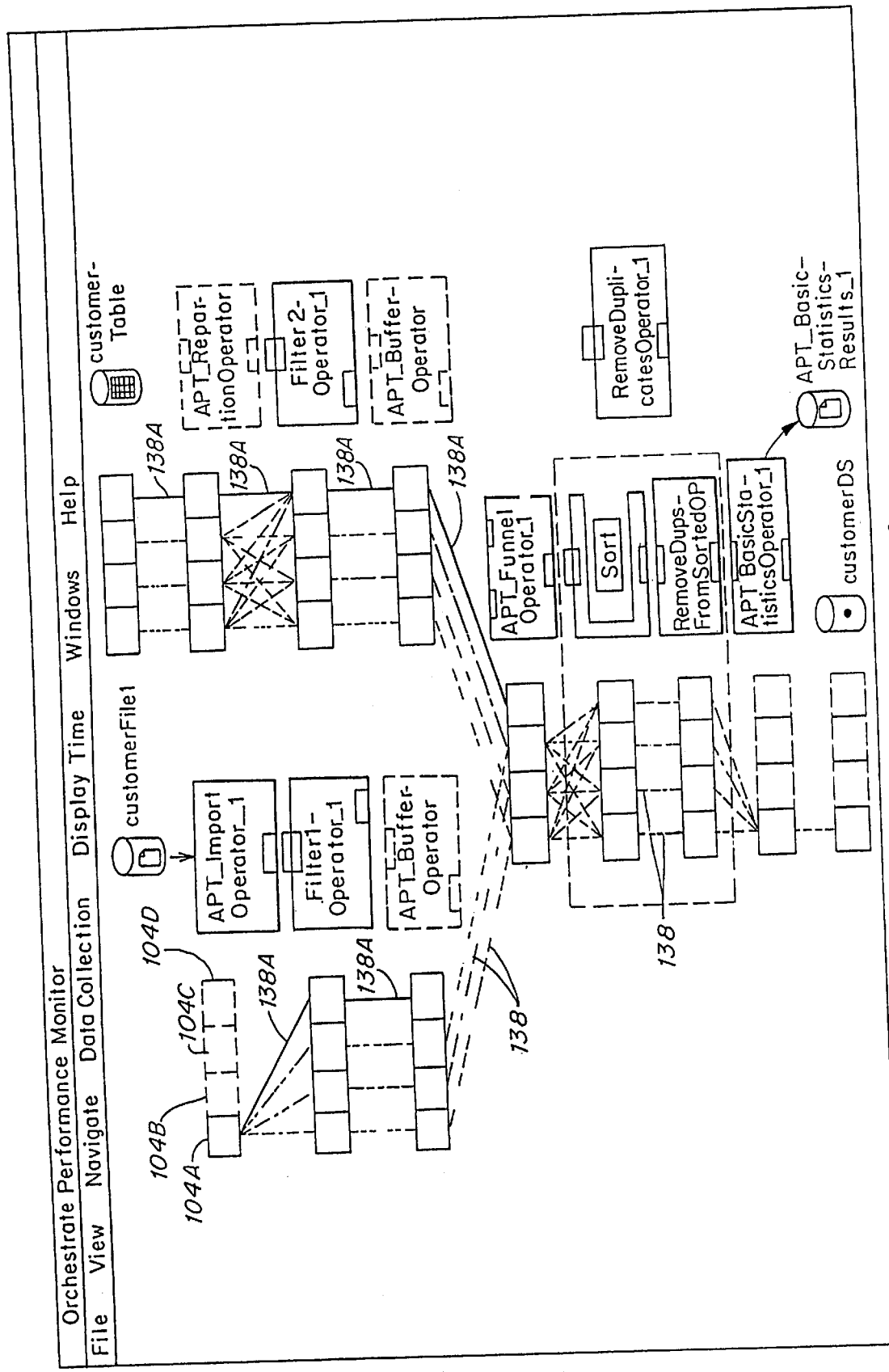
FIG. 10 is a 2D By-Instances view of the graph shown in FIG. 7 with labels attached to the operators and data sets of the graph, and with solid lines highlighting datalinks assumed to be blocked for purposes of example in that view.

If the user selects "2D Views" 200 in the View menu 198, she or he will be presented by a 2D Views sub menu including of items 216 and 218. If he or she selects the By Instances item 216 from that sub, the performance monitor will present a 2D view of the graph being shown in the visualization window 171, as shown in FIG. 10, in which the individual instances of each operator are represented. When a 2D view is shown, if the View Navigate Dialog Box is popped up for that view, the Longitude/Latitude control is replaced with a similar Horizontal/Vertical control which control the horizontal and vertical position of the center of the view. The zoom slider works the same, but there is no radius slider since there is no perspective. Furthermore, their is no view focus in the 2D view. Also, in the 2D instance view, the vertical thickness of the rectangles representing the individual processors instances of an operator remain constant as one zooms in on a particular location in the graph.

The 2D By-Instance representation, shown in FIG. 10, is quite useful when the number of nodes being used is relatively small, such as 4, in the example shown in FIG. 10. However, if the number of processor nodes expands, 2D representation makes it increasingly difficult to see individual representations of the instances of a given operator at one time on the screen. It also does not allow the user the freedom to vary the relative size and position of object shown as is made possible by changing viewpoints and magnification in three dimensional views.

Figure 11:
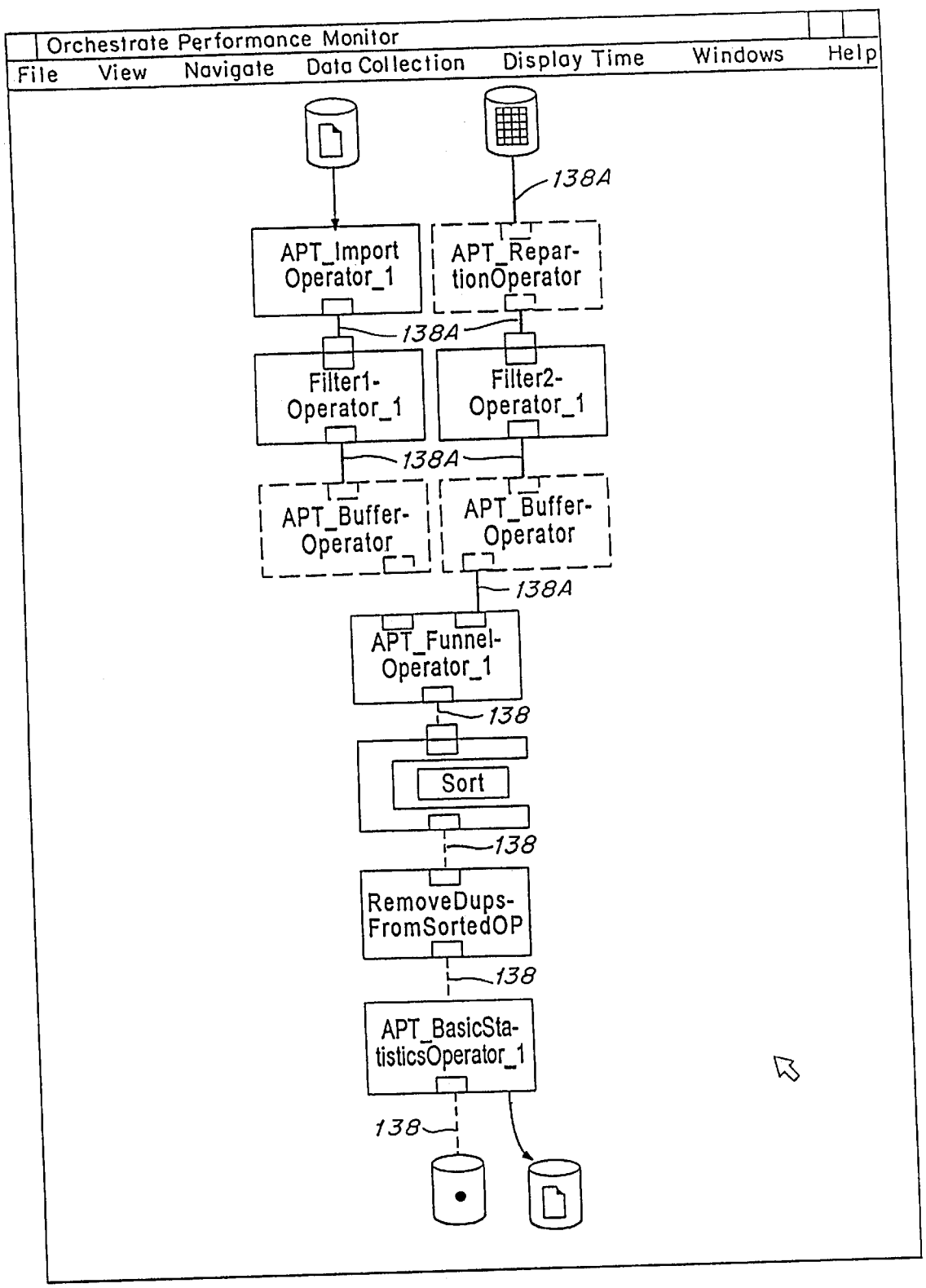
FIG. 11 is a 2D By-Operators view, which is similar to that shown in FIG. 10 except that the instances of each operator have been collapsed into one composite representation for each operator.

If the user selects the By Operators menu item 218 shown in FIG. 9, the visualization window represents the data flow graph in a 2D representation in which all of the one or more instances of each operator in the graph are represented by one composite representation, as shown in FIG. 11.

In the 2D By-Instance representation in FIG. 10, data rate along datalink instances 138, are represented by the same sort of variable speed and variable density as are the datalinks instances 138 shown in the visualization 106 of FIG. 6. In the 2D By Operators representation of FIG. 11, the average of the data rates along each datalink instance represented is represented by such a noodle flow along each unparallelized datalink 138.

In the examples shown in both these figures, however, it is assumed that certain of the datalinks or datalink instances, those labeled 138A, have become blocked and that the user has selected to indicate such blockagesby a solid line, preferably of a bright color, to draw attention to the fact that such blockages represent a problem in the computation of the graph. In the 2D composite view shown in FIG. 11, if any datalink instance represented by a composite datalink representation contains a blocked flow, the composite datalink is highlighted by a solid line, as is indicated by the datalinks 138A in FIG. 11.

If, in the View menu shown in FIG. 9, the user selects "3D Views" 202, a 3D Views sub menu including the items 220 and 222 appears.

If the user selects the Expansion Level item 220 in the 3D Views sub menu, she or he is presented with the Expansion Level sub menu comprised of items 228 through 236 which provide the ability to select to display a 3D graph in different degrees and dimensions of expansion.

If the user selects the "By Instances" item 228 in the Expansion level sub menu, he or she will see a 3D view similar to that shown in FIGS. 6 and 7 in which individual instances of each operator are represented as a waffle square in a waffle representing that operator in three dimensional space.

If the user selects the By Operators item 230 in the Expansion Level sub menu, the system will replace all the waffle squares of the waffle representing an operator with one composite square representing all instances of that operator, and will combine all the intances of a datalink between any two operators which have been collapsed in this manner into one composite datalink representation, similar to that shown in the 2D By Operator, example of FIG. 11.

Figure 12:
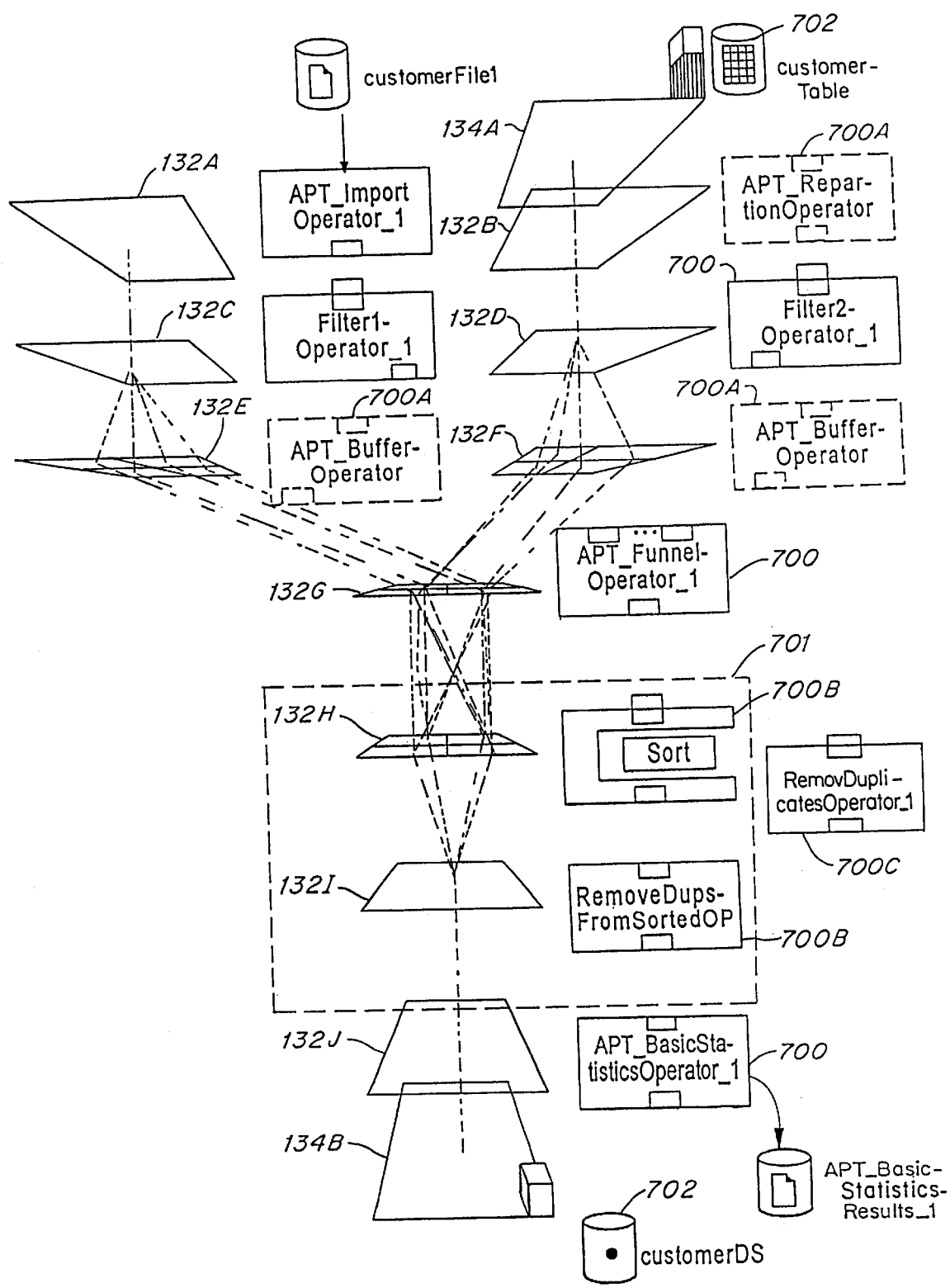
FIG. 12 is a 3D view equivalent to that shown in FIG. 7, except its operators and data set objects are labeled and all such objects at the top and bottom three vertical levels of the graph have been collapsed into one composite representation for each operator.

FIG. 12 shows how the graph of the 3D By-Operator visualization 106 shown in FIG. 6 and FIG. 7 looks after each of its operators have been collapsed by selection of the By Operators item 230 into a single square and then after the user has selected, by picking the drop-down menus associated with individual operators, to expand the instances of operators 132E, 132F, and 132G and 132H, leaving only operations 132A–D and 132I and J and data sets 134A and 134B collapsed into single squares. In the example of FIG. 12, the user has selected to associate bar graphs with the datasets 134A and 134B. These bar graphs represent the amount of data read from or written to each of these data sets, respectively. By collapsing the representation of all the instances of the various partitions of these datasets into one object, the user enables the bar graph associated with each such data set to represent a composite value, indicating the sum of the data read or stored over all of each data set's partitions.

Figure 13:
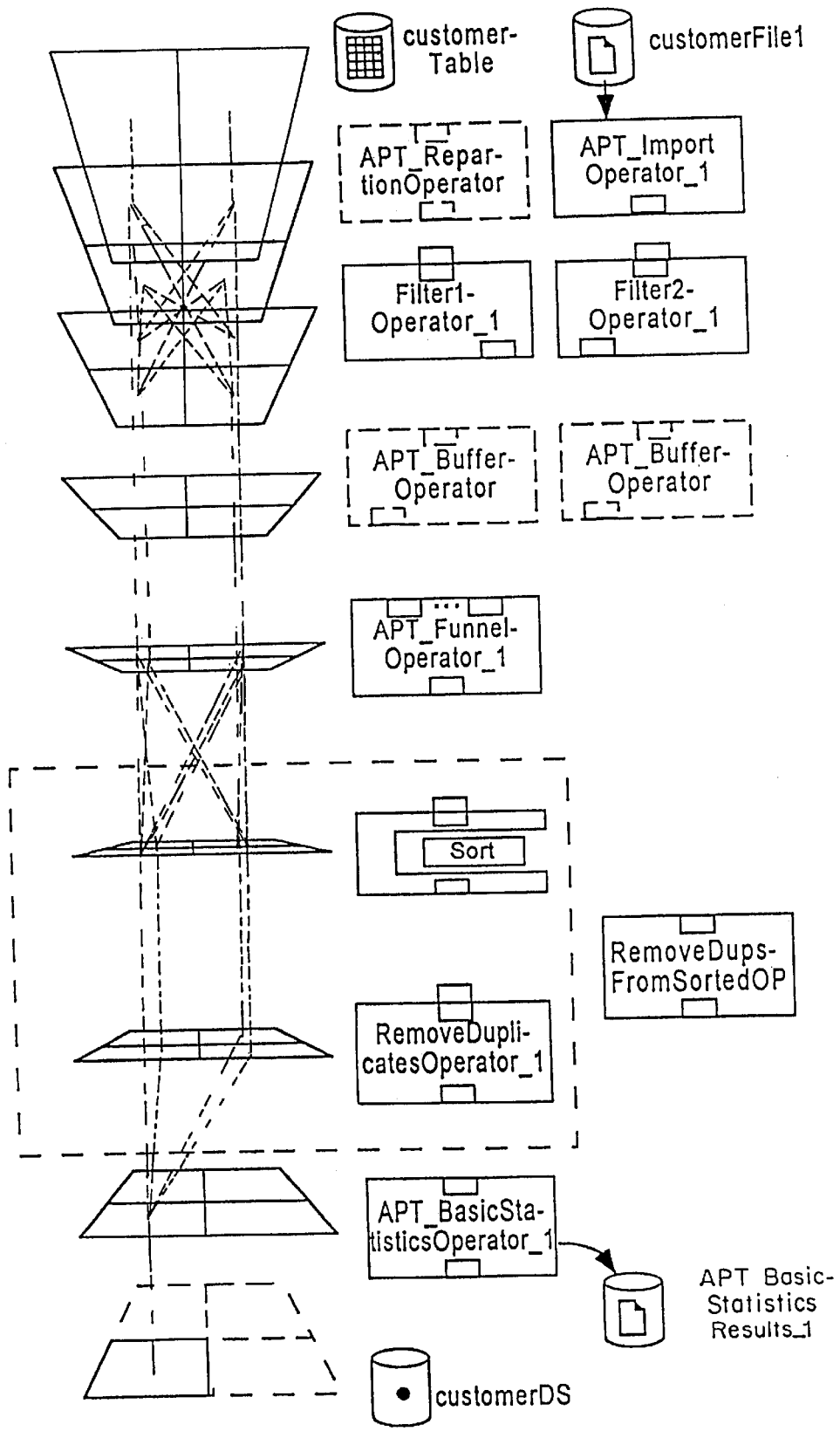
FIG. 13 is a 3D By-Levels view of the graph shown in FIG. 7 in which the representation of all of the instances of one or more operators running at each vertical level of the graph are collapsed onto a square in an 2D array of such squares, each of which represents all the operator instances running at that level on a given processor node.

If the user selects the By Levels option 232 in the Expansion Level submenu, all of the operator instances running on a particular node at a particular level in the graph are collapsed into a waffle square representing that processor. This is indicated in FIG. 13, in which the entire graph shown in FIG. 7 has had all of the operator instances at each level running on a given node combined. In the view of FIG. 13, each level is labeled to indicate the operator or dataset part, represented by its associated waffle. As can be seen, the second through four levels of the graph each contain waffles representing a composite of different operator instances.

Figure 14:
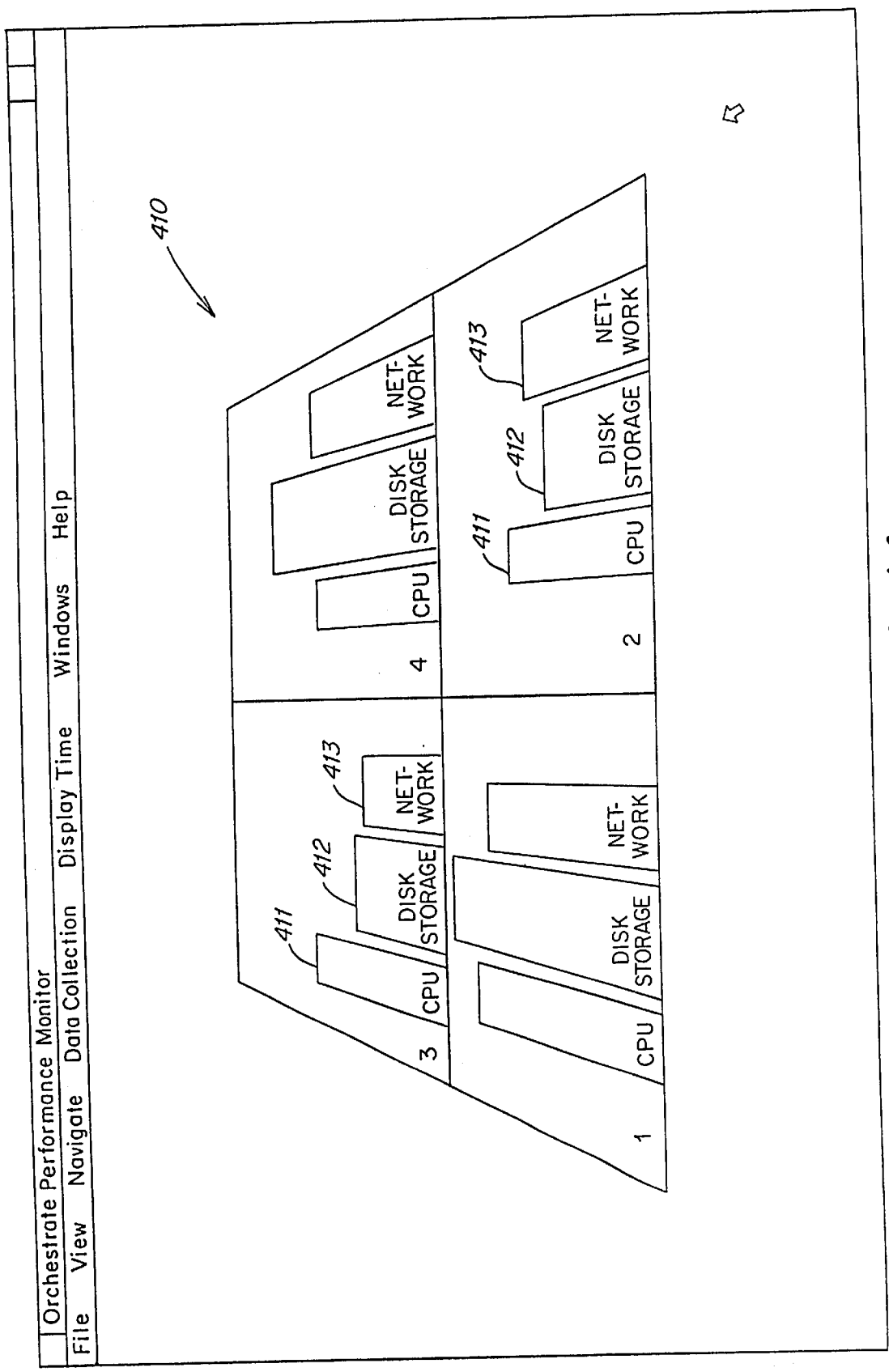
FIG. 14 is a 3D By-Processor view of a graph's execution in which all of the instances of all operators running one each processor are represented by one square in an array of squares representing all of the processors in the parallel computation, and in which bar charts representing CPU, disk, and network usage by each node operator are placed on the square representing it.

If the user selects the By Processors option 234 in the Expansion Level submenu, the effect will be to compress all of the levels shown in FIG. 13 into one waffle with each square representing an individual processor node, as is shown in FIG. 14. In this view communication links will normally not be shown, but a user can select to have bar graphs imposed on the square of the waffle representing information such as total data flow usage, total data communication over FCP/IP links. total disk usage, percent of CPU utility usage, and other statistics of interest. In FIG. 14 bar graphs 411, 412, and 413 on each processor node's waffle square represent the percentage of the nodes CPU, disk, and network capacity currently being used, respectively.

If the user selects the By System option 236 in the Expansion Level submenu, the system produces one square on which the user can select to display composite information for the entire system, such as total network communication rate, total disk IO rate, average percent of CPU utilization, and other Such statistics.

As was discussed above with regard to FIG. 12, when a user selects the By Operators option 230 for the an entire graph, he or she can then select to view an individual operator in a more expanded By-Instances view. Similarly, when a user selects either the By Level, By Processor, or By System options 232, 234, or 236, respectively, she or he can then select to view a given operator, level, or processor at a more expended level.

For example, if the user selects to display labels for operators, each operator associated with a composite By-Levels, By-Processor, or By-System representation will have its label placed next to that composite representation, as is shown for the case of By-Levels representations in FIG. 13. The user can then select an operator by selecting its label and then use the operator's drop-down object menu to select a greater degree of expansion for it. In the case of the By-Processor or By System views, the labels associated with each separate level of the graph are preceded by a level markers, and the user can select a level by selecting its level marker.

If the user selects to expand less than all but one operator in a level represented in a By-Levels view, the remaining unselected operators will be represented by a composite, By-level representation. If the user selects one or more adjacent level in a By-Processor or By-System view, either by selecting their level markers or the labels of one or more operators at each such level, the representations of those levels is split out from the By-Processors or By-System view. If the separately represented levels occur other than at the top or bottom of the graph, all of the unexpanded levels above the expanded levels will be represented by one composite, By-Processor one By-system, representation and all those below it will be represented by another such composite representation. This allows graphs having many vertical layers to be vertically compacted, with only layers of current interest vertically expanded, while at the same time showing the data flow between such vertically expanded levels and the composite operator or operator instances above and below them.

Figure 19:
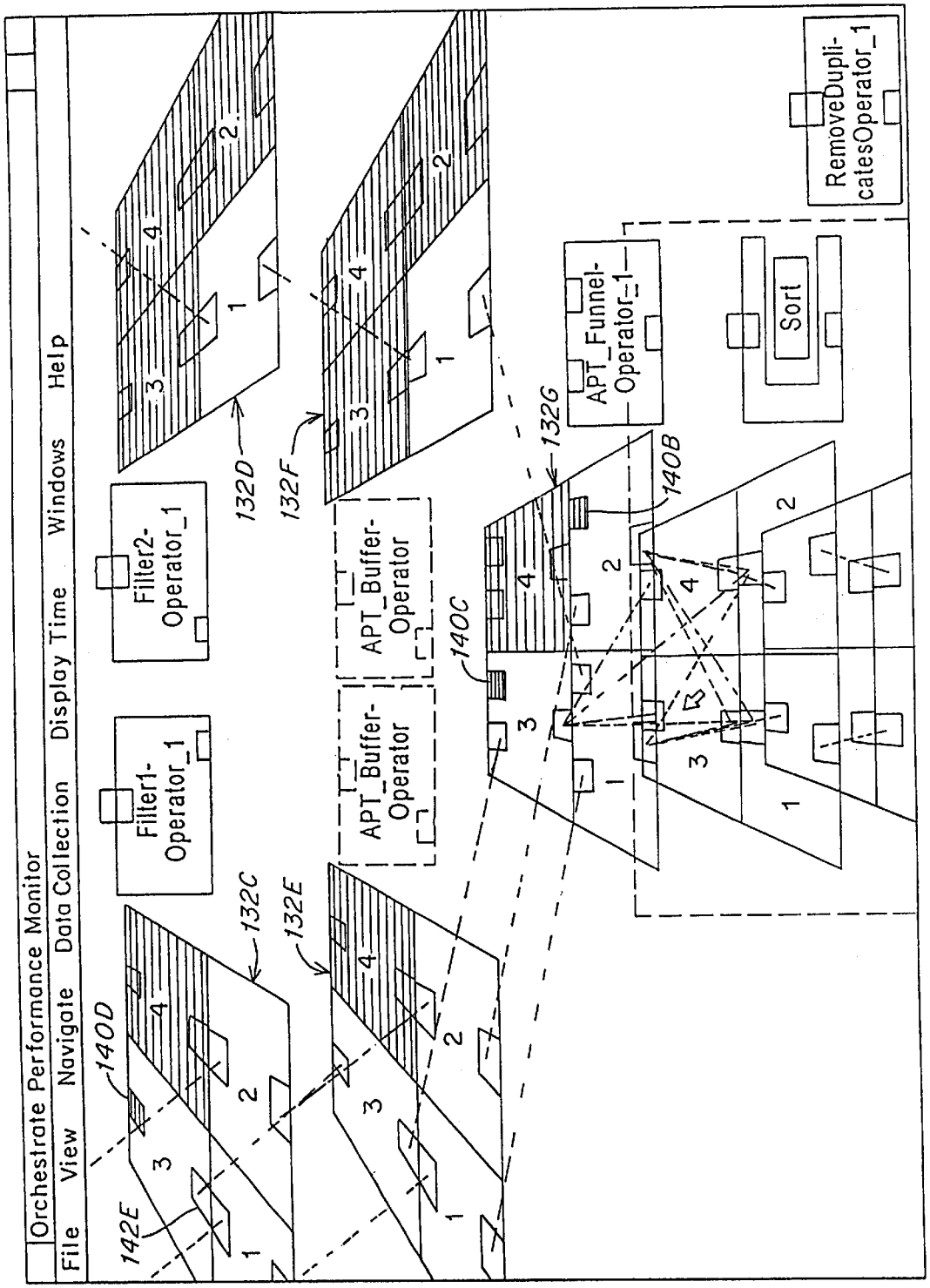
FIG. 19 is a view similar to that in FIG. 17, except that it is later in the execution of the graph, the user has zoomed in on the center of the view, has turned off display of bar graphs, and has turn on highlighting of EOFs, or End Of Files, which have been received by various parts of the graph.

Returning to the top level of the View Menu, if the user selects the "Display Port" item 203 the individual input and output ports on operators or operator instances will be displayed in the visualization window and the projection of datalinks or datalink instances between operators or operator instances will be connected to their corresponding input and output ports or port instances. All of the input ports will be projected along the back edge of the operator square, that is, that furthest away in the home view, and all of the output ports will be projected on the front edge of the operator square, that located nearest in the home view. This is illustrated in FIG. 19. If an operator, such as the operator at 132G shown in FIG. 19, has more than one input port or more than one output port, particularly when data going into or coming from that port is being re-partition, this Display Ports option helps the user separately monitor the datalinks connected to each such port.

If the user selects the "Datalink Display" item 204 under the top level Views Menu, the Datalink Display Dialog Box 260, represented schematically in FIG. 20, is displayed. When this dialog box is popped up from the View Menu it applies to all datalinks and datalink instances in the current visualization window. If, as is explained below, it is evoked for one or more selected objects such as operators, ports, or datalinks, or instances of them, the selections made in it only apply to those selected objects.

Figure 21:
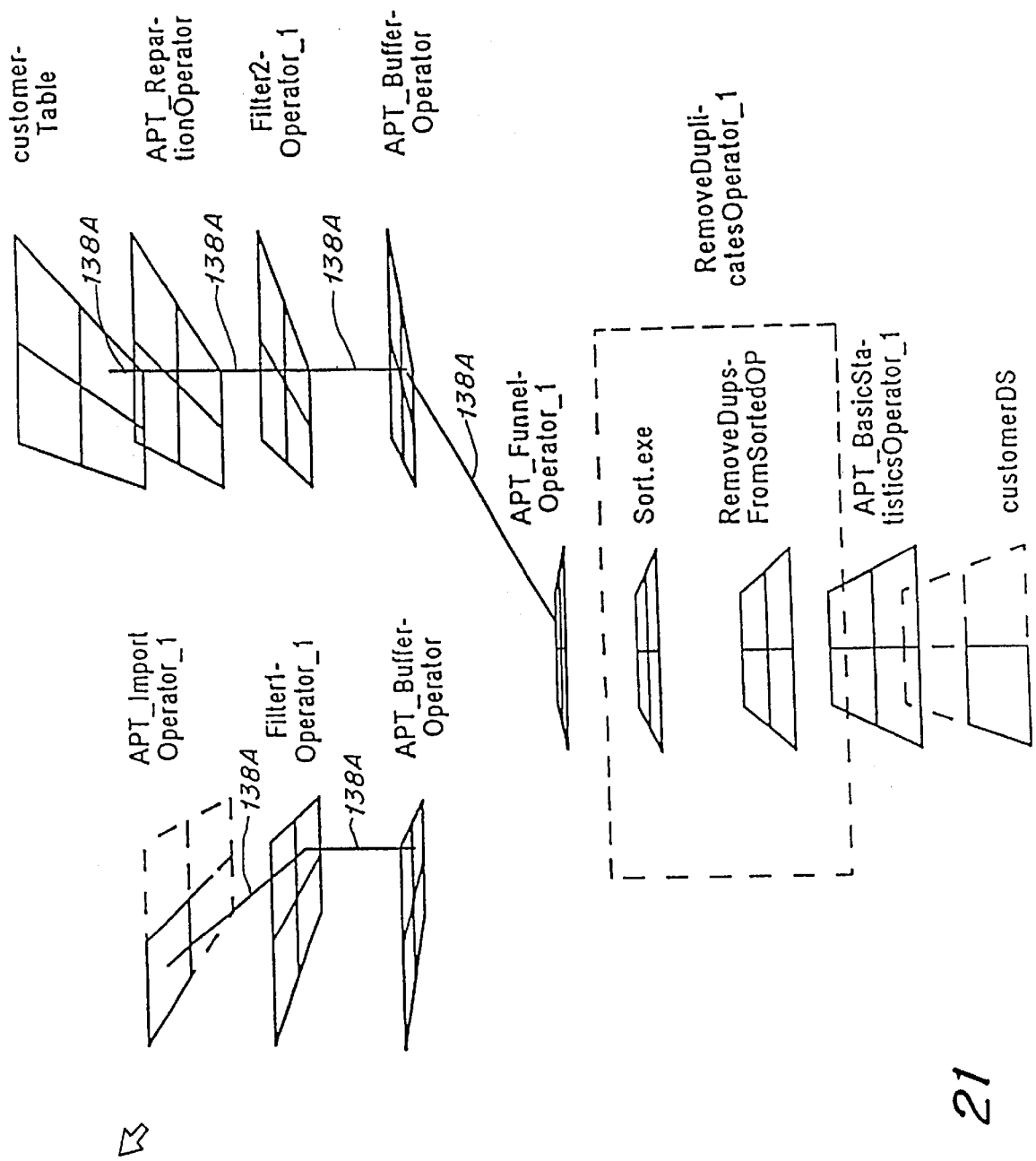
FIG. 21 show a visualization similar to of FIG. 7 except that the display of all datalinks has been turned off except for datalinks which have flow blockages, and it is assumed, as in FIGS. 10 and 11, that the highlighted datalinks have such blockages.

The Datalink Display Dialog Box includes a checkbox 261 which lets the user turn on or turn off the display of all datalink or datalink instances associated with the dialog box. This can be useful, for example, if the user wants to reduce the clutter of a visualizatin by first turning all datalinks off by using the dialog box from the View Menu and evoking it for an individual object to turn on than object's particular datalinks. It also can be useful to turn off all the datalinks, as shown in FIG. 21, and then set the system to indicate data flow blockages by solid lines. In FIG. 21 the same data flow blockage along datalinks 138A are shown as are shown in FIGS. 10 and 11, except that in FIG. 21 they are shown in a 3D By-Instances view rather than the 2D views shown in FIGS. 10 and 11.

The Datalink Display Dialog Box also includes a group of mutially exclusive radio buttons grouped in lines 264A–G. These radio buttons enable the user to select the scheme by which all the individual datalinks or datalink intances in the visualization will be colored. The radio buttons on line 264A let the user select to color each datalink or datalink instance by its associated source operator or by its associated processor node. The radio buttons on line 264B enable such coloring by destination operator or by destination node. The radio buttons on line 264C enable such coloring as a function of flow rate along each datalink or datalink instance in terms of either records or bytes. The radio buttons on line 264D have the same effect as those in line 264C, except they cause coloring by the inverse of flow rate. The radio buttons on line 264F enable coloring as a function of the total number of records sent so far on each datalink or datalink instance in either records or bytes.

If the user selects the radio button on line 264G the dialog box's associated datalink objects will be colored by the partitioning method used by its associated output port instances to allocate records between the one or more input port instances which receive records from that output port instance. The performance monitor knows each datalink object's partitioning method from the augmented score which has been sent to it. The Color Map Dialog Box (not shown) selected by button 269 in the Datalink Display Dialog Box, allows the user to select which colors are to be associated with which partition methods.

Finally the radio button on line 264H selects to color line segments by their monitored field values, either by the first letter of the monitored field values, the first number of the monitored field value, or by a mapping of monitored field value onto the color scale selected in a Color Map Dialog Box. As is explained below in more detail, a monitored field is a named field in the records of a datalink, the value of which is monitored by the performance monitor and cooperating putRecord routines executing the graph. Line 265 includes a button which lets the user opens the Monitored Field Dialog Box, explained below with regard to FIG. 24. This dialog box lets the user see and set values relevant to the field monitoring process, including, most importantly, the fieldname of the field to be monitored.

Coloring by monitored field would be useful, for example, in a data flow graph processing records each of which has a lastName field. In such a graph the Monitored field Value by 1st letter radio button could be selected to color each datalink or datalink instance by the value of the first name in that field. In datalinks transferring unsorted records this value would fluctuate frequently, but in datalinks carry records sorted by lastName, the value would progress along the spectrum of colors in the standard color map as the lastName values of the records in such a datalink progress through the alphabet.

The dialog box includes a set of mutually exclusive radio buttons on lines 266A–C which control the segmentation of the dialog boxes associated datalink objects. If the user selects the radio button 266A, all of the dialog boxes associated datalink objects will be solid lines of a color determined by the selected radio button in lines 264A–G. Such solid segmentation is particularly useful if the user has selected a particular datalink or operator object and wishes to make more visible all of the datalink objects coming into or out of it in the visualization.

If the user selects the Data Rate Rain radio button on line 266B the dialog box's associated datalink objects will have noodle segementation the random density of which and the velocity of which down the datalink objects line in the visualization will be proportional either data rate in either records or bytes per second, depending on which of the two radio buttons on that line is selected.

If the user selects the color history radio button 266C, the dialog box's associated datalink objects will be portrayed as a color histogram. Each such color histogram represents the value of the color function selected in lines 264C–G of the dialog box in each of a succession of time periods by a corresponding succession of segments along the each such datalink object's line in the visualization. Each such segment has a color determined by selected color function at the time represented the segment. When Color History is selected by check box 266, coloring by source or destination options on lines 264A and 264B is not allowed, since such coloring does not change over time, and, thus, is inappropriate for use in a histogram.

When the user selects the Color History option, control 267A–D become active. Radio button 267A–B let the user select the length of time which is portrayed along each datalink or datalink instance line. The radio button 267A lets the user select to represent the entire time, so far, of the execution of the graph along each such line.

Figure 15:
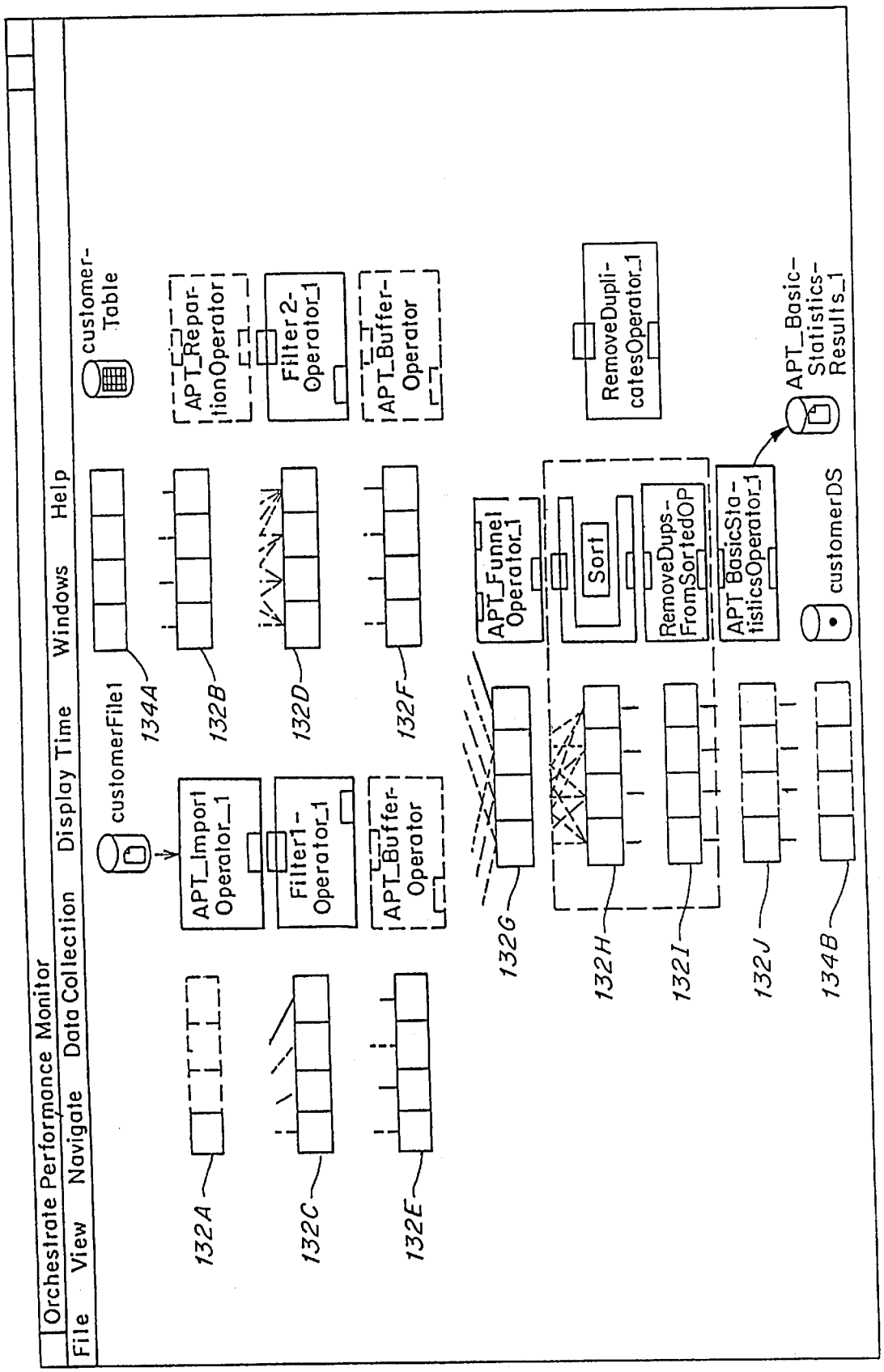
FIG. 15 is a 2D By-Instances view of similar to that of FIG. 10, in which each datalink provides a histogram in the data rate along that datalink during successive time interval of the entire execution of the data flow graph.

This is represented in FIG. 15 in which the user is graphing the history of the flow rate on each datalink instance over the entire history of the execution of a graph. This entire history is projected along the length of the line representing each such datalink instance in the visualization. In this graph zero record flow is indicated by no color at all. The early history of each datalink line is represented by color segments near the consuming operator, and the latest time in the execution of the graph is represented by color segments near the operator producing the datalink. In the representation shown in FIG. 15 it is assumed that the data rates of the datalinks leaving the instances of operator 132A and entering instances of operator 132B start almost as soon as the graph execution begins. As the records pass through each lower level there is some delay added and some spreading out of the duration over which the data flows. In this graph, unlike most of the others in this specification, account is taken of the fact that the operator 132H is a sort operator, each instance of which must receive all of the records it is to receive before it can reliably sort the that op which must receive and all of the records most of the data flow histories. Thus, the execution history shown in FIG. 15, reveals that no records flow out of any of the inistances of this sort operator until fairly near the end of the execution of the graph, well after the time in which all of its input records have been received.

In FIG. 15 the color History feature is shown used in a 2D By-Instances visualization, but it should be understood that the feature can also be used in 2D By Operator, 3D By-Instances, and 3D By Operator visualizations.

If the user selects Color History, he or she can use edit box 267C to select the frequency at which different color segments are to be calculated along each datalink, and checkbox 267D to have a time scale shown between each level of the visualization graph to enable the user to more easily determining the timing of various color values shown along the graph.

The Color Map Button 268 of the Datalink Display Dialog Box causes a Color Map Dialog Box to pop up which enables the user to customize the mapping of a color or grayscale spectrum onto the range of values currently being represented by color, if such mapping is desired in other than a standard manner. The user can also elect to pop up the window and select a keep-up option it has so as to enable him or her to be reminded of which colors correspond to which values. If the user had selected source node or destination operator or node coloring, the Color Map Dialog box enables the user to select which colors are to be associated with which operators or which processors.

Finally, the Datalink Display Dialog Box 260 contains A Flow Rate Time Frame set of radio buttons 269 which enables the user to select the length of time over which the data rate associated with the display of datalinks is to be averaged The next item at the top level of the view menu of FIG. 9 is the "Labels" item 205. If selected the labels submenu is displayed, which includes items 268, 270, and 272. These enable the user to select whether she or he wants no labels, as shown in FIG. 7; only operator names, as shown in FIG. 21; or block diagram labels, as shown in FIGS. 10, 12, 13, 17, and 19, associated with each operator.

If the user selects the Block Diagram option, the system will insert block diagram labels 700. shown in FIG. 12, which not only contain the name of the operator obtained from the augmented score sent to the performance monitor, but also a block diagram of the operator which displays its one or more input and output ports at the top and bottom, respectively, of that block. Operators which have been automatically inserted into the user defined graph by the data flow (graph by the Check Graph Step 156 in FIG. 5, have such block diagrams shown in dashed lines, as is indicated by numerals 700A in FIGS. 12 for the automatically inserted operators 132B, 132E, and 132F. The block diagram labels 700B of operators corresponding to a sub-graph which has been inserted in the graph to replace a user selected composite operator are shown in a dashed box 701. The dashed box representing the sub-graph is labeled with a block diagram 700C which identifies the name of the composite operate to which the sub-graph corresponds.

If the Bar Graphs item 207 at the top level of the View Menu is selected, a Bar Graph Dialog Box 238 shown in FIG. 16 is displayed. Like the Datalink Display Dialog Box, when the Bar Graph Dialog Box is called from the View Menu it acts as if all the objects in the current visualization window are selected, but when it is called for a sub-set or one or more objects in the graph it only applies to those objects.

Checkboxes 240, 241, and 243 respectively let the user select to place bar graphs on all persistent data stets, all buffer operators and/or all operators in the current visualization window. If instances of operators are shown, separate bar graph will be placed on cach. If operators are collapsed at a level the bar graphs of the operators collapsed onto one waffle will be combined. Similarly if levels or processors are collapsed, so will the corresponding bar graphs.

If the user selects on of the radio buttons on line 244 in the dialog box he will select to bar graph data flow rates in either bytes per second or records per second. If he makes on of those selections, the one or both of the check box under that line must be selected to indicate whether such data rate bar graphs are to be made for inputs, outputs, or both. The set of radio buttons and check boxes associated with line 245 allows the user to make a similar set of selections if he desires to bar graph the total flow to date on the selected operator or data set, except the that check box on line 245A allows the user to chose to display the total flow of records or bytes from an input data set compared to the total number of records or bytes in that data set.

Figure 17:
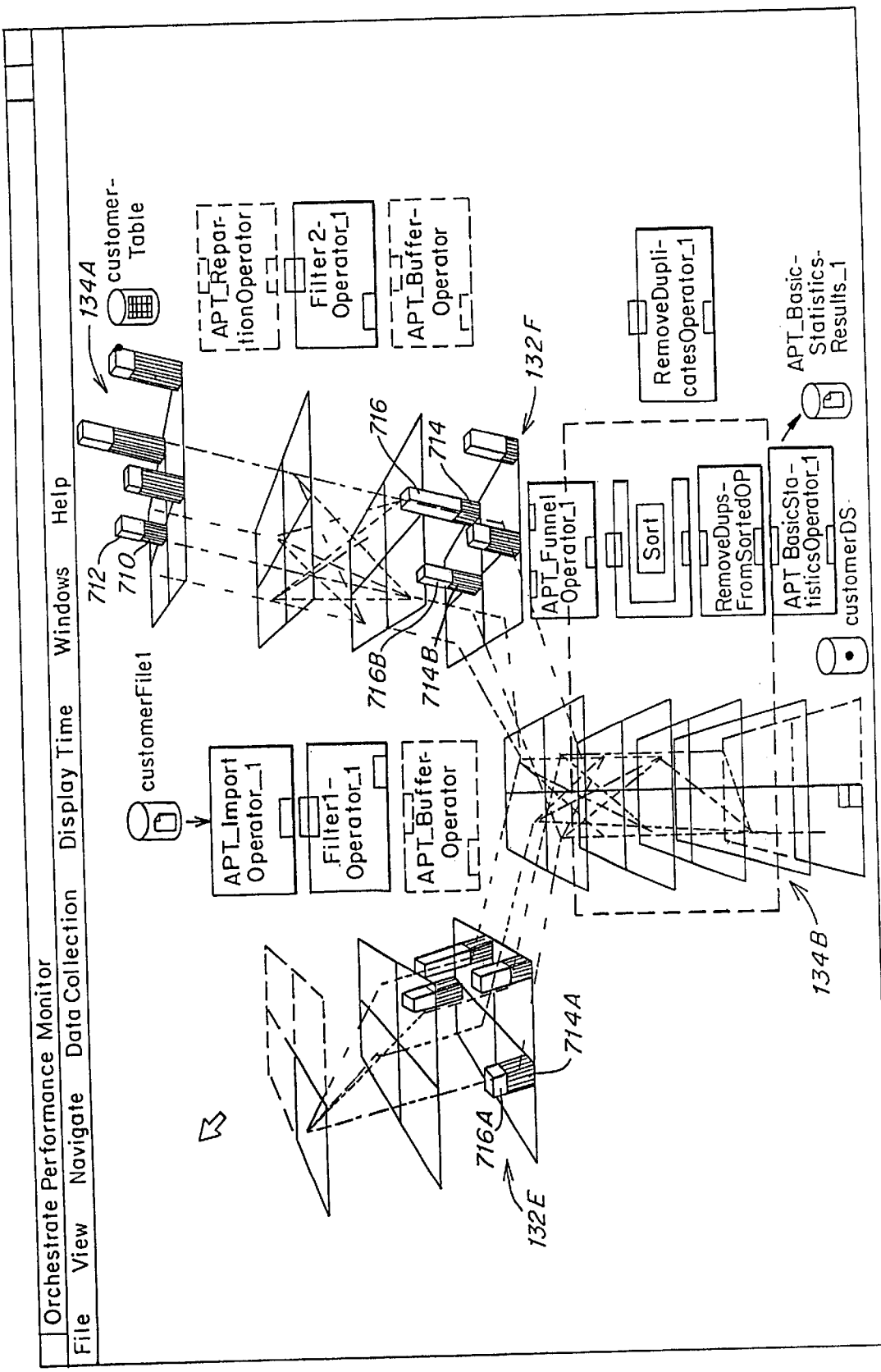
FIG. 17 is a view of the visualization shown in FIG. 7 after the user has raised the angle of the viewpoint relative to the graph, has selected to display labels, and has used the Bar Graph Dialog Box of FIG. 16 selected to display bar graphs on data sets and buffer operators.
Figure 18:
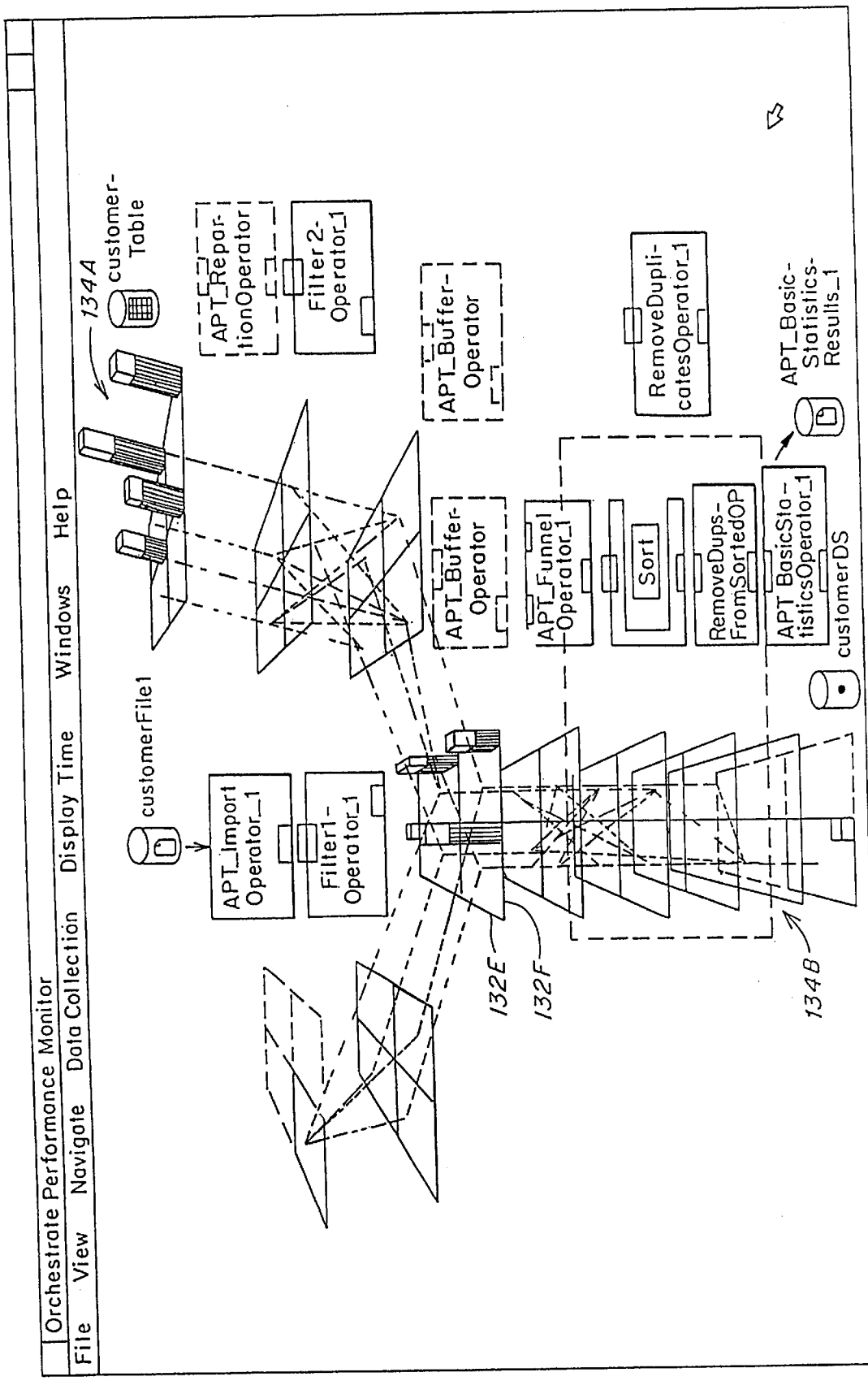
FIG. 18 is a view of a graph similar to that shown in FIG. 17 except that the user has selected to represent the vertical level of graph on which the buffer operators are located in a By-Levels manners, which combines the representations, including bar graphs, of the instances of both buffer operators on that level on each processor node.

This is illustrated in FIGS. 12, 17, and 18 in which the bar graphs shown on the input data set 134A represent the total number of records in that data set or its individual partions with height of the bar graph. These bar graphs represent the total number of records read to date in the dark portion 710 at the bottom of each bar graph, and the total number of unread records in the light portion 712 at the top of each bar graph. This enables a user to see how large the input data set or its individual partitions are, and to see what percent of its records remains to be processed.

The controls on lines 246, 248, 250, and 251 enable the user to select if he wants to bar graph disk I/O, Network I/O, disk storage, and/or CPU usage for the selected objects. The radio buttons on lines 246 and 248 enable the user to select to graph disk I/O, network I/O, and disk storage either in bytes or records. If the user selects a control on any of the lines 246, 248, 250, and 251 the radio buttons on the line below it become active and the user can select whether to have the associated bar graph represent merely the selected preformance by its self, as a percent of the maximum such performance allowed on the object's associated hardware, or compared to the remaining capacity for that performance characteristic on that associated hardware.

In the example of FIG. 17, for example, it is assumed the user has selected for the buffer operators 132E and 132F of that figure to graph disk storage by selecting the check box on line 250 of FIG. 16 and then the "compared to remaining" radio button under that line. The resulting bar graph indicate the number of bytes stored by each instance of each such buffer operator in the dark portion 714 of each such bar graph and the remaining disk storage capacity on each instance's node in the light portion 716 at the top of each such bar graph.

The remaining capacity portion 716 of each graph makes it easy to compare the total performance consumed by an operator instance with the remaining capacity of that type available on the current node. It should be appreciated, however, that the remaining storage capacity portion 716 for the instance of a given operator on a particular node is shared by the instances of all other operators on that node.

The radio buttons under line 252 allow the user to select whether the bar graphs are to be perpendicular to the selected objects, as is shown in FIGS. 12 and 17, or one the surface of the selected objects, as is shown in FIG. 14.

FIG. 12 show visualization in which the data set waffles have been collapsed into one square and a bar graph of percent of disk storage associated with each operator has been selected for all data sets by checkboxes 240 and 250. FIG. 17 shows 3D ByInstances visualization in which bar graphs have also been selected to show disk storage of the buffer operators with checkbox 241. FIG. 18 shows the same visualization as in FIG. 17 in which the user has selected to collapse the level containing the operators 132E and 132F in FIG. 17 into one waffle so the total disk storage used by both buffer operators on each node is shown.

Selection of the "Number Processors" item 206 in the top level of the Views Menu of FIG. 9, if selected will cause numerical labels to be placed on individual operators, as is shown in FIG. 19.

Selection of the "Get & Put Hangs" item 210 in the View Menu shown in FIG. 9 causes the Get And Put Hangs Dialog Box 266 shown in FIG. 23 to be displayed.

Checkbox 268 of this dialog box allows the user to indicate whether or not he or she wants to monitor get and put hang. By "get and put hangs", we refer to states when the processing of an operator instance has been stopped for an unusually long time pending the return of a call to a getRecord function 148 or a putRecord function 152. Although brief delays in the return of these functions are common, long delays, except when they occur at the lower levels of a data flow graph during the early phases of execution, often represent undesirable data flow blockages that will propagate through a data flow graph. Thus it is important to keep track of such hangs.

The edit box 270 enables a user to indicate how long a period after a call has been pending should elapse before the system indicates the delayed return as a hang. Checkboxes 274, 276, and 278 enable the user to select whether to highlight the port which is hung by an individual failure of a getRecord or putRecord to return, the operator instance which will be hung by the failure of the call to return, and/or all datalink instances connected to that operator instance which will be hung by any such failure to return. The checkbox 279 instructs the visualization window not to highlight any getRecord or putRecord hang from any port which has not yet handled its first record, so as to avoid treating the getRecord and putRecord hangs which normally result at the lower part of a data graph before they receive there first record from being indicated as possible blockages.

The controls 280 and 282 each include a grid of different colored push buttons and enable the user to select how to separately select the color used to highlighting getRecord and putRecord hangs. The checkbox 284 determines whether or not a time label is to be placed in the visualization window next to each indicated getRecord or putRecord hang. Such time records can be useful since such hangs tend to propagate throughout a data flow graph and thus finding the earliest time in a chain of such propagated hangs helps quickly focus attention on the portion of the graph which started the chain reaction of blockages.

Figure 22:
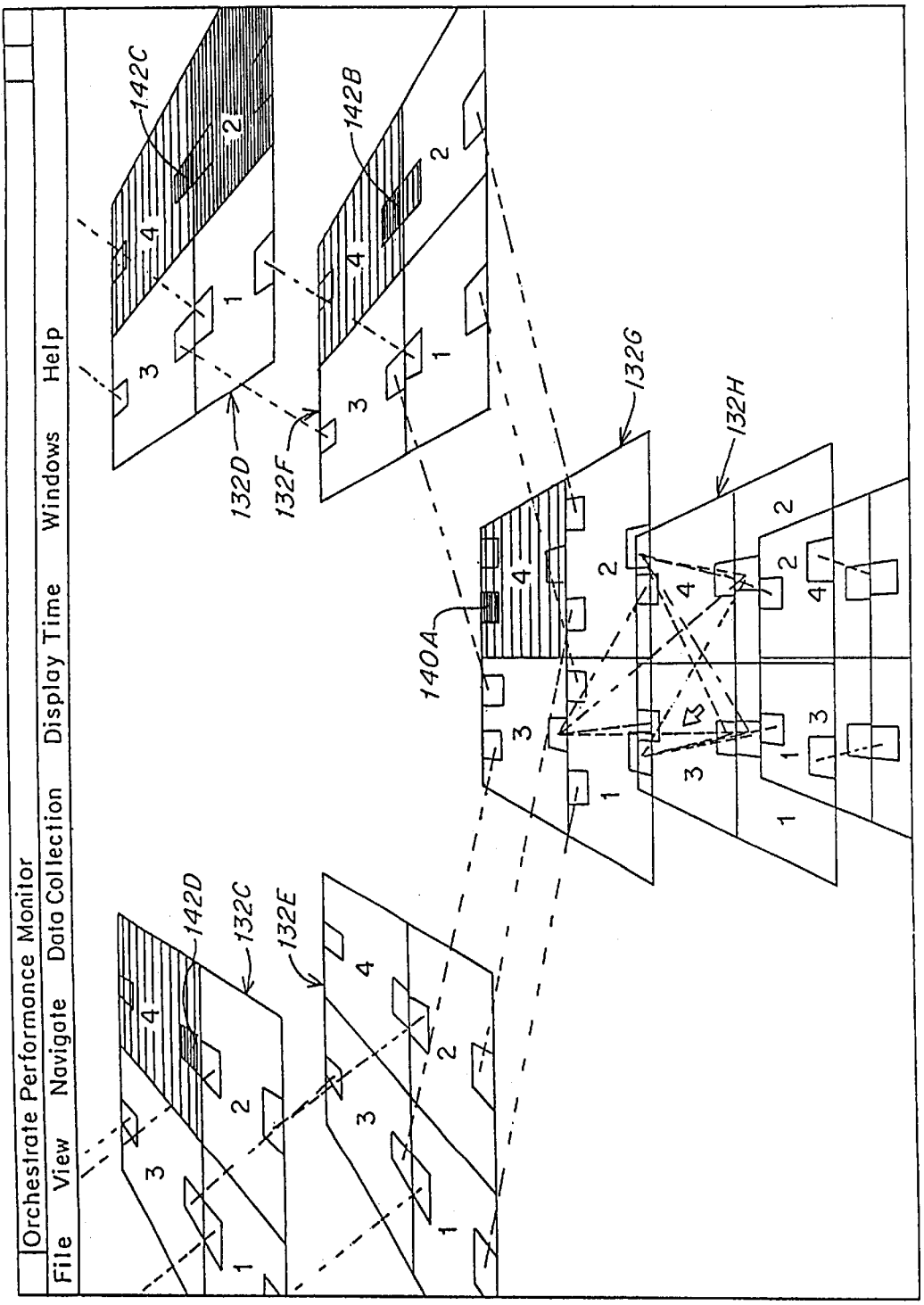
FIG. 22 is a view similar to that in FIG. 19 except that it highlights operators and communication ports hung in association with calls to getRecord and putRecord functions associated with the blockages indicated in FIGS. 10, 11, and 21.

FIG. 22 provides an example of how get and put hang tracking would be useful to a users. In the example shown there it is assumed that the fourth instance of operator 132E has hung on other than and getRecord or putRecord call. As a result is supplies no more input to port 140A in the fourth instance of operator 132G, causing that port instance, and its entire operator instance to be hung, as is indicated by the coloring of the entire instance and the even more intense coloring it its particular port which was hung. The hanging of the fourth instance operator 132G causes the next call to putRecord from the output port 142 of the fourth instance of operator 132F to hang. This hangs the entire fourth instance of operator 132F. This, in turn, causes the next call to putRecord in port 142C of the fourth instance of operator 132D to hang, and so on up the right branch of the data flow graph.

Similarly the mysterious hang of operator 132E cause the next call to putRecord in the fourth instance of operator 132C to hang, hanging its entire operator instance, and this hang will propagate the the operator above it the next time that its ouput port calls a putRecords which fills a record block destined for the fourth instance of Operator 132C. The indications of which operator and port instances are hung in FIG. 22 provides a clear indication to a user that something might be wrong, with the fourth instance of operator 132E. The user can then double click on that operator instance's associated waffle square in the visualization window and use the resulting drop-down menue to evoke a debugger for that instance. The debugger can then be used to what the problem is with that operator instance.

If the user selects the "EOF display" item 211, at the top level of the View Menu of FIG. 9, an EOF Display Dialog Box 290 shown in FIG. 27 pops up.

Check box 292 of this dialog box lets users select to have individual input or output ports, which have either received or sent a block of data containing an EOF marked. An "EOF" is an "end of file" marker, indicating that there are no more records in the datalink instance sending a blockSent message containing such an EOF. In the case of an input put, the EOF marking will not be displayed for a given port unless it has received an EOF from all of the connections supplied to it.

Selecting the checkbox 294 will cause an operator or operator instance to be highlighted if it is passed all records in the data flow graph which are to pass through it. This is indicated if it has received EOF's on all of the connections to all of its input ports, and it has processed all of the records, which it has received, and, thus, has sent EOF's out through all of its output ports. Selecting the checkbox 296 causes all datalink instances through which an EOF has passed to be highlighted in the visualization window.

The color button grid 298 lets the user select the color to be used to highlight objects which have received EOF's. The checkbox 300 enables the user to instruct the visualization window to display the time associated with the EOF marking associated with an individual port, operator, or datalink instance.

FIG. 19 illustrates EOF marketing in a situation where it is assumed the checkboxes 292 and 294, but not checkbox 296, of FIG. 27 have been selected. In this example it is assumed that the operator instances shown in grey are fully EOFed, that is they have received end of file messages in all connections to all of their input ports, they have finished processing all records sent to them, and they have sent EOF messages on all datalinks to their output ports. It is also assumed that the individual ports 140C and 140B are marked as EOFed because as can be seen, the operator instances which feed them have been EOFed. The operator instances corresponding to each of these two ports, however, are not EOFed, because as is shown in the figure, the other input port of each of those operators is still receiving data.

In the example of FIG. 22 the second incidence of operator 132F is highlighted to indicate that that record is EOFed. The combination of different marking of data flow stoppages resulting from EOFs and stoppages due to get and put hangs shown in FIG. 22 is useful for enabling a user to quickly determine whether a flow stoppage is normal or not.

The Monitored field option 212 in the top level of the Views Menu causes the Monitored field Dialog Box 374 shown in 124 to be displayed. When called from within the View Menu of FIG. 9, this dialog box field monitoring acts as if all of the current graph's datalink instances are selected and its settings apply to the entire graph. When called from an drop-down menu associated with one or more selected objects it only applies to the datalink instances associated with the currently selected objects.

The Monitored field Dialog Box contains a checkbox 375 which enables the user to turn field monitoring on or off. It also includes a drop down edit list box 376 which alphabetically lists, and enables the user to select, any field name contained in the records of any datalink selected for purposes of dialog box. This list is determined by the performance monitor from the combination of data sets, input and output port, and adapter schemas contained in the current graph's score. The dialog box also includes drop down list box 376 which alphabetically lists the combinations of operators and port number of all input and output ports which receive or send records having the field name value currently listed in the field name list box 376.

The Monitoring Frequency group of controls 378 includes two mutually exclusive radio button 380 and 382. which enable the user to specified the frequency at which blocksends messages for datalink instances on which the field monitoring is to take place send field monitoring information. This enables to use to control the relative cost of field monitoring.

Figure 25:
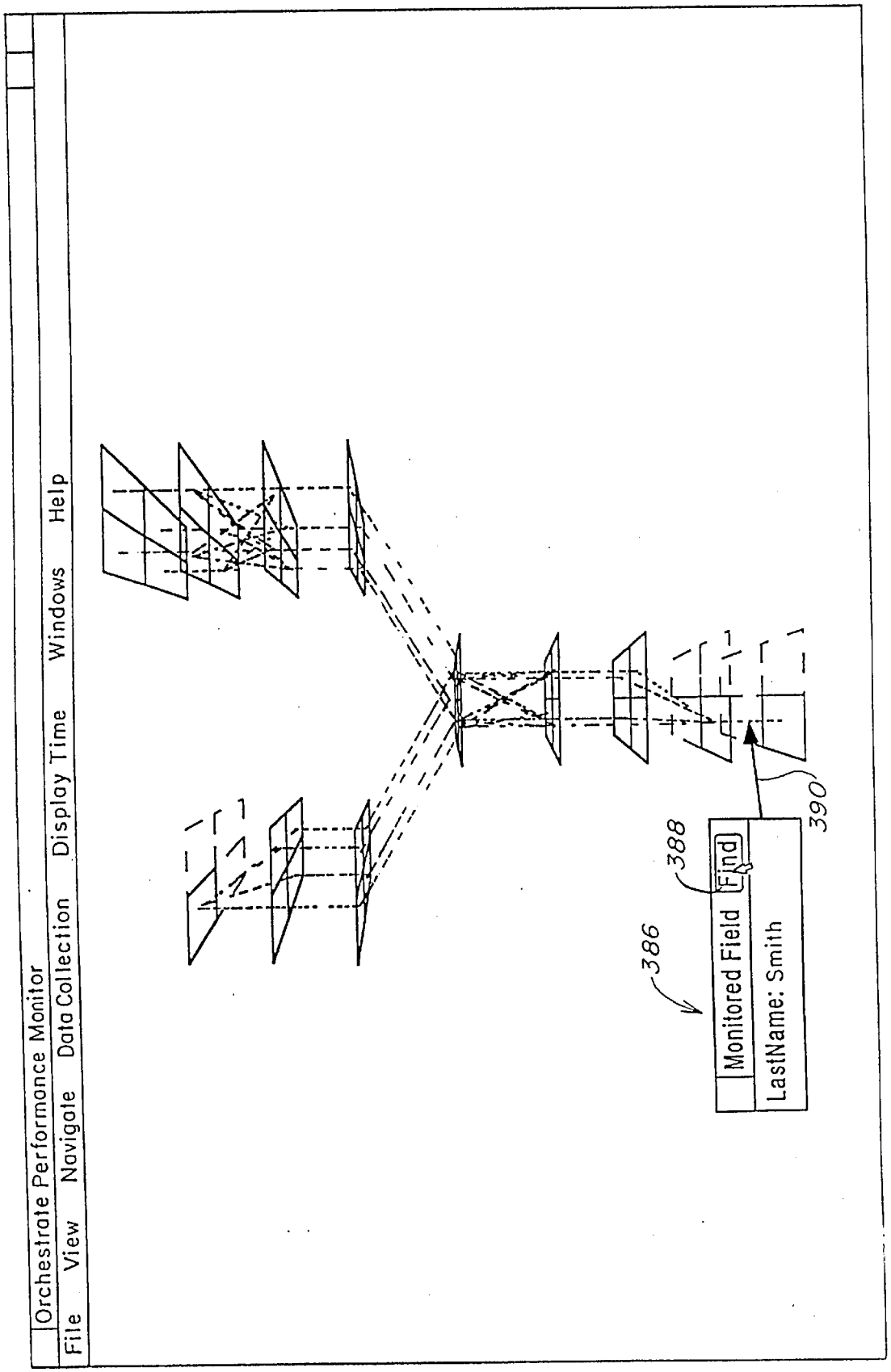
FIG. 25 is a view similar to that in FIG. 7 in which the user has used the Monitored Field Dialog Box of FIG. 24 to show a window displaying the value of a monitored field on a given datalink instance.

Checkbox 384 enables the user to indicate whether he or she wants a Monitored Field Window 386, as shown in FIG. 25, to be displayed for each of datalink instances to which the dialog box applies. The Monitored Field Window is a re-sizable, movable window which includes the name of the monitored field and its most recent value. As indicated in FIG. 25, the monitored field window 388 includes a find button 388 in its title bar. If this bottom is toggled to an on position, it causes an arrow 390 to be drawn between the Monitored Field Window and the datalink instance, which it monitors. This enables a user to position a plurality of monitored field windows in the view window and be quickly reminded which windows are associated with which datalinks. The Monitored Window Dialog box contains a checkbox 385 which causes all the Monitored Window Windows displayed for the dialog box's associated datalink intances to have their Find button on. This can be very useful if a stack of monitored field windows have been created for a plurality of connections, since it enables one to zoom in on a given datalink instance, click on its associated arrow 390 to cause the appropriate monitored field window to be selected and made visible.

Figure 24:
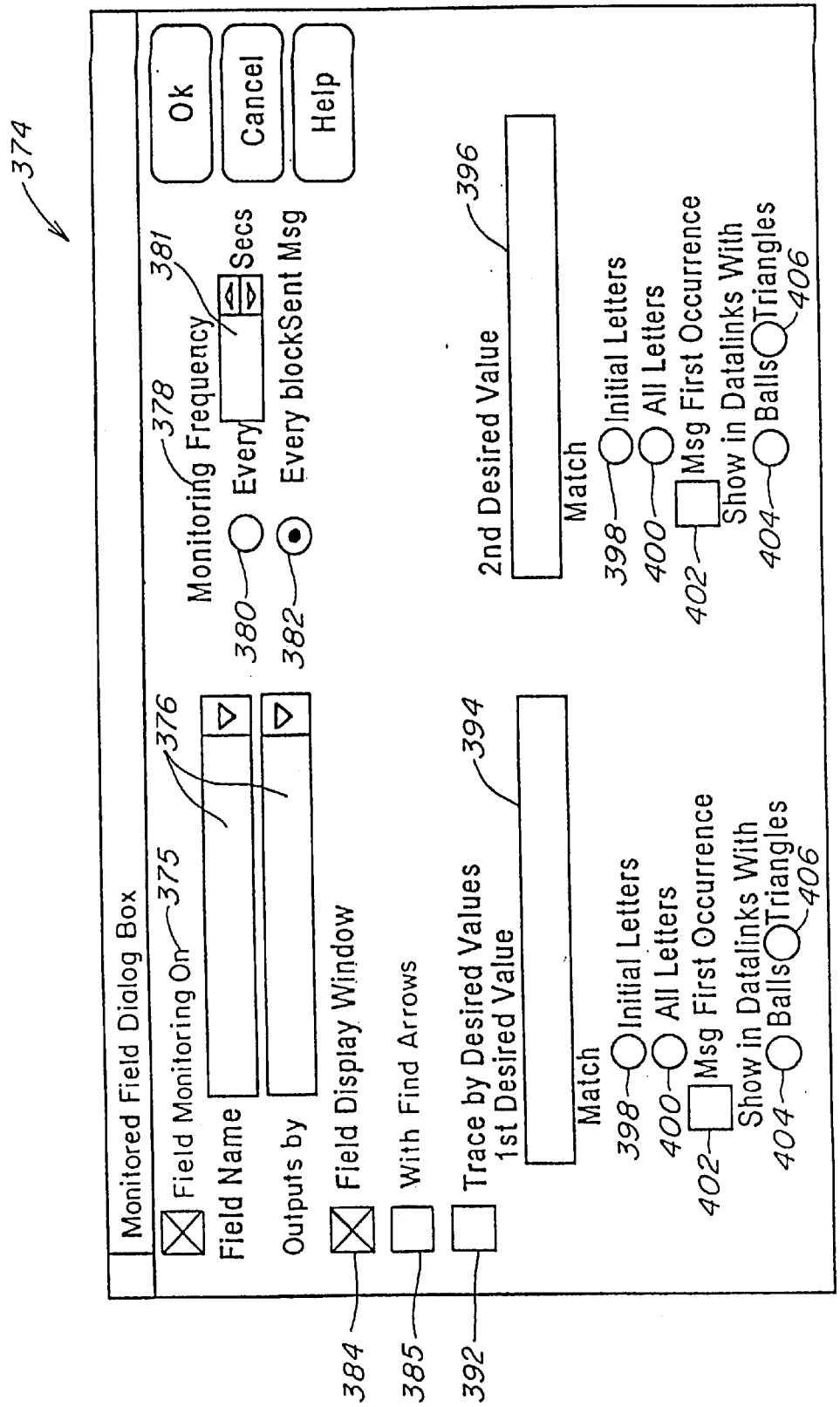
FIG. 24 is a schematic representation of the Monitored Field Dialog Box when enables a user to select to monitor and display the value of a given field in records passing through one or more selected datalink objects.

The Monitored Field Dialog Box in FIG. 24 also included a Trace By Desired Values checkbox 392. If checked, it will enable indications to be presented of whether the value of the named field identified in the box 376 has one of up to two values specified in the 1st Desired Value and 2nd Desired Value edit box 394 and 396. The radio buttons 398 and 400 under each desired value edit box indicate whether the that edit boxes desired value is considered to include all values which start with the numbers or letters in that edit box or only values which exactly match the numbers or letters in that box.

The Message First Occurrence check box 402, if checked, causes the system to pop up a message window with an arrow pointing to a particular datalink instance if that check box's associated desired value has been observed by the field monitoring within the named field identified in the edit box 376.

Selecting one of the radio buttons 404 and 406 under a given desired value cause the visualization window to display either a ball or a triangle, respectively, when the associated desired value is observed in the named field on one of the datalink instances to which the current display of the Monitored Field Dialog Box applies.

Figure 26:
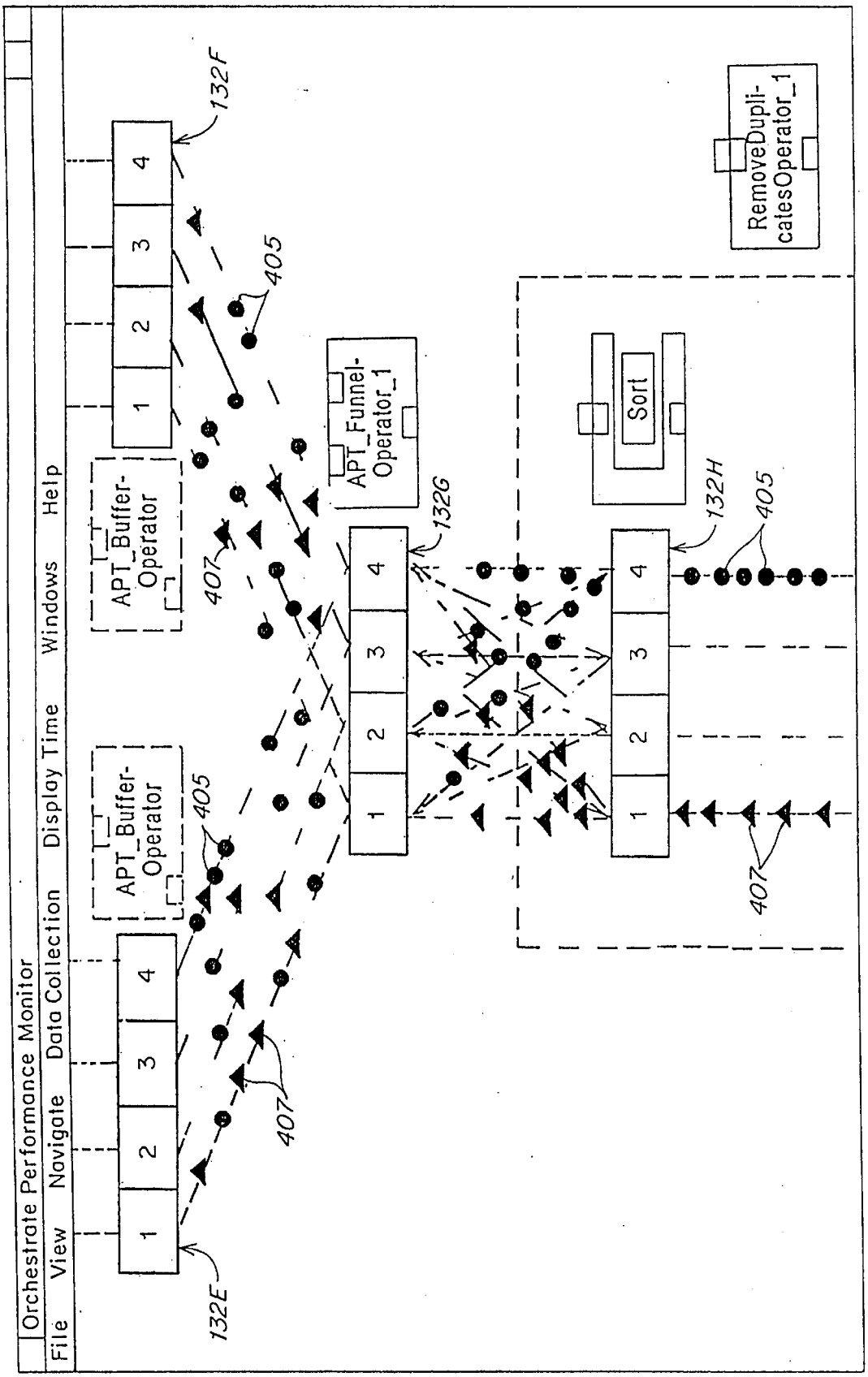
FIG. 26 is a 2D By-Instances view, similar to that in FIG. 10, in which the user has zoomed in on the center of the graph and has used the Monitored Field Dialog Box of FIG. 24 to display occurrences of each of two different selected values in a monitored field with triangles and balls, respectively.

Such a display of balls and triangles is indicated in FIG. 26. This window shows 2D By-Instances visualization of the same graph shown in FIG. 10, except that in FIG. 26 the user has zoomed in on operators 132E through 132H. In the example of FIG. 26 it is assumed that the users has set the Field Name check box 376 shown in FIG. 24 lastName, a field the records passing through the all operators of FIG. 26, that the user has selected the Traced By Desired Value check box 392, has set the 1st Desired Value is the letter "A", and for that desired value has selected the Initial letters check box 398 and the Triangle's radio button 406. Similarly it is assumed that the user has set the 2nd Desired Value to the letter T, and for that value has selected the initial letters radio button 398 and the balls radio button 404.

In the figure it is also assumed the user has selected all the data instances going operators 132E and 132F to operator 132G, from operator 132G to operator 132H, and from operator 132H to 132I (not shown in the figure). In this case, When records flow through these datalink when instances lastNames field values starting with either A or T are detected they are indicated in the visualization window by the presence of balls 405 or triangles 407, respectively. As can be seen in the example of FIG. 26, datalink instances being supplied to the inputs of the operator 132G contain lastName fields starting withstarting with both the letter "A" and "T".The outputs of instances of operator 132G, however, partition the records they supply to instances of operator 132H, so as to send records starting with last names from different parts of the alphabet to different instances of the operator 132H. This is indicated by the fact that all of the triangles 407 are sent from each of the four instances of the operator 132G to only the first instance of the operator 132H and all of the balls 405 are sent to the fourth instance of the operator 132H. Thus it can be seen that the trace facility provides an easy mechanism to enable a user to see if the system is properly sorting records into separate data streams based on a given field value as may be desired.

The Saved Visualization manager 213 in the top level of the Views Menu of FIG. 9 causes a Save Vizualization Manager Dialog Box to pop up. This dialog box is not shown, but it enables the user to save the current set view settings in current visualization window under a user selected name, or to select such a set of settings which have been previously saved from a list box. This enables a user to save complex sets of visualization setting which he finds useful for future use.

Returning to the top level menu 170 shown in FIG. 7, if the user selects the DataCollection item the data collection menu 304 shown in FIG. 28 drops down. This menu lets the user control settings which record the most important types of information the system monitors or records.

The top level of this menu includes a "Record Performance" option 306 which allows a user to select a sub menu comprised of items 312 through 318. Item 312 lets the user turn on or off the recording of performance messages, such as blockSent messages, sent to the performance monitor to file. Such recording enables the playback of the current execution of a data flow graph at a latter time, either during a later portion of the current execution of the graph, or after the execution of the graph is complete. The options 314, 316, and 318 let the user select the frequency at which the state of the execution of the graph is recorded. The custom settings option 318 displays a dialog box which lets the user enter a specific recording frequency and select whether or not, and at what frequency to record monitored field records.

The Monitor Performance item 308 at the top level of the DataCollection menu, if selected, causes a similar sub menu of options 320 through 326 to appear. These control whether or not, and at what frequency. Selecting item 320 not only instructs the the player processes 132', shown in FIG. 5, which execute individual operator instances in the parallel graph are instructed to send UDP blockSent messages to the performance monitor. The selection of option 320 turns off the sending of all UDP messages related to performance, including messages other than blockSent messages, such as the getBlockPending and putBlockPending messages used to monitor get and put call hangs. The selection of lowerer monitoring frequencies with menu items 322, 324, and 326, enable the user to select a desired tradeoff between the currency of the visualized information and the amount of computational overhead it places on the player processes which are executing the graph.

Selection of the DisplayTime option in the top level menu 170 shown in FIG. 7 evokes the DisplayTime menu 330 shown in FIG. 29. This menu includes a Real Time option 332 and a Replay option 334. If the user selects the real time option, the corresponding visualization window displays information from the current execution of the graph. If the user selects the Replay option 334, the Replay Dialog Box 336 shown in FIG. 30 pops up. This dialog box includes a time slider control 338, which slides along, a time line representing the total length of time for which information has been recorded for the execution of the graph of the current visualization window, marked with days, hours, and minutes, and with any gaps in such recording time indicated. The time slider control lets the user select any time in that recorded history for playback. The replay speed slider 340 lets the user select the replay rate in multiples of real time playback speeds, including negative, or reverse, playback speeds. It should be appreciated that the replay dialog box can be used not only to go back in time relative to a graph currently being executed but also to play back the previous execution of the graph, which can be accessed under the files menu 342 in the top level of the menu 170 shown in FIG. 7.

The performance monitor's replay function replays a file or set of files containing the all the information necessary to successively update a visualized graph's graphState data structure as does the receipt of performance messages in real time. Thus, when replaying a graph's execution the user has the same freedom to use the View Menu and the View Navigate Dialog Box to vary the visualization of a graph that she or he has during real time visualization. During, replay the user is free to change such items as view point, zoom, view focus, datalink display color, EOF display, get and put record hand display, and whether the display is 2D or 3D and by operators, instances, processors, or the entire system, provided the information required to support such functions was recorded during the original execution of the graph.

FIGS. 31 through 36 represent the object menus which the user can obtain either by double clicking on an object in the visualization window or by pressing the right mouse button when one or more such objects have been selected by single clicking on them. These menus all enable the user to perform functions on the currently selected object or objects in the graph.

All of the object menus include at least the following options: Make Focus and Navigate item 354, Collapse Instances 356, Object Overview 358, Performance Overview 360, Datalink Display 362, and Monitored field 370.

The Make Focus And Navigate item 354 in each object menu makes the selected item associated with the object menu the current view focus and pops up the View Navigation Menu Dialog described above with regard to FIG. 8. This menu item is only available when only one item is currently selected. When a user selects an object by mouse, the point made the view focus is the actual location on the selected object which the mouse pointed to at the time the selection took place. This allows the user to make a desired point on an object the view focus.

The Collapse Instances item 356, in each object menu is checked if instances of the current object or objects are already collapsed. In that case, selecting it uncollapses them. If the menu items is not checked when the object menu is displayed, the selected object is not currently collapsed and selecting it will cause the various instances of the selected object or objects to be collapsed. Expanding or collapsing a datalink, an object, or a communication port causes all objects, communication ports, or instances directly connected to it to also be expanded or collapsed.

An example of the use of the Collapse Instances option is shown with regard to FIG. 12, where it is assumed the user has selected to 3D By Operator option 230 in the 3D Views Expansion Level sub menu of the Views Menu of FIG. 9, and then has selected Collapes Instances option 356 from an object menu with operators 132E, 132F, 132G, and 132H selected to expand the view of those particular operators to show instances.

Selecting the Object Overview item 358 in each object menu pops up a window containing information derived from the class definitions of the selected object and certain objects directly connected to it in the data flow graph. For example, selecting this item for an operator object causes a window to be displayed which describes the number of input and output ports for the operator, the data schemas for each such port, a window displaying the source of its runLocally code, and any adapter objects connected to it which convert the name or type of specific fields feed to or received from the object's input or outport ports. For an operator instance, the same information is supplied plus an identification of the processor on which the operator instance is running. For a datalink the object the overview window displays information such as the schema of the data records passing through it plus the schema of the adaptors and commucation ports connected at either end of the data link. For a datalink instance, the same information is provided plus the numbers of the processor of its source and destination communication ports.

Selecting the Performance Overview item 360 in each object menu causes a Performance Overview window 364 to be displayed containing performance information appropriate to the selected operator, port, datalink, or selected instance thereof.

Figure 37:
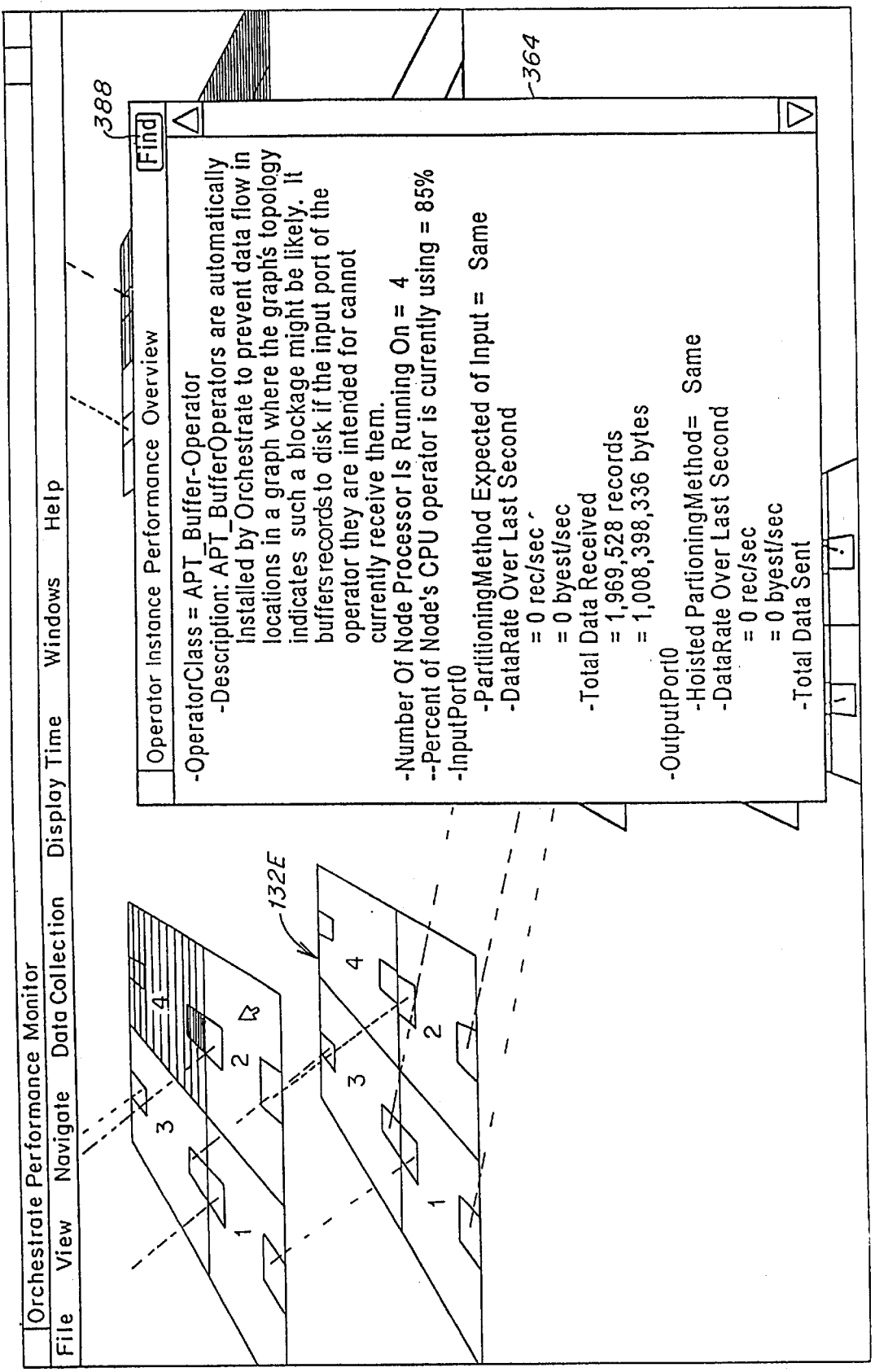
FIG. 37 is view similar to that shown in FIG. 22 once a user has selected to display an Operator Instance Performance Overview Window for an individual operator instance from the operator instance menu of FIG. 33.

The performance overview window shown in FIG. 37 is one evoked for an operator instance. It displays summary information, if available, for the operator class, the number of the individual node the processor is running on, the percent of the node's CPU time the operator is using and information on each of the operator's ports, such as the partition method used for its datalink instances, its current data rate with the period over which that rate is averaged, and the total number of records it has passed so far. In FIG. 37 it is assumed that this operator instance has been evoked for the fourth instance of the operator 132E, which is the operator instance presumed to have been hung in the discussion of FIG. 22. This is indicated by the fact that the data rate for both the operator instance's input and output ports is zero.

The ability to click on objects in a visualization of the performance of a parallel graph and obtain detailed performance numbers and other information on those objects is an important aspect of the invention. The graphic visualization provides an intuitive representation of the performance and functional relationships of objects in the graph, making, it easy for a user to quickly select and rapidly access the objects about which he or she wants such additional information. The ability provided by the invention to rapidly collapse and un-collapse operator instances. operators at levels, levels in the graph, and processor nodes, makes it easy for the user to selectively obtain not only detailed performance information on individual objects, but also combined performance information about relevant groupings of such objects.

Selecting Datalink Display 362 in each object menu causes the display of the Datalink Display Dialog Box 260 described above with regard to FIG. 20. When this dialog box is evoked for one or more selected objects, the selections made in it are only applicable to the selected datalinks or the datalinks connected to the selected objects. This is beneficial because the Datalink Display Dialog Box can be evoked from the View Menu of FIG. 9 to apply a given display selection to all datalinks and then can be evoked for a subset of one or more datalinks through use of the object menus to select different options for that subset. For example, one could use the Datalink Display Dialog Box evoked from the View Menu to turn off the display of all datalinks with the checks box 262 shown in FIG. 20 and then select to turn on the display of all datalinks connected to a particular operator port instance, so as to enable a user to have a clearer view on those particular datalinks.

Selecting the Monitored field option 370 in an object menu evokes the Monitored field Dialog Box 374 of FIG. 24, described above. This enables the use to select or modify the field monitoring function for the datalinks associated with the selected object or objects.

The object menus for operators, ports, operator instances, and operator port instances shown in FIGS. 31 through 34 include a Bar Graph item 368 which enables the user to evoke the Bar Graph Display Dialog Box described above with regard to FIG. 16. This enables the use to separately select bar graphing options for the currently selected objects.

The operator object menu of FIG. 31 further includes a Collapse Operators At Level option 355. When this option is selected all operators at the current level will be collapsed into one waffle. If the level is already collapsed selecting this item will uncollapse the level, separating out its individual operators. For example, if the view is as shown in FIG. 17 and the user selects one of the two buffer operators, 132E or 132F and then selects the Collapsed Operators At Level option both operators at that level will be collapsed into one waffle representation as indicated in FIG. 18. This can be particularly useful if the user wants to combine statistics relative to a given process, such as to combine the bar charts for disk usage per node for each of the two buffer operators into one representation indicating the total disk usage by the both buffer operator on each node, as shown in FIG. 18, or to combines performance numbers in a Performance Overview window similar to that shown in FIG. 37.

Figure 38:
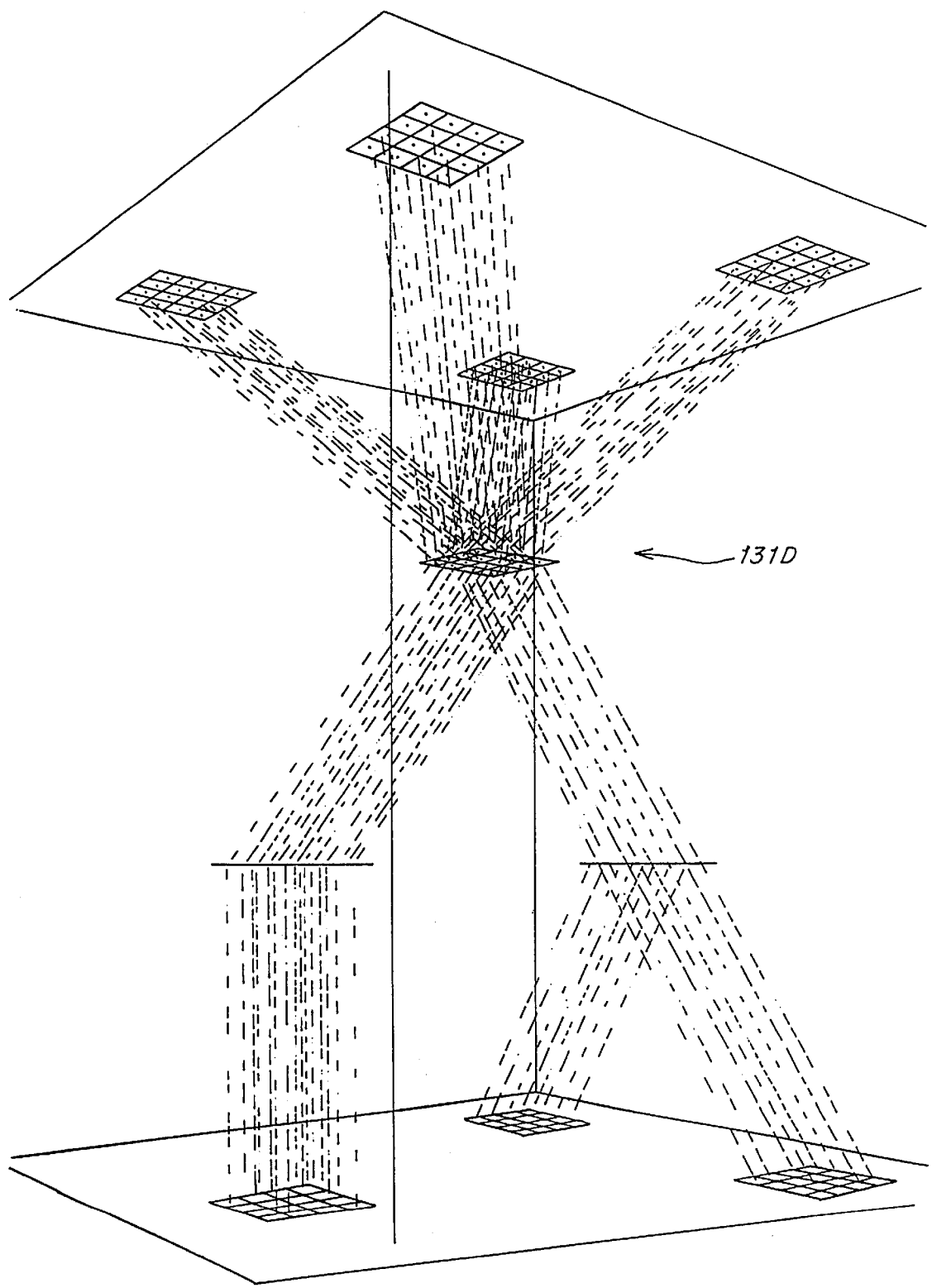
FIGS. 38 and 39 display 3D By-Instances visualizations from different viewpoints of the parallel execution of another graph in which three are sixteen processor nodes and in which the color of each datalink instance is a function of its source node.
Figure 39:
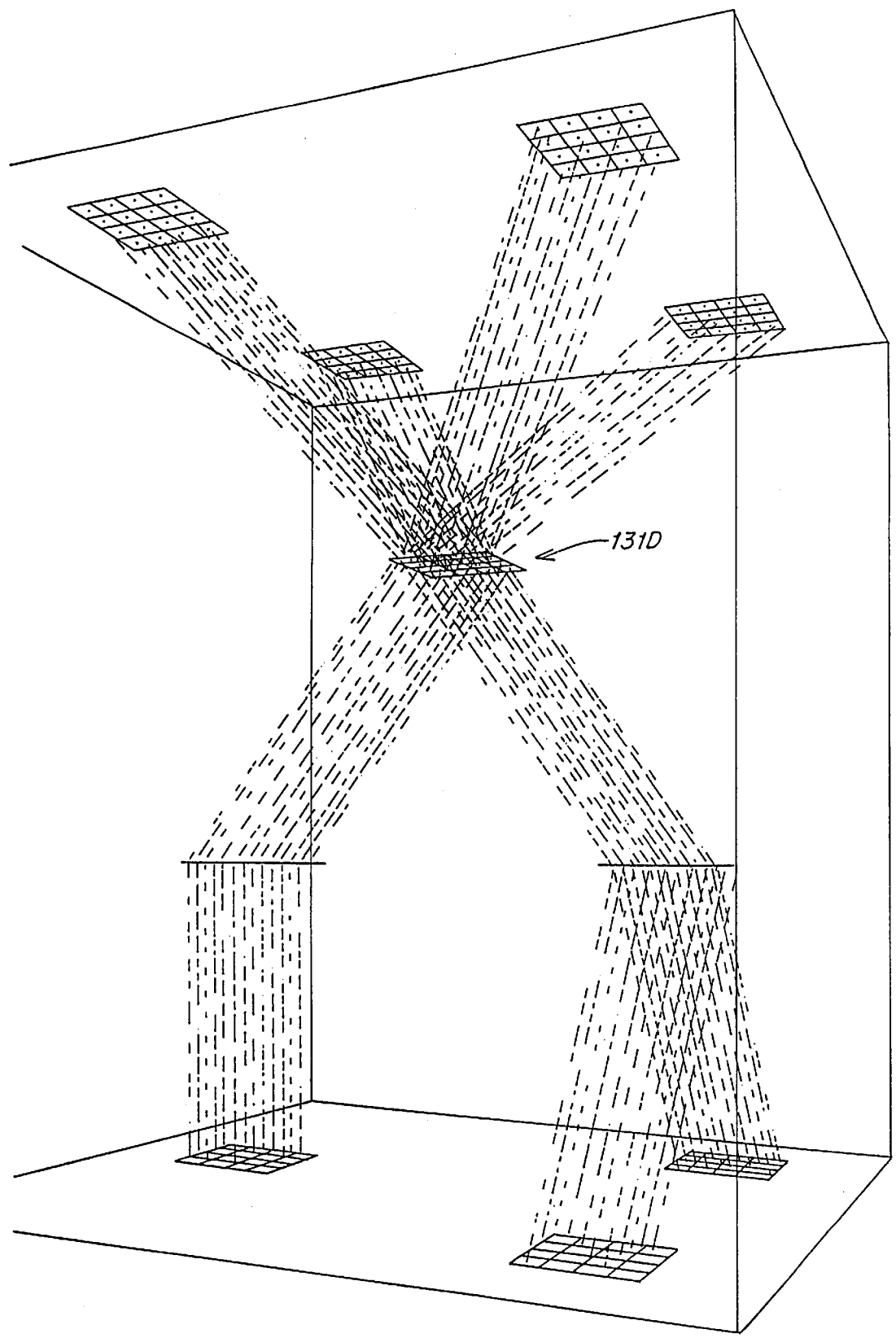

FIGS. 38 and 39 show actual screen shots of the visualizations of the parallel execution of a graph 131D made with one current embodiment of the invention. In this visualization each waffle represents 16 processors, and the noodles of each datalink instance are colored by the color associated with its source processor node. These different colors are indicated by different degrees of lightness in this black and white rendition of the color screen shot. The comparison between FIGS. 38 and 39 shows how navigation navigation in 3D space allows the user to see different views of the graph.

FIGS. 40–51 provide highly simplified pseudo code descriptions of steps of the player processes 132' shown in FIG. 5, and the performance monitor program 128 shown schematically in FIG. 1 which are relevant to the understanding of the present invention.

FIG. 40 is a highly simplified representation of the steps which are performed by a player process 132', shown in FIG. 5, each time its runLocally programming calls the putRecord function 152, shown schematically in FIG. 4, of one of its output ports to output a data record.

The first step of this process, step 420, selectively places the record with which putRecord has been called into a buffer block addressed to one of the one or more instances of the output port's associated consuming input port. This selection is based on the data partitioning scheme controlling the output of the putRecord's port. If the partioning scheme supplies all output from the given output port instance to the consuming input port instance on the same processor, then all output records will be address to only one input port instance. This scheme is represented in FIG. 6, for example between the instances of operator 132H and 132I. If for example, the partitioning scheme partitions that data based on the value of a given field, as is the case between operator 132G and 132H in FIG. 6, then the current record with which putRecord has been called will be allocated to the record block associated with one of a plurality of input port instances based on the value of that field.

Next Step 422 checks to see if the putRecord's current record fills the buffer block to which it has been assigned, meaning the block is ready to be sent, and, if so, it causes steps 424–432 to be performed.

Step 424 tests to see if getAndPutMonitoringIsOn has been set by this user in checkbox 268 in the Get & Put Hangs Dialog Box of FIG. 23. If so, it sends the performance monitor a timed-stamped putBlockPending UDP message, identifying the sourceNode, sourceProcessOnNode, and sourceOutputOnProcess of the block about to be sent. This message is sent over the high speed network 118 shown in FIG. 1 to the performance monitor. Step 424 of FIG. 40 aids in the tracking of hung putRecord calls by informing the performance monitor that such a call is to about to be made. As is explained below, if the monitor does not get confirmation that a block subsequently sent or received by the operator within normalBlockPendingTime, it treats the port as hung on a putRecord call.

After step 424, step 425 tests if the output port for which the putRecord routine 152 has been called is connected to supply output to a data set. If so, it writes the block to that data set. If the data set is a file persistent data set, it writes data to the file. If the data set is a parallel RDBMS it writes the block to the data base. If, on the other hand, the putRecord's output is not connected to the input port of another operator, step 426 sends the current block of records to the block's corresponding instance of that input port over a TCP/IP connection 167 of the type shown in FIG. 5.

In the preferred embodiment, blocks containing records of the data flow graph are sent using TCP/IP because of its high reliability. The messages sent to the performance monitor, however, use UDP, which is a less computationally expensive, but less reliable communicationis protocol. The lower reliability of the UDP protocol means that some of the messages to the performance monitor are likely to get lost in a complex graph execution, but usually the effect of missing a few messages upon the monitors performance is negligible. This is because even if a message is lost, successive messages from the same port will normally quickly make up for any information lost with that message.

After the current block of records has actually been sent, step 423 calls the buildAndSendBlockSentMsg routine 429 shown in FIG. 41 for the current port and the block of records just sent. Note that step 423 calls buildAndSendBlockSentMsg in association with the outputing of records to both operators and persistent data sets. This is important because it lets the performance of output to data sets, as well as output to other operators, be represented by the performance monitor.

The BuildAndSendBlockSentMsg routine starts in step 427 by testing if the block of records for which it was called contained an end of field indication or if the length of time since a block sent message has been sent for the datalink instance on which the block was just sent exceeds the blockSentInterval set by the user in the monitor performance submenu shown in FIG. 28.

If either of these two conditions is true, Step 428 starts to prepare a blockSent UDP message for transmission to the performance monitor. This includes filling in the following fields for the message: sourceNode, sourceProcessOnNode, sourceOutputOnProcess, destinationNode, destinationProcessOnNode, destinationInputOnProccss, numberOfRecordsSoFar, numberOfBytesSoFar, timeSent, and isEOFInRecord.

Next Step 430 tests to see if fieldMonitoringIsOn, as it would be if the user has selected the Field Monitoring On checkbox 375 in FIG. 24. If so, it causes Steps 432 through 438 to be performed.

Step 432 checks a monitoredFieldTable which contains a table indicating by sourceOutputOnProcess, destinationNode, destinationProcessOnNode, destinationInputOnProcess all of the record fields which are to be monitored. Entries in this table is sent by the performance monitor over the more secure TCP/IP control network links 163 and 165 shown in FIG. 5 to each player process 132' shown in FIG. 5 connected to a datalink instance with a monitored data field to which the entry is relevant. Because both the names and positions of fields containing certain information can change as records flow through operators of a graph, the performance monitor uses the schemas for the data sets, operators and adapters of the graph contained in the augmented score sent to it in step 160 of FIG. 5 to calculate the corresponding field name and field position for a given monitored field in each datalink in which it occurs. It then sends each player process outputing a monitored field a monitoredFieldTable entries representing the field name and position of the monitored field in the records output by that player process.

If the current record block's source and destination node, process, and port match that of any entry in the monitoredFieldTable, the system knows the current block has a field which is being monitored. If so, step 434, tests to see if the time since the last time a field monitoring message for the field has been sent, as recorded in the matching monitoredFieldTable entry, is greater than the desiredSendInterval value set by edit box 381 in FIG. 24, which is also stored in the monitoredFieldTable. If so, it is time to send a monitored field message for the block. In this case step 434 places a monitorFieldHeader in the blockSent message being constructed, so the performance monitor will know monitored field data follows.

Next the step inserts into the blockSent message the number of fields which have values matching the $1^{st}$ Desired Value and the $2^{nd}$ Desired value defined in edit boxes 394 and 396 of FIG. 24, respectively. Then it places the value of the monitored field from the last record in current block into the blockSent message. It has the information necessary to extract this value because the matching monitoredFieldTable entry provides the length of the records in the block, the offset of the monitored field in each record, and the length of the monitored field.

Once the steps, if any relating to field monitoring have been completed, Step 450 tests to see if recordMonitoringIsOn, and if so it causes step 452–456 to be performed. As described above, record monitoring is similar to field monitoring, except that it causes the whole value of the last record from a record monitored datalink instance to be sent to the performance monitor from time to time. The performance monitor can display this record in a scrollable window in the visualizer screen or can store it in the performance history being recorded for the execution of the graph.

If the user has set recordMonitoringIsOn in the Record Monitoring Dialog Box (not shown), step 452 checks to see if there is an entry in monitoredRecordTable having a source and destination matching that of the current block. If so, Step 454 checks to see if the time since the last time a copy of a record from the monitored field exceeds that set by the user in the Monitored Records Dialog Box. If so, step 456 places a monitorRecordHeader in the blockSent message being assembled, followed by a copy of the last record of the current block of records for which putRecord has been called.

Once any steps relating to record monitoring have been performed, the assembly of the blockSent message for the current block is complete, and step 460 causes it to by sent by the UDP protocol to the performance monitor program over high speed network 118 shown in FIG. 1. Once this is done the call to buildAndSendBlockSentMsg is complete and step 461 returns.

When the call to BuildAndSendBlockSentMsg on line 423 of the putRecord routine returns, step 462 of FIG. 40 returns to the programming of the data flow operator which called putRecord.

FIG. 42 is a highly simplified representation of the steps which are performed by a player instance 132', shown in FIG. 5, in the execution of a graph each time the runLocally function 145, shown in FIG. 4, of that player calls the getRecord function 148 of one of the player's input ports to obtain the next data record from that port.

When the getRecord function of an input port instance is called, Step 464 of FIG. 42 checks to see if there are any more records in the current block of records being processed by the input port instance. If not, the port has to get a new block of records, and step 464, causes steps 469 through 470 to be performed.

Step 465 check if getAndPutMonitoringIsOn. If so, is sends the performance monitor timed getBlockPending UDP message over high speed network 118 of FIG. 1, identifying the node, processOnNode, and inputOnProcess of the input port instance for which getRecord has been called. As is explained in more detail below, the sending of getBlockPending messages enables the performance monitor to keep track of whether there have been any calls by getRecord for a new block of data which have been unanswered.

Next Step 466 tests if the input port for which getRecord has been called is connected to receive records from a persistent data set. If so it causes steps 467 and 468 to be performed. Step 467 reads the next block of data from the data set. If it is a file persistent data set it read the next block from one of the data set's files. If it is a Parallel RDBMS data set, it obtains the next block supplied by a query to that data set associated with the current operator instance. Then step 468 calls the buildAndSendBlockSentMsg routine described above with regard to FIG. 41.

This call to buildAndSendBlockSentMsg is important because it enables the data flow from persistent data sets into an operator to be visualized.

If the input port for which getRecord has been called receives input from another operator instance, Step 469 waits for a new block of records to be sent to the input port over any of the input port's one or more TCP/IP 167 of the type shown in FIG. 5.

Once the next block of input records have been received, either from step 467 or 469 Step 470 sets the inputBlockReadPointer to the start of the new block.

By the time the program advances to step 474 the input port has a buffer with one or more input records, either because it had one before the call to getRecord or because it just got on in Steps 467 or 469. In either case, Step 474 takes the value of the inputBlockReadPointer as its return value. Then step 476 increment the inputBlockReadPointer by the record length of records received by the input port, and then step 478 returns from getRecord.

FIG. 43 provides a highly simplified pseudo code description of some aspects of the performance monitor program which are relevant to the present invention.

When the performance monitor program is first called for the execution of a given data flow graph, a step 480 initializes the program, and then a step 482 receives the score of the parallel execution of that graph which has been sent to it by the conductor process controlling the parallel execution of the graph, as shown in step 160 shown in FIG. 5.

Next Step 484 uses the score to create data structures for all processor nodes, operators, ports, and datalinks, and for all instances of operators, ports, and datalinks. These data structures are used to store information on the state of the parallel data flow graph which are relevant to its visualization. A separate set of such data structures, called a graphState, is stored for each separate time during the execution of the parallel graph which is being represented by one or more windows of the performance monitor visualizer.

Then Step 486 determines how many vertical levels of operators there are in the graph and which operators are in which such vertical levels.

Step 490 then lays out the operators of the graph in both two and three dimensional space. In the preferred embodiment this process involves a combination of using preselected layout rules and selecting the best scoring randomly selected layout alternatives according to a scoring metric which seeks to maximize reasonable separation of operators at each level while minimizing the total length of all datalinks between layers.

Once the graph has been laid out, the performance monitor enters its main loop, loop 492, which is continuously repeated until the user selects to exit the performance monitor.

The first step of this main loop, step 494 tests to see if their are any messages to be processed on the event queue which stores user input messages, such as those representing input from the workstation computer's keyboard 124 or its mouse 126. If there are any such messages the system, calls handleUserMsgs, a routine which responds to each such message by the function indicated by that message.

Next Step 496 tests to see if there are any messages in the performance monitors UDP input queue, and if so it calls handleUDPMsgs 498 shown in FIG. 44 to process them.

The HandleUDPMsgs routine performs a loop 500 comprised of steps 502–512 for each message in the performance monitor's UDP queue.

Step 502 test to see if the UDP message being processed by the current iteration of the loop 500 is a getBlockPending message. If so it, stores the message in the data structure for its associated input port instance. If the message is a putBlockPending message, step 504 store the message in in the data structure for its association output port instance. If the message is a blockSent message, step 506 causes steps 508 through 512 to be performed.

Step 508 tests to see if historyRecordingIsOn. If so it cause steps 510 and 511 to be performed. Step 510 tests if the time since the last blockSent message was recorded for the messages's datalink instance exceeds blockSentRecordInterval. If so it stores a copy of the blockSent message in the blockSentHistory in chronological order by time stamp. If the current blockSent message has a true isEOFInRecord field, step 511 records a copy of the message in the EOFHistory file.

Both historyRecordingIsOn and blockSentRecordInterval are variables set by the user under Record Performance in the DataCollection menu shown in FIG. 28. The blockSentHistory file stores copies of blockSent messages for all datalinks at a frequency selected by the user so that the replay of the graph can be visualized. EOF's, as well as getRecord and putRecord hangs, are recorded in a separate, much smaller file, so that during replay it is possible to quickly scan a large period of time in the execution of a graph to look for all occurrences of EOF's and getRecord and putRecord hangs, so that the EOF and hang status of ports and operators can be reliably portrayed. Such complete scanning of blockSent messages is not required to update the dataRateInRecords, dataRateInBytes, NumberOfRecordsSoFar, and NumberOfBytesSoFar values for datalinks since such values can be reliably determined from any two successive blockSent messages occurring near a relevant time during replay.

Next step 512 calls the updateGraphWithBlockSentMsg routine 513, shown in FIG. 45, for the realTime version of the graphState, that is, for the set of data structures representing the state of the current execution of the data flow graph.

The updateGraphWithBlockSentMsg routine contains steps which are separately called to update both the realTime graphState and any replay graphStates used to represent the state of the graph at a time being replayed.

Step 513 of updateGraphWithBlockSentMsg erases any getBlockPending, putBlockPending, hungOnGetRecords, or hungOnPutRecord flags stored in any data structures for all inputs or outputs on either the source or destination operator instance indicated in the blockSent message for which updateGraphStateWithBlockSentMsg has been called, if those flags have an earlier time stamp than the blockSent message. It does so because such a latter blockSent message means that a block of record has been sent and received by the destination and source operators, respectively, after the time of such blocklage flags, meansing the associated blockages no longer exist at the time represented by the blockSent message in the graphState.

Next Step 514 tests to see if there is a prior blockSent message recorded for the datalink instance. If so, it calculates the current dataRate values for the blockSent message's corresponding datalink instance. It does this for the dataRateInRecords value by subtracting the numberOfRecordsSoFar from the prior blockSent message stored in the data structure for the datalink instance having the message's associated source and destinations ports from the numberOfRecordsSoFar in the current blockSent message, and then dividing the difference by the difference in the timeSent values of the two blockSent messages. It makes a similar calculation for the dataRateInBytes based on the difference between the numberOfBytesSoFar values in the successive versions of the blockSent message. Then step 515 stores the dataRate values calculated in step 514 in the datalink instance's associated data structure, and step 516 stores the current blockSent message in that data structure.

Step 517 then tests to see isEOFInRecord is true in the current blockSent message, indicating that there are no more records in the message's associated datalink. If so, it sets hasSentEOF in the data structures for the blockSent's corresponding datalink instance.

If there is a monitoredFieldHeader in the current blockSent message, Step 522 causes steps 524 and 526 to be performed. Step 524 tests to see if a field display window has been selected for the datalink instance in the checkbox 384 of the Monitored Fields Dialog Box of FIG. 24. If so, it feeds the value of the monitored field to that window. Step 526 test to see if the Msg First Ocurrence checkboxes have been selected for either the $1^{st}$ or $2^{nd}$ Desired Values in the Monitored fields Dialog Box for the datalink instance, and, if so, it tests to see if any of the values of the monitored field in the blockSent message correspond to a first occurrence of either value. If so it causes a beep at the workstation and sends an appropriate window to the screen announcing the first occurrence of the value at the datalink and records the fact that such a message has been sent for the value in the datalink's corresponding data structure.

If the current blockSent message contains a monitoredRecordHeader, and if the user has selected to currently display a window of that record for the current datalink instance in the Monitor Record Dialog Box (not shown), Step 528 causes the value of the current record to be sent to the process of the window that displays the values of the records fields in a scrollable window.

Once Step 528 is complete, updateGraphStateWithBlockSentMsg is complete for the blockSent message for which it has been called and step 529 returns to the step which called that routine.

Returning now to FIG. 44, once the call to updateGraphWithBlockSentMsg in step 512 returns, the loop 500 is complete for the current message in the performance monitor's UDP message queue and loop 500 is repeated for the next message in that queue. Once all the messages currently in the UDP queue have been handled, the work of handleUDPMsgs is complete for the moment and step 530 returns from the call to that routine.

Although not shown in the simplified pseudo code of FIG. 44, the handleUDPMsgs routine actually places all performance UDP messages received by the performance monitor into a UDP message buffer, sorted by their time stamp. This can be important because if traffic is busy on the network 118, shown in FIG. 1, the UDP messages sent at the same time by two different player processes might arrive at the performance monitor seconds apart. Such buffering allows the messages to be recorded in chronological order as specified in Step 510. Furthermore the loop 500 to processes UDP messages in chronological order by date stamp, delaying the time at which they are read from that buffer by several seconds. This tends to ensure that the data rates and total data sent values displayed throughout the current graph are synchronized. If UDP messages are entering the buffer at a higher rate that loop 500 can handle them, step 512 can be skipped for all messages in the buffer older than a certain age, enabling the visualization of a graph to stay current.

Returning now to FIG. 43. once the call to handleUDPMsgs in step 496 is complete, Step 532 calls the updateReplayGraphState routine 534 shown in FIG. 46 for each different time, if any, during the execution of the data flow graph which is represented in one or more replay windows.

Step 535 starts the updateReplayGraphState routine with a test to determine if the lastRealTimeOfGraphStateUpdate exceeds the replayUdateInterval. If not, the routine skips to Step 543 and returns. If so, it completes the remaining steps in the routine.

If step 535 decides it is time to update the replay graphState, Step 536 saves the current time as lastRealTimeOfGraphStateUpdate for the graphState. Step 537 finds the current timeBeingReplayed, by incrementing that variable by an amount equal to the difference between the current and prior value of lastRealTimeOfGraphStateUpdate times the replay rate. If the replay rate is negative this will cause the timeBeingReplayed to be decremented, causing the replay to take place in reverse. This is important because it lets the user rapidly replay backward to the occurrence of an event of interest, such as a blockage or EOF.

Next Step 538 scans the EOFHistory file and get&PutHangHistory files since the graphState's last earlier timeBeingReplayed, to update EOF and getRecord and putRecord hang values for datalink and port instances in the graphState. Note that if the previous value of timeBeingReplayed is not earlier than the current value of that variable, step 538 has to scan its associated history files from the beginning of the execution of the graph to reliably update EOF and getRecord and putRecord hangs.

Once Step 538 is complete, Step 539 clears all the blockSent messages and dataRates stored for all of the datalinks in the graphState. As is explained below, this is done so step 542 which follows will be able to determine when it has read two blockSent messages for each datalink.

Then Step 540 performs a loop comprised of step 542 for each blockSent message recorded in the blockSentHistory file starting from the current timeBeingReplayed back a length of time in the file corresponding to replayUpdateWindowDuration. ReplayUdateWindowDuration is a variable which represent a long enough duration of time in the blockSentHistory file to have a high probability of reliably being assured of getting at least two successive blockSent messages on any datalink which would normally indicate a non-zero data rate during real time display of a graph, yet short enough to minimaze the amount of computation which has to be performed to update the replay graphState.

The loop of Step 540 calls Step 542 for each blockSent massage recorded in the replayUpdateWindowDuration. Step 542 tests to see if the datalink corresponding to the current blockSent message of loop 540 has not yet had dataRates calculated for it, as indicated by it still having the cleared value placed in it by step 539. If no dataRates have been calculated for the datelink, step 542 calls the updateGraphStateWithBlockSentMsg routine of FIG. 45.

The first call to updateGraphStateWithBlockSentMsg for each datalink in loop 540 will cause the blockSent message with which it is called to be recorded in the datalink's data structure, but it will not cause dataRates to be calculated because step 514 of FIG. 45 only calculates dataRates if there is a prior blockSent message recorded for the datalink. But the second call to updateGraphStateWithBlockSentMsg for a given datalink will update the datalink's dataRates. After this second call no further calls will be made to updateGraphStateWithBlockSentMsg for the datalink since it's associated data structure in the graphState will already have all the values necessary to support visualization of the datalink's data flow for timeBeingReplay.

Once the loop 540 has been completed for all of the blockSent messages in the replayUpdateTimeWindow, sufficient information exists for visualization of the graphState at the timeBeingReplayed and step 543 returns to the instruction which called updateReplayGraphState.

Returning now to FIG. 43, once step 532 has called updateReplayGraphState for each replay graphState being protrayed by the system, step 550 tests to see if the time of the last call to blockPendingCheck exceeds a blockPendingCheckInterval. If so it calls the blockPendingCheck routine 552 shown in FIG. 47. Otherwise it skips to step 554.

If the blockPendingCheck routine is called, it performs a loop 556 for each input and output port instance in the realtime graphState. For each such port, Step 558 tests to see if it has a getBlockPending or putBlockPending flag with a time stamp older than normalBlockPendingTime. Normal-BlockPendingTime is a variable set by the user in edit box 270 of the Get And Put Hang Dialog Box shown in FIG. 23 to indicate the length of time a port should wait before the failure of a getRecord or putRecord call to return should be considered a hang.

If Step 558 indicates a current port should be considered hung, steps 560 and 562 are performed for the port. Step 560 labels the port as hungOnGetRecord or hungOnPutRecord, if it is an input or output port respectively, and step 562 then records a hungOnGetRecord or hungOnPutRecord, respectively for the port, in the get&PutHangHistory file, with an indication of its associated port instance and time.

Once this has been done for all port instances in the realtime graphState, all of the port instances in the graph which the user considers hung will be marked as such, and step 564 returns to the instruction which called the blockPendingCheck routine.

Returning again briefly to FIG. 43, once the call in step 550 of the performance monitor to blockPendingCheck returns, the loop of step 554 is performed for each data flow graph visualization window displayed by the performance monitor. If the current visualization window for which this loop is being performed has not been updated in a time longer than a windowUpdateInterval, step 569 causes the window to be updated.

If the current window is a 3D view, Step 570 performs steps 572, 574, and 576.

If the current window has an active flight path associated with it, step 572 changes the window's view parameters such as viewPointRadiusFromFocus, viewPointLongitudeFromFocus, viewPointLatitudeFromFocus, viewZoom, and viewFocus according to the predefined function for the change of such parameters which can be included in a flight path. Flight paths includes the Standard Orbit mentioned above with regard to button 188 of FIG. 8 as well as more complex flight paths which can be defined in the Saved Visualization Manager Dialog Box evoked from item 213 in the View Menu of FIG. 9.

Next step 574 tests to see if there has been any change in the windows view parameters, either from the operation of step 572 or in response to use of the View Navigate Dialog Box. If so, it calls the updateWindows3Dto2DProjection routine 578. As shown in FIG. 47, Step 582 of this routine makes any changes in the direction of the window's view from its view point that are necessary to keep window's view centered on the view focus. Then its step 584 calls calculateGraphs2DProjectionCoordinates, a function which uses standard 3D graphic techniques to project objects in the window's associated graph into the 2D coordinates of that window. Once the call to this function returns, the updateWindows3Dto2DProjection is complete and step 586 returns.

Once the call step 574 of the performanceMonitor routine of FIG. 43 is complete, step 576 calls the updateWindowsPixels routine 588 shown in FIG. 49.

The updateWindowsPixel is comprised of a loop 590 which is repeated for each object in the visualization window's graphState which needs to be updated. Each graph object needs to be updated if it is all or partially mapped into the current window's 2D projection and has been changed since the last call to this routine. For this purpose any Datalink instance to be displayed with moving noodles are treated has having been changed, as are any dataLink instances to be displayed as color histograms if any of the values relevant to the display of that color histogram have changed since the last update.

Before loop590 is started, however, a loop 589 prepares for it by erasing all pels in the visualization window which currently represent color from any data datalink which will be updated by the loop of 590 and which currently, or might in the loop of 590, contain any transparent segments. This would include all datalink objects displaying color histograms or noodle segmentation. This is done so that as transparent portions of in the representation of a datalink object's line move down that line, any colors previously written for non-transparent parts of the line will be removed from the window. As is pointed out below, step 648 of FIG. 52 records the ID of the datalink object for which each pels has a color written to it. This enabling the loop 589 to know which pixels it has to erase.

For each object that needs to be updated the loop 590 step 592 tests to see if it is a datalink objects, that is, either a datalink instance or a composite datalink. If so, it cases steps 594 through 610 to be performed.

Step 594 tests to see if the current datalink object colorSetting has been set to "off" by checkbox 261 of the Datalink Display Dialog Box of FIG. 20. If so, it skips the rest of loop for the object, because the object is not to be displayed.

Step 596 tests if the datalink objects's colorSetting is a function of a selected coloring variable such as flow rate, inverse flow rate, total records sent, inverse of total records sent, or monitored field value as selected by the radio buttons in lines 264C–264H in FIG. 20. If so it causes step 598 and 600 to be performed. Step 598 tests if the object is a composite datalink. If so, it sets the value for the object's coloring variable to the average of the values of that variable from all the object's corresponding instances. Then Step 600 selects the objects's draw color from the position of the value of its coloring variable relative to the variables color map. When the user selects on of the radio buttons in lines 264C–264H of FIG. 20 a default color map will be assigned to the selected coloring variable. If the user selects he or she can modifiy this color map with the Color Map Dialog Box by pushing the button 268 in FIG. 20.

If the datalink object's colorSetting is a fixed color, such as the color of its source or destination node or operator as selected in lines 264A or 264B of FIG. 20, Step 602 sets its draw color equal to that fixed color.

If the datalink object's segmentationSetting is for a color histogram, as set by the selection of the checkbox 266 in FIG. 20, step 604 calls the colorHistogramSegmentation routine 618 of FIG. 48. This routine performs a step 620 which tests to see if either the time or time scale represented by the window has changed since its last update. If so, it updates the inputPortPointer and the outputPortPointer in the datalink object's lineSegmentationBuffer.

A datalink object's lineSegmentationBuffer represents the segmenation, if any, which is to be displayed along the lines representing a datalink object. Such segmentation includes either the rain-like "noodling" used to display data rates along datalink objects or the different colored segments in a color histogram. The inputPortPointer and outputPortPointer represents the point along the line represented by the lineSegmentationBuffer which corresponds to input port and output port, respectively.

Next step 662 tests if any part of the object's lineSegmentBuffer between its outputPortPointer and inputPortPointer is not segmented, that is, does not have valid color segments associated with it. If there so the datalink object's color histogram not complete, and step 662 fills in the missing portions of the lineSegmentBuffer with segments the color of which have been calculated according to the histogram time parameters and a color variable set, respectively, in lines 267A–C and one of the lines 264C–G of FIG. 20. For all such color segments besides ones for calculated the current real time, step 662 calculates the value for such segment by calling a routine similar to updateReplayGraphState for the time represented by the color segment.

Once the color histogram in the current datalink object's lineSegmentationBuffer has been updated, Step 624 returns from the colorHistogramSegmentation routine.

Returning to FIG. 49, once step 604 is complete, Step 606 tests if the datalink object's segmentationSetting has been set to data rate rain by either radio buttons on line 266B of the DataLink Display Dialog Box of FIG. 20. If so, step 606 calls the noodleSegmentation routine 628 shown in FIG. 51.

The noodleSegmentation has a step 628 which advance the outputPortPointer and inputPortPointers in its lineSegmentBuffer by an amount proportional the to current dataRate being represented by the data rate rain. The pointers and and buffer involved are the same as used in the colorHistorySegmentation routine of FIG. 48, except in this instance they will contain segmenation representing different data. The movement of these pointers in step 628 moves the "on" and "off" segmentation in the buffer relative to the input and output ports of the datalink object to make the dataLink object's noodle appear to be falling at a rate which varies with the object's dataRate.

Next step 630 performs a loop for each continuous empty portion of the line represented by the datalink object's lineSegmentBuffer between its OutputPortPointer and inputPortPointer, starting at the outputPortPointer. For such empty portion of the buffer, that is each such portion which does not have valid on/off segmentation, a loop 630 repeatedly performs Step 630–634 until that portion is filled with such segmenation.

Step 631 adds a new pair of on/off segment to the buffer having a density which is a partially random function of link's dataRate for the time frame represented by that segment's location along the line representing the datalink object. This is done in a manner similar to that in which the segmentation of the color historgrams is calculated in step 622 of FIG. 48, except that the on/off pairs have a non-uniform rate and their motion along the lineSegmentation buffer is often much faster than of the color history segmentation. In the preferred embodiment the length of the "on" segment in each on/off pair is obtained by selected as random value in a given lenth range and then multiplying it by the dataRate for the time represented by the on/off segment pair. The length of the "off" segment is obtained by dividing such a randomly selected length by the dataRate plus a small number so that as the data rate approaches zero the length of the "off" segment becomes long relative to the "on" segment. On/off pair calculated at the end of lineSegmentationBuffer nearest the outputPortPointer often represent a length which stick out of the portion of the buffer between the outputPortPointer and the inputPortPointers. This has the beneficial effect of preventing the need to calculate a new on/off pair as the outputPortPointer is moved in Step 628 until the first time outputPortPointer is moved past the end of such an on/off pair, which might not be until multiple window updates have taken place.

If monitoredFieldDisplayIsOn step 634 tests if the datalink object has a monitored field. If so, it tests, whether a blockSent message is detected in the time represented by the on/off pair created in step 631 which has a monitored field with a desired value represented by either a ball or a triangle according to the radio buttons 404 or 406 in the Monitored Field Dialog Box of FIG. 24. If so, it accordingly replaces the on/off pair's "on" segment in the lineSegmentationBuffer with a triangle or ball.

Once the loop 630 has completely filed each continuous empty portion of the datalink objects on/off segmentation, and loop 628 completes this for any such empty portions, the on/off segmentation for the object will be complete and current, and step 635 will return from the noodleSegmentation program.

Returning to the updateWindowsPixels routine of FIG. 49, once step 606 of that figure is complete, Step 608 tests if the datalink object's segmentationSetting has been set to Solid by radio button 266A in the Datalink Display Dialog Box of FIG. 20. If so, step 608 sets the line segmenation buffer to one long "on" segment.

Next step 610 calls the drawlineSegments routine 636 shown in FIG. 52.

The first step of drawLineSegments, Step 637 erases all pixels, if any which have been previously associated with the current datalink object by Step 684 in previous calls to this routine. This is done so that as as transparent portions of a datalink object's segmentation move down along a line, pel previously written to by "on" segments of the line will be turned off so they can be seen throughdatalinksegmentbb DrawLineSegments performs a loop 638 for each line segment in the current datalink object's line segmentation buffer which is projected into the current visualization window. This loop is comprised of steps 642–650.

Step 642 tests if the segment's color is "off", in which case terminates the iteration of loop 638 for that line segment since it is not to be drawn. Otherwise, a step 646 performs a loop comprised of steps 644–650 for each successive portion of the current line segment which has been projected onto an individual picture element (commonly called a "pixel" or "pel" for short) of the window. For line segments having a color value representing a ball or a triangle this causes the loop 646 to be performed for each pel of such a shape.

Step 644 tests if the current pel of loop 646 has not yet been colored in the new pel map being created for the current update of the visualization window. If not, it performs steps 645–648. Step 645 tests if the segment's color is "on". If so, it colors the pel with the datalink object's draw color. If not, in which case the datalink object is displaying a color histogram, step 645 colors the pel with the segment's color. In either case, step 648 stores the ID of the current datalink object in association with the pel.

If the current pel has been previously colored in the current update to the visualization window, step 650 tests if the current datalink object is between the view point and the object previously associated with the pel at the point on each object represented by the pel. If so, it stores the color of the current datalink object at the pel and associate the current datalink object with the pel. Otherwise it does not draw the pel for the current line segment.

It should be appreciated that in other embodiments of the invention other schemes could be used for drawing datalink object lines. In one such scheme the thickness of a datalink object's line could be varied according to perspective, with lines that are up close in the view being drawn thicker than one pel, and with lines far away from the view being represented as being less than one pel thick by having their color mixed with a transparency value. In another simpler scheme, all datalink object lines would be one pel thick, but where multiple such lines are projected onto one pel, the color at the pel would be blended much as color would be if each such line were a transparent beam of light. An even simpler scheme would be to merely write each pel with each line segment and use the last color writen to the pel as the pels color. Because the moving dataRate rain commonly used in the visualization window causes the lines of datalink objects to contain transparent portions which move at different rates, such simple overlapping usually makes it possible to distinguish which lines are which.

Once the loop 642 has been repeated for each pixel corresponding to the current segment of loop 638, and once loop 638 has been completed for each segment in the lineSegmentationBuffer, the drawing of the datalink object's line is complete, and step 652 returns from the drawLineSegments routine.

Returning to FIG. 49, once the drawLineSegment returns the drawing of the current datalink object caused by step 592 is complete, as is the loop 590 for the current object of the visualization window which needs to be updated. It should be appreciated that other objects in the graph which need to be updated, are projected in a similar manner as datalink objects as is indicated by step 614 of FIG. 49, except that other objects do not have the complexities associated with line segmenation as do the datalink objects.

Once the loop 590 is completed for each object which has to be updated in the current visualization window, that all the pixels with need it will have been updated and step 616 returns from the ubdateWindowsPixels routine.

Returning to FIG. 43, once the call in step 576 returns, the updating of the current visualization window will be complete, and the loop of step 554 will be performed for the next visualization window the performance monitor is showing if any. If the next such window which needs to be updated is a 2D view, step 620 will render it in a manner similar to that discussed in steps 570–576, except that it will be simpler because it will involve only 2D rendering instead of 3D rendering.

Once the loop 554 has been completed for all visualization windows which need to be updated, the loop 492 is repeated again, getting and responding to user input, if any, handling UDP messages, and then updating the visualization windows. As stated above, this loop is continuously repeated until the user selects to exit from the performance monitor.

It should be appreciated that the current invention makes it much easier for those designing and/or running the computation of parallel data flow graphs to understand such computation. It makes it much easier for those who run such graphs to determine how far a given execution of a graph has progressed, how long the completion of that execution is likely to take, and how to better determine what resources that execution demands.

The present invention enables those who program such graphs to much better understand how such graphs execute and to determine why such execution may fail or have undesirable performance. The performance monitor of the present invention is particularly valuable when combined with the system for designing parallel data flow graph computations described in the Beckerle et al. Application. It is because it allows a user of such a system to rapidly iterate through a loop of programming a parallel graph, monitoring the intimate details of how it runs, and modifying the program in light of the information obtained from such monitoring. This promotes the rapid development of complex parallel programs that function as desired.

It should be understood that the foregoing description and drawings are given merely to explain and illustrate the invention and that the invention is not limited thereto, except insofar as the interpretation of the appended claims are so limited. Those skilled in the art who have the disclosure before them will be able to make modifications and variations therein without departing from the scope of the invention. The detail of the specification above has been provided to promote the policy of the patent law that a patent application's invention should be well taught to the world. The detail of this invention is not intended to, and under the policy of the patent law should not, be used to cause its claims to be more narrowly construed than if the disclosure had provided a poorer teaching by being more general or more vague.

For example, those skilled in the art will understand that the functions or devices for performing them, described in the claims below can be realized by many different programming structures and data structures, different programming languages, and by using different organization and sequencing. This is because programming is an extremely flexible art form in which a given idea, once understood by those skilled in the art, can be manifested in a virtually unlimited number of ways Furthermore, it should be understood that the invention of the present application, as broadly claimed, is not limited to use with any one type of operating system or computer hardware. It should also be understood that functions shown being performed in software in the specification could be performed in hardware in other embodiments, and vica versa.

It is to be understood that where the system 100 described above monitors only TCP/IP streams and I/O with persistent data sets, other embodiments of the invention could monitor the performance of other forms of inter-process, inter-object, or inter-routine communication mechanisms, including shared memory, pipes, calls, or message passing libraries.

For example, the present invention is not limited to use with data flow graphs created by system described in the Beckerle et al. Application. For example, many aspects of the present application would be applicable to data flow graphs which are created by parallel RDBMSs in response to queries in a data base language. It is common for the parallel graphs of such parallel RDBMSs to group together all operator instances on a given branch of a parallel data flow graph between repartition operators into one process, and to have each operator in such a process its next operator in the data flow branch to obtain records from it. In such a system, performance messages roughly similar to the blockSent messages described above could be sent not only to reflect the communication between processes, but also to reflect the calls between operators.

Thus, although system 100 mainly monitors communication between operating system processes, modern operating systems provide other mechanisms, such as threads or lightweight processes. An alternative embodiment of the invention may monitor communication between such other mechanisms in place of, or in addition to, the communication between processes described above.

Similarly, it should be understood that whereas the monitoring messages are sent to the performance monitor program described above by player processes, many of such mesages could, in alternate systems be sent to a performance monitor by the operating systems or by network protocol stacks.

The description above shows the monitoring of the communication of blocks of messages over TCP/IP and other communication channels and of getRecord and putRecord hangs. Other aspects of the execution of a parallel program could be monitored as well. This would include I/O with files not formally part of the data flow graph, statistics on the values of fields of records passing through an operator, or indications that the programming inside an operator has reached a certain point or certain state in its execution.

For example, the field monitoring function described above could be altered to cause player processes to keep statistics on the values of one or more monitored fields in each record which passes through given input or output ports. Then every second or so the value of such statistics could be sent to the performance monitor and displayed. This would improve the accuracy of field monitoring, since it would enable all records passing through a port to have a given field monitored without the cost of sending a performance monitoring message for every block of records sent.

Many aspects of the invention are not limited to use with parallel computing of data flow graph. Aspects of the invention relating to data flow graph visualization and information access would be useful on systems which execute data flow graphs on a single processor.

Similarly, aspects of the invention relating to the display and accessing of information on parallel processes executing on different processors are not limited to the parallel computing of data flow graphs. For example, in an alternate embodiment of the invention a 3D view of MIMD array processor could be provided in waffles, with different waffle squares representing different processor and different vertical levels of such waffles representing different major routines of the MIMD program. Visual representations could be made on each waffles square in different level to indicate what routines of the process each program is in, or the relative frequency with which they are in each such routines. Different waffles could also represent data arrays, and the users could navigation the 3D view relative to and click on objects of the 3D visualization to obtain more, different, or more detailed information about objects which appear to be of interest.

In other embodiments of the invention which represent data flow graphs, other forms of information representation could be used along datalink lines. For example, objects having certain attributes could be made to blink. Objects other than noodles could be moved along such lines, such as sphere or curved lines. The current values of monitored fields could be indicated by the first number or character of the value of the monitored field at successive times represented along the length of each datalink line. Data flow or records sent could be indicated by the thickness of lines. Histograms could be represented by two dimensional graphs along the length of a datalink line, in addition to the varying of color values described above.

Other user interface improvements could be made to the invention's performance monitors. For example, the user could be allowed to drag objects in the graph, such as operator waffles, to desired locations. The user could be given the ability to selectively horizontally or vertically compress the visualization, either in an entire window or in selected parts of it.

What we claim is:

1. A computer-implemented method comprising
   executing a plurality of processes in parallel to process data, wherein at least one of the processes is represented by a graphical object;
   displaying graphical representations of the processes and the flow of the data through the processes as the data is processed by the processes, wherein a volume of the flow of data processed by the at least one of the processes is represented by a characteristic of the graphical representation of the flow of data associated with the at least one of the processes.

2. The method of claim 1 wherein the flow of data is represented by a characteristic displaying movement along a line.

3. The method of claim 2 wherein the volume of the flow of data is further characterized by a speed of the represented movement and a density of the line.

4. A computer-implemented method comprising
   executing a plurality of processes on a plurality of processors to process data, wherein at least one of the processes is an instance of an operator, and the instance is executed by at least one of the processors;
   displaying graphical representations of the processes and the flow of the data through the processes as the data is processed by the processes, wherein a volume of the data processed by each instance is represented by a characteristic of the graphical representation of the flow of data associated with the at least one of the processes.

5. The method of claim 4 wherein the flow of data is represented by a characteristic displaying movement along a line.

6. The method of claim 5 wherein the volume of the flow of data is further characterized by a speed of the represented movement and a density of the line.

7. A computer-implemented method comprising
   executing a plurality of processes to process data, wherein at least a portion of the processes are instances of parallelizable operators;
   displaying a graphical user interface to the user to enable the user to define a data flow graph representing, at least in part, a combination of the parallelizable operators and relationships among the parallelizable operators for processing the data;
   parallelizing the parallelizable operators to generate the instances of the parallelizable operators to process the data; and
   displaying graphical representations of the processes and the flow of the data through the processes as the data is processed by the processes, wherein a volume of the data process by each one of the instances of the one of at least one of the parallelizable operators is represented by a characteristic of a graphical representation of the flow of data associated with a corresponding one of the parallelizable operators.

8. The method of claim 7 wherein the characteristic is a display of movement along a line.

9. The method of claim 8 wherein the volume of the flow of data is further characterized by a speed of the displayed movement and a density of the line.

10. Computer-readable medium storing a computer program comprising instructions for:
    executing a plurality of processes in parallel to process data, wherein at least one of the processes is represented by a graphical object;
    displaying graphical representations of the processes and the flow of the data through the processes as the data is processed by the processes, wherein a volume of the flow of data processed by the at least one of the processes is represented by a characteristic of the graphical representation of the flow of data associated with the at least one of the processes.

11. The computer program of claim 10 wherein the flow of data is represented by a characteristic displaying movement along a line.

12. The computer program of claim 11 wherein the volume of the flow of data is further characterized by a speed of the represented movement and a density of the line.

13. Computer-readable medium storing a computer program comprising instructions for:

executing a plurality of processes on a plurality of processors to process data, wherein at least one of the processes is an instance of an operator, and the instance is executed by at least one of the processors;

displaying graphical representations of the processes and the flow of the data through the processes as the data is processed by the processes, wherein a volume of the data processed by each instance is represented by a characteristic of the graphical representation of the flow of data associated with the at least one of the processes.

14. The computer program of claim 13 wherein the flow of data is represented by a characteristic displaying movement along a line.

15. The computer program of claim 14 wherein the volume of the flow of data is further characterized by a speed of the represented movement and a density of the line.

16. Computer-readable medium storing a computer program comprising instructions for:

executing a plurality of processes to process data, wherein at least a portion of the processes are instances of parallelizable operators;

displaying graphical user interface to the user to enable the user to define a data flow graph representing, at least in part, a combination of the parallelizable operators and relationships among the parallelizable operators for processing the data;

parallelizing the parallelizable operators to generate the instances of the parallelizable operators to process the data; and displaying graphical representations of the processes and the flow of the data through the processes as the data is processed by the processes, wherein a volume of the data processed by each one of the instances of the one of at least one of the parallelizable operators is represented by a characteristic of the graphical representation of the flow of data associated with a corresponding one of the parallelizable operators.

17. The computer program of claim 16 wherein the characteristic is a display of movement along a line.

18. The computer program of claim 17 wherein the volume of the flow of data is further characterized by a speed of the displayed movement and a density of the line.

* * * * *